US011611468B2

United States Patent
Zhou et al.

(10) Patent No.: US 11,611,468 B2
(45) Date of Patent: Mar. 21, 2023

(54) BEAM MANAGEMENT WITH DRX CONFIGURATION

(71) Applicant: Comcast Cable Communications, LLC, Philadelphia, PA (US)

(72) Inventors: Hua Zhou, Herndon, VA (US); Esmael Hejazi Dinan, Herndon, VA (US); Kyungmin Park, Arlington, VA (US); Hyoungsuk Jeon, Oakton, VA (US); Alireza Babaei, Fairfax, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 427 days.

(21) Appl. No.: 16/146,913

(22) Filed: Sep. 28, 2018

(65) Prior Publication Data

US 2019/0097874 A1 Mar. 28, 2019

Related U.S. Application Data

(60) Provisional application No. 62/564,665, filed on Sep. 28, 2017.

(51) Int. Cl.
*H04L 41/0654* (2022.01)
*H04W 76/27* (2018.01)
(Continued)

(52) U.S. Cl.
CPC ........... *H04L 41/0654* (2013.01); *H04L 5/00* (2013.01); *H04W 16/28* (2013.01); *H04W 76/27* (2018.02);
(Continued)

(58) Field of Classification Search
None
See application file for complete search history.

(56) References Cited

U.S. PATENT DOCUMENTS 9,125,218 B2 9/2015 Chang
9,456,419 B2 * 9/2016 Lee .................. H04W 52/0241
(Continued)

FOREIGN PATENT DOCUMENTS

CN 108809580 A 11/2018
EP 3397015 A1 10/2018
(Continued)

OTHER PUBLICATIONS

R1-1704478 3GPP TSG RAN WG1 Meeting #88bis, Spokane, USA, Apr. 3-7, 2017, Source: Fujitsu, Title: Discussion on beam failure recovery procedure.
(Continued)

*Primary Examiner* — Jason E Mattis
*Assistant Examiner* — Bao G Nguyen
(74) *Attorney, Agent, or Firm* — Banner & Witcoff, Ltd.

(57) ABSTRACT

Systems, apparatuses, and methods are described for wireless communications. A base station may transmit, to a wireless device, one or more radio resource control messages comprising parameters for a discontinuous reception operation and one or more beam procedures. The wireless device may monitor, based on one or more of the parameters, a downlink control channel for downlink control information (DCI). After detecting the DCI, the wireless device may receive one or more downlink packets.

23 Claims, 41 Drawing Sheets

(51) Int. Cl.
  *H04W 76/28* (2018.01)
  *H04W 16/28* (2009.01)
  *H04L 5/00* (2006.01)
  *H04W 88/08* (2009.01)
  *H04W 72/04* (2023.01)

(52) U.S. Cl.
  CPC .......... *H04W 76/28* (2018.02); *H04W 72/042* (2013.01); *H04W 88/08* (2013.01)

(56) References Cited

U.S. PATENT DOCUMENTS

| | | | |
|---|---|---|---|
| 9,736,795 B2 | 8/2017 | Dinan | |
| 9,949,298 B1 | 4/2018 | Akoum et al. | |
| 2008/0130488 A1* | 6/2008 | Kuo | H04L 1/1812 370/216 |
| 2010/0279700 A1 | 11/2010 | Kim et al. | |
| 2011/0142144 A1* | 6/2011 | Allpress | H04L 1/0026 375/259 |
| 2013/0039345 A1 | 2/2013 | Kim et al. | |
| 2013/0188580 A1 | 7/2013 | Dinan | |
| 2013/0215809 A1* | 8/2013 | Chang | H04W 52/0235 370/311 |
| 2013/0250828 A1 | 9/2013 | Chou et al. | |
| 2015/0189574 A1 | 7/2015 | Ng et al. | |
| 2015/0208462 A1* | 7/2015 | Lee | H04W 52/0209 370/311 |
| 2015/0365921 A1* | 12/2015 | Wu | H04W 4/70 370/329 |
| 2016/0270116 A1* | 9/2016 | Lin | H04W 72/14 |
| 2017/0195998 A1 | 7/2017 | Zhang et al. | |
| 2017/0207843 A1 | 7/2017 | Jung et al. | |
| 2017/0332406 A1 | 11/2017 | Islam et al. | |
| 2017/0339662 A1 | 11/2017 | Lin et al. | |
| 2017/0367114 A1* | 12/2017 | Ahn | H04L 5/0091 |
| 2017/0373731 A1 | 12/2017 | Guo et al. | |
| 2018/0006770 A1 | 1/2018 | Guo et al. | |
| 2018/0054348 A1 | 2/2018 | Luo et al. | |
| 2018/0054382 A1 | 2/2018 | Luo et al. | |
| 2018/0054783 A1 | 2/2018 | Luo et al. | |
| 2018/0054811 A1 | 2/2018 | Luo et al. | |
| 2018/0054812 A1 | 2/2018 | Luo et al. | |
| 2018/0054832 A1 | 2/2018 | Luo et al. | |
| 2018/0083753 A1 | 3/2018 | Nagaraja et al. | |
| 2018/0098334 A1* | 4/2018 | Tie | H04W 4/70 |
| 2018/0110066 A1 | 4/2018 | Luo et al. | |
| 2018/0115940 A1 | 4/2018 | Abedini et al. | |
| 2018/0115990 A1 | 4/2018 | Abedini et al. | |
| 2018/0124687 A1 | 5/2018 | Park et al. | |
| 2018/0132266 A1 | 5/2018 | Chen et al. | |
| 2018/0138962 A1* | 5/2018 | Islam | H04L 5/0032 |
| 2018/0139772 A1* | 5/2018 | Ozturk | H04W 76/28 |
| 2018/0176958 A1* | 6/2018 | Islam | H04W 56/00 |
| 2018/0191422 A1 | 7/2018 | Xia et al. | |
| 2018/0219604 A1 | 8/2018 | Lu et al. | |
| 2018/0220448 A1 | 8/2018 | Akkarakaran et al. | |
| 2018/0227899 A1 | 8/2018 | Yu et al. | |
| 2018/0234960 A1 | 8/2018 | Nagaraja et al. | |
| 2018/0241452 A1 | 8/2018 | Akkarakaran et al. | |
| 2018/0249453 A1 | 8/2018 | Nagaraja et al. | |
| 2018/0270698 A1 | 9/2018 | Babaei et al. | |
| 2018/0270699 A1 | 9/2018 | Babaei et al. | |
| 2018/0270700 A1 | 9/2018 | Babaei et al. | |
| 2018/0278310 A1 | 9/2018 | Lee et al. | |
| 2018/0279150 A1 | 9/2018 | He et al. | |
| 2018/0279193 A1 | 9/2018 | Park et al. | |
| 2018/0279229 A1 | 9/2018 | Dinan et al. | |
| 2018/0287860 A1* | 10/2018 | Xia | H04L 5/0023 |
| 2018/0288756 A1 | 10/2018 | Xia et al. | |
| 2018/0302889 A1 | 10/2018 | Guo et al. | |
| 2018/0310321 A1 | 10/2018 | Basu Mallick et al. | |
| 2018/0317123 A1 | 11/2018 | Chen et al. | |
| 2018/0323856 A1 | 11/2018 | Xiong et al. | |
| 2018/0324723 A1 | 11/2018 | Akkarakaran et al. | |
| 2018/0324867 A1 | 11/2018 | Basu Mallick et al. | |
| 2018/0343653 A1 | 11/2018 | Guo | |
| 2018/0351611 A1 | 12/2018 | Nagaraja et al. | |
| 2018/0367374 A1 | 12/2018 | Liu et al. | |
| 2018/0368126 A1 | 12/2018 | Islam et al. | |
| 2018/0368142 A1 | 12/2018 | Liou | |
| 2019/0028174 A1 | 1/2019 | Chakraborty et al. | |
| 2019/0037423 A1 | 1/2019 | Yu et al. | |
| 2019/0037498 A1* | 1/2019 | Tseng | H04W 72/0413 |
| 2019/0059129 A1* | 2/2019 | Luo | H04B 7/0695 |
| 2019/0074882 A1 | 3/2019 | Zhou et al. | |
| 2019/0149305 A1* | 5/2019 | Zhou | H04L 5/0055 370/330 |
| 2019/0173740 A1 | 6/2019 | Zhang et al. | |
| 2019/0268893 A1 | 8/2019 | Tsai et al. | |

FOREIGN PATENT DOCUMENTS

| | | |
|---|---|---|
| EP | 3424152 A1 | 1/2019 |
| WO | 2013025142 A1 | 2/2013 |
| WO | 2017024516 A1 | 2/2017 |
| WO | 2017123060 A1 | 7/2017 |
| WO | 2017135803 A1 | 8/2017 |
| WO | 2017151876 A1 | 9/2017 |
| WO | 2017196612 A1 | 11/2017 |
| WO | 2017217898 A1 | 12/2017 |
| WO | 2018017840 A1 | 1/2018 |
| WO | 2018031327 A1 | 2/2018 |
| WO | 2018031799 A1 | 2/2018 |
| WO | 2018038859 A1 | 3/2018 |
| WO | 2018038860 A1 | 3/2018 |
| WO | 2018038861 A1 | 3/2018 |
| WO | 2018038862 A1 | 3/2018 |
| WO | 2018038864 A1 | 3/2018 |
| WO | 2018075985 A1 | 4/2018 |
| WO | 2018084544 A1 | 5/2018 |
| WO | 2018128426 A1 | 7/2018 |
| WO | 2018129300 A1 | 7/2018 |
| WO | 2018136300 A1 | 7/2018 |
| WO | 2018141303 A1 | 8/2018 |
| WO | 2018144592 A1 | 8/2018 |
| WO | 2018148552 A1 | 8/2018 |
| WO | 2018156299 A1 | 8/2018 |
| WO | 2018156696 A1 | 8/2018 |
| WO | WO-2018145558 A1 * | 8/2018 |
| WO | 2018169848 A1 | 9/2018 |
| WO | 2018170481 A1 | 9/2018 |
| WO | 2018171476 A1 | 9/2018 |
| WO | 2018174667 A1 | 9/2018 |
| WO | 2018174800 A1 | 9/2018 |
| WO | 2018175303 A1 | 9/2018 |
| WO | 2018190617 A1 | 10/2018 |
| WO | 2018195975 A1 | 11/2018 |
| WO | 2018196520 A1 | 11/2018 |
| WO | 2018199074 A1 | 11/2018 |
| WO | 2018199079 A1 | 11/2018 |
| WO | 2018199100 A1 | 11/2018 |
| WO | 2018199162 A1 | 11/2018 |
| WO | 2018199243 A1 | 11/2018 |
| WO | 2018200579 A1 | 11/2018 |
| WO | 2018201450 A1 | 11/2018 |
| WO | 2018201990 A1 | 11/2018 |
| WO | 2018203719 A1 | 11/2018 |
| WO | 2018203785 A1 | 11/2018 |
| WO | 2018204255 A1 | 11/2018 |
| WO | 2018204718 A1 | 11/2018 |
| WO | 2018204922 A1 | 11/2018 |
| WO | 2018222276 A1 | 12/2018 |
| WO | 2018227464 A1 | 12/2018 |
| WO | 2018227551 A1 | 12/2018 |
| WO | 2018228187 A1 | 12/2018 |
| WO | 2018230862 A1 | 12/2018 |
| WO | 2018231655 A1 | 12/2018 |
| WO | 2018232090 A1 | 12/2018 |
| WO | 2018232259 A1 | 12/2018 |
| WO | 2018237400 A1 | 12/2018 |

(56) References Cited

FOREIGN PATENT DOCUMENTS

WO    2019004694 A1    1/2019
WO    2019032882 A1    2/2019

OTHER PUBLICATIONS

R1-1704723 3GPP TSG RAN WG1 Meeting #88bis, Spokane, USA, Apr. 3-7, 2017, Source: Intel Corporation, Title: Details for UL Beam Management.
R1-1704725 3GPP TSG RAN WG1 Meeting #88bis, Spokane, USA, Apr. 3-7, 2017, Source: Intel Corporation, Title: on UE Initiated Beam Recovery.
R1-1705582 3GPP TSG RAN WG1 Meeting #88bis, Spokane, USA, Apr. 3-7, 2017, Source: Qualcomm Incorporated, Title: Beam recovery procedures.
R1-1705893 3GPP TSG RAN WG1 Meeting #88bis, Spokane, USA, Apr. 3-7, 2017, Source: Ericsson, Title: Beam failure detection and beam recovery actions.
R1-1705961 3GPP TSG RAN WG1 Meeting #88bis, Spokane, USA, Apr. 3-7, 2017, Source: Nokia, Alcatel-Lucent Shanghai Bell, Title: Beam Recovery in NR.
R1-1706928 3GPP TSG RAN WG1 Meeting #89, Hangzhou, China, May 15-19, 2017, Source: Huawei, HiSilicon, Title: Beam management across multiple carriers.
R1-1707255 3GPP TSG RAN WG1 Meeting #89, Hangzhou, China, May 15-19, 2017, Source: Fujitsu, Title: Discussion on beam failure recovery procedure.
R1-1707356 3GPP TSG RAN WG1 Meeting #89, Hangzhou, China, May 15-19, 2017, Source: Intel Corporation, Title: Discussion for Mechanism to Recover from Beam Failure.
R1-1707477 3GPP TSG RAN WG1 Meeting #89, Hangzhou, China, May 15-19, 2017, Source: CATT, Title: Discussion on DL beam recovery.
R1-1707698 3GPP TSG RAN WG1 Meeting #89, Hangzhou, China, May 15-19, 2017, Source: Guangdong OPPO Mobile Telecom, Title: On Beam Recovery Mechanism.
R1-1707782 3GPP TSG RAN WG1 Meeting #89, Hangzhou, China, May 15-19, 2017, Source: Spreadtrum Communications, Title: Discussion on UE initiated recovery from beam failure.
R1-1707814 3GPP TSG RAN WG1 Meeting #89, Hangzhou, China, May 15-19, 2017, Source: NEC, Title: Low latency beam failure recovery by PRACH/PRACH-like.
R1-1707954 3GPP TSG RAN WG1 Meeting #89, Hangzhou, China, May 15-19, 2017, Source: Samsung, Title: Discussion on beam recovery procedure.
R1-1708678 3GPP TSG RAN WG1 Meeting #89, Hangzhou, China, May 15-19, 2017, Source: Ericsson, Title: Beam failure recovery mechanism.
R1-1708905 3GPP TSG RAN WG1 Meeting #89, Hangzhou, China, May 15-19, 2017, Source: Nokia, Alcatel-Lucent Shanghai Bell, Title: Beam Recovery.
R1-1710144 3GPP TSG RAN WG1 NR Ad-Hoc #2, Qingdao, China, Jun. 27-30, 2017, Source: Guangdong OPPO Mobile Telecom, Title: On Beam Recovery Mechanism.
R1-1710185 3GPP TSG RAN WG1 NR Ad-Hoc #2, Qingdao, China, Jun. 27-30, 2017, Source: ZTE, Title: Discussion on beam recovery mechanism.
R1-1710527 3GPP TSG RAN WG1 NR Ad-Hoc #2, Qingdao, China, Jun. 27-30, 2017, Source: Intel Corporation, Title: Discussion for mechanism to recover from beam failure.
R1-1710655 3GPP TSG RAN WG1 NR Ad-Hoc #2, Qingdao, China, Jun. 27-30, 2017, Source: Samsung, Title: Beam failure recovery.
R1-1714251 3GPP TSG RAN WG1 Meeting #90, Prague, Czech Republic, Aug. 21-25, 2017, Source: Nokia, Nokia Shanghai Bell, Title: Beam recovery in NR.
R1-1715468 3GPP TSG RAN WG1 Meeting NR#3, Nagoya, Japan, Sep. 18-21, 2017, Source: Huawei, HiSilicon, Title: Beam Failure Recovery Design Details.
R1-1715860 3GPP TSG RAN WG1 Meeting NR#3, Nagoya, Japan, Sep. 18-21, 2017, Source: LG Electronics, Title: Discussion on beam failure recovery.
R1-1800362 3GPP TSG RAN WG1 Meeting AH 1801, Vancouver, Canada, Jan. 22-26, 2018, Source: LG Electronics, Title: Clarification on PDCCH beam indication by higher-layers.
R1-1800363 3GPP TSG RAN WG1 Meeting AH 1801, Vancouver, Canada, Jan. 22-26, 2018, Source: LG Electronics, Title: Text proposals on UL beam management.
R1-1800364 3GPP TSG RAN WG1 Meeting AH 1801, Vancouver, Canada, Jan. 22-26, 2018, Source: LG Electronics, Title: Discussion on PHY and MAC operation for beam failure recovery.
R1-1800401 3GPP TSG RAN WG1 Meeting AH 1801, Vancouver, Canada, Jan. 22-26, 2018, Source: Lenovo, Motorola Mobility, Title: Corrections on beam management.
R1-1800402 3GPP TSG RAN WG1 Meeting AH 1801, Vancouver, Canada, Jan. 22-26, 2018, Source: Lenovo, Motorola Mobility, Title: Corrections on beam failure recovery.
R1-1800432 3GPP TSG RAN WG1 Meeting AH 1801, Vancouver, Canada, Jan. 22-26, 2018, Source: Samsung, Title: Issues on beam management.
R1-1800433 3GPP TSG RAN WG1 Meeting AH 1801, Vancouver, Canada, Jan. 22-26, 2018, Source: Samsung, Title: Aperiodic beam reporting.
R1-1800434 3GPP TSG RAN WG1 Meeting AH 1801, Vancouver, Canada, Jan. 22-26, 2018, Source: Samsung, Title: Issues on beam failure recovery.
R1-1800472 3GPP TSG RAN WG1 Meeting AH 1801, Vancouver, Canada, Jan. 22-26, 2018, Source: Samsung, Title: PHR for CA.
R1-1800498 3GPP TSG RAN WG1 Meeting AH 1801, Vancouver, Canada, Jan. 22-26, 2018, Source: OPPO, Title: Text Proposal for Beam Management.
R1-1800499 3GPP TSG RAN WG1 Meeting AH 1801, Vancouver, Canada, Jan. 22-26, 2018, Source: OPPO, Title: Text Proposal for Beam Failure Recovery.
R1-1715941 3GPP TSG RAN WG1 Meeting NR#3, Nagoya Japan, Sep. 18-21, 2017, Source: Samsung, Title Beam Failure recovery.
R1-1716295 3GPP TSG RAN WG1 Meeting NR#3, Nagoya, Japan, Sep. 18-21, 2017, Source: Intel Corporation, Title: Remaining Issues on Beam Failure Recovery.
R1-1716397 3GPP TSG RAN WG1 Meeting NR#3, Nagoya, Japan, Sep. 18-21, 2017, Source: Qualcomm Incorporated, Title: Beam recovery procedure.
R1-1716500 3GPP TSG RAN WG1 Meeting NR#3, Nagoya, Japan, Sep. 18-21, 2017, Source: Nokia, Nokia Shanghai Bell, Title Beam Recovery in NR.
R1-1716469 3GPP TSG RAN WG1 Meeting NR#3, Nagoya, Japan, Sep. 18-21, 2017: Source: InterDigital, Inc., Title: Remaining issues on beam recovery.
R1-1717302 3GPP TSG RAN WG1 Meeting #90bis, Prague, Czech Republic, Oct. 9-13, 2017, Source: Huawei, HiSilicon Title: Beam failure recovery design details.
R1-1717369 3GPP TSG RAN WG1 Meeting #90bis, Prague, Czech Republic, Oct. 9-13, 2017, Source: Intel Corporation, Title: Remaining Issues on Beam Failure Recovery.
R1-1717473 3GPP TSG RAN WG1 Meeting #90bis, Prague, Czech Republic, Oct. 9-13, 2017, Source: vivo, Title: Discussion on beam failure recovery.
R1-1717606 3GPP TSG RAN WG1 Meeting #90bis, Prague, Czech Republic, Oct. 9-13, 2017, Source: Samsung, Title: Beam failure recovery.
R1-1717942 3GPP TSG RAN WG1 Meeting #90bis, Prague, Czech Republic, Oct. 9-13, 2017, Source: LG Electronics, Title: Discussion on beam failure recovery.
R1-1718010 3GPP TSG RAN WG1 Meeting #90bis, Prague, Czech Republic, Oct. 9-13, 2017, Source: NEC, Title: Discussion on Beam Failure Recovery.
R1-1718055 3GPP TSG RAN WG1 Meeting #90bis, Prague, Czech Republic, Oct. 9-13, 2017, Source: OPPO, Title: Discussion on Beam Recovery Mechanism.
R1-1718193 3GPP TSG RAN WG1 Meeting #90bis, Prague, Czech Republic, Oct. 9-13, 2017, Source: NTT Docomo, Title: Views on beam recovery.

(56) References Cited

OTHER PUBLICATIONS

R1-1718389 3GPP TSG RAN WG1 Meeting #90bis, Prague, Czech Republic, Oct. 9-13, 2017, Source: AT&T, Title: Beam Recovery for Full and Partial Control Channel Failure.
R1-1718512 3GPP TSG RAN WG1 Meeting #90bis, Prague, Czech Republic, Oct. 9-13, 2017, Source: Nokia, Nokia Shanghai Bell, Title: Beam Recovery in NR.
R1-1718542 3GPP TSG RAN WG1 Meeting #90bis, Prague Czech Republic, Oct. 9-13, 2017, Source: Qualcomm Incorpated, Title: Beam recovery procedure.
R2-1707001 3GPP TSG-RAN WG2 Meeting #AH, Qingdao, China, Jun. 27-29, 2017, Source: Lenovo, Motorola Mobility, Title: Random access procedure for beam recovery request.
R1-17111617 3GPP TSG RAN WG1 NR AH#2, Qingdao, China, Jun. 27-30, 2017, Source: CATT, Title: RACH power control and power ramping procedure (revision of R1-1710034).
R1-1711161 3GPP TSG RAN WG1 NR#2, Qingdao, China, Jun. 27-30, 2017, Source: Qualcomm Incorporated, Title: Beam recovery procedures.
International Search Report and Written Opinion for PCT/US2018/046368 dated Dec. 13, 2018.
Apr. 15, 2019—Extented European Search Report—EP 19150964.5.
R1-1708678 3GPP TSG-RAN WG1 #89, Hangzhou, China, May 15-19, 2017, Source: Ericsson, Title: Beam failure recovery mechanism.
May 22, 2019—Extended European Search Report—19156175.2.
R2-1800560 3GPP TSG-RAN WG2 NR, Vancouver, Canada, Jan. 22-26, 2018, Source: Sharp, Title: Remaining issues on beam failure recovery.
R2-1800632 3GPP TSG-RAN WG2 AH, Vancouver, Canada, Jan. 22-26, 2018, Source: Huawei, HiSilicon, Title: Remaining issue for beam failure recovery.
R2-1801049 3GPP TSG-RAN WG2 AH, Vancouver, Canada, Jan. 22-26, 2018, Source: Huawei, HiSilicon, Title: Non-contention based random access for beam failure recovery in CA.
3GPP TS 38.321 V15.0.0 (Dec. 2017); Technical Specification; 3rd Generation Partnership Project; Technical Specification Group Radio Access Network; NR; Medium Access Control (MAC) protocol specification (Release 15).
3GPP TS 38.213 V15.0.1 (Feb. 2018); Technical Specification; 3rd Generation Partnership Project; Technical Specification Group Radio Access Network; NR; Physical layer procedures for control (Release 15).
R2-1804475 3GPP TSG-RAN WG2 Meeting #101 bis, Sanya, China, Apr. 16-20, 2018, Source: Spreadtrum Communications, Title: Beam Failure recovery on SCell.
May 14, 2019—European Extended Search Report—19157460.7.
R2-1710562 3GPP TSG-RAN WG2 #99bis, Prague, Czech Republic, Oct. 9-13, 2017, Source: Huawei, HiSilicon, Title: RAN2 aspects of DL beam management (revision of R2-1708695).
3GPP TS 36.211 V14.3.0 (Jun. 2017); Technical Specification; 3rd Generation Partnership Project; Technical Specification Group Radio Access Network; Evolved Universal Terrestrial Radio Access (E-UTRA); Physical channels and modulation (Release 14).
3GPP TS 36.213 V14.3.0 (Jun. 2017); Technical Specification; 3rd Generation Partnership Project; Technical Specification Group Radio Access Network; Evolved Universal Terrestrial Radio Access (E-UTRA); Physical layer procedures (Release 14).
3GPP TS 36.321 V.14.3.0 (Jun. 2017); Technical Specification; 3rd Generation Partnership Project; Technical Specification Group Radio Access Network; Evolved Universal Terrestrial Radio Access (E-UTRA); Medium Access Control (MAC) protocol specification (Release 14).
3GPP TS 36.331 V.14.3.0 (Jun. 2017); Technical Specification; 3rd Generation Partnership Project; Technical Specification Group Radio Access Network; Evolved Universal Terrestrial Radio Access (E-UTRA); Radio Resource Control (RRC); Protocol specification (Release 14).

3GPP TR 38.802 V14.1.0 (Jun. 2017); Technical Report; 3rd Generation Partnership Project; Technical Specification Group Radio Access Network; Study on New Radio Access Technology; Physical Layer Aspects (Release 14).
3GPP TR 38.912 V14.0.0 (Mar. 2017); Technical Report; 3rd Generation Partnership Project; Technical Specification Group Radio Access Network; Study on New Radio (NR) Access Technology (Release 14).
R1-171xxxx 3GPP TSG RAN WG1 Meeting #90, Prague, Czech Republic, Aug. 21-25, 2017, Source: MCC Support, Title: Draft Report of 3GPP TSG RAN WG1 #89 v0.2.0 (Hangzhou, China, May 15-19, 2017).
R1-171xxxx 3GPP TSG RAN WG1 Meeting #90, Prague, Czech Republic, Aug. 21-25, 2017, Source: MCC Support, Title: Draft Report of 3GPP TSG RAN WG1 #AH NR2 v0.1.0 (Qingdao, China, Jun. 27-30, 2017).
R1-1708890 3GPP TSG RAN WG1 Meeting #89, Hangzhou, China, May 15-19, 2017, Source: MCC Support, Title Final Report of 3GPP TSG RAN WG1 #88bis v1.0.0 (Spokane, Washington, Apr. 3-7, 2017).
R1-1709907 3GPP TSG RAN WG1 NR Ad-Hoc#2, Qingdao, China, Jun. 27-30, 2017, Source: Xinwei, Title: Discussion on Beam Failure Recovery.
R1-1709929 3GPP TSG RAN WG1 NR Ad Hoc Meeting, Qingdao, China, Jun. 27-30, 2017, Source: Huawei, HiSilicon, Title: General views on beam failure recovery.
R1-1710058 3GPP TSG RAN WG1 NR Ad-Hoc#2, Qingdao, China, Jun. 27-30, 2017, Source: CATT, Title: Considerations on DL beam failure and recovery.
R1-1710283 3GPP TSG RAN WG1 NR Ad-Hoc#2, Qingdao, China, Jun. 27-30, 2017, Source: LG Electronics, Title: Discussion on beam failure recovery.
R1-1710400 3GPP TSG RAN WG1 NR Ad-Hoc#2, Qingdao, China, Jun. 27-30, 2017, Source: Vivo, Title: Beam failure recovery procedure.
R1-1710596 3GPP TSG RAN WG1 NR Ad-Hoc#2, Qingdao, China, Jun. 27-30, 2017, Source: Lenovo, Motorola Mobility, Title: Discussion of beam recovery procedure.
R1-1710810 3GPP TSG RAN WG1 AH_NR Meeting, Qingdao, China, Jun. 27-30, 2017, Source: MediaTek Inc., Title: Mechanism for flexible beam failure recovery.
R1-1710926 3GPP TSG RAN WG1 NR Ad-Hoc#2, Qingdao, China, Jun. 27-30, 2017, Source: InterDigital, Inc., Title: On Remaining Details of Beam Failure Recovery.
R1-1711017 3GPP TSG RAN WG1 #89ah-NR, Qingdao, China, Jun. 27-30, 2017, Source: Ericsson, Title: Mechanism to recover from beam failure.
R1-1711291 3GPP TSG RAN WG1 NR Ad-Hoc#2, Qingdao, China, Jun. 27-30, 2017, Source: Nokia, Alcatel-Lucent Shanghai Bell, Title: Beam Recovery.
R2-1706680 3GPP TSG-RAN WG2 NR-Adhoc, Qingdao, China, Jun. 27-29, 2017, Source: AT&T, Title: Beam Failure Recovery Mechanism and RLF.
3GPP TSG-RAN WG2 NR Ad Hoc, Qingdao, China, Jun. 27-29, 2017, Source: RAN2 Chairman (Intel), Object: Chairman Notes.
PRACH—Preamble Detection and Timing Advance Estimation for multi-UE in 3GPP LTE, 3GPP LTE Solutions, from www.mymowireless.com.
Jul. 16, 2019—European Extended Search Report—EP 19166184.2.
R1-1702078 3GPP TSG RAN WG1 Meeting #88, Athens, Greece, Feb. 13-17, 2017, Source: CATT, Title: Considerations on beam recovery mechanism.
R1-1707121 3GPP TSG RAN WG1 Meeting #89, Hangzhou, China, May 15-19, 2017, Source: ZTE, Title: Discussion on beam recovery mechanism.
3GPP TS 38.213 V15.0.0 (Dec. 2017); Technical Specification; 3rd Generation Partnership Project; Technical Specification Group Radio Access Network; NR; Physical layer procedures for control (Release 15).

(56) References Cited

OTHER PUBLICATIONS

3GPP TS 38.213 V15.1.0 (Mar. 2018); Technical Specification; 3rd Generation Partnership Project; Technical Specification Group Radio Access Network; NR; Physical layer procedures for control (Release 15).
3GPP TS 38.321 V15.1.0 (Mar. 2018); Technical Specification; 3rd Generation Partnership Project; Technical Specification Group Radio Access Network; NR; Medium Access Control (MAC) protocol specification (Release 15).
3GPP TS 38.331 V15.1.0 (Mar. 2018); Technical Specification; 3rd Generation Partnership Project; Technical Specification Group Radio Access Network; NR; Radio Resource Control (RRC) protocol specification (Release 15).
R1-180xxxx 3GPP TSG RAN WG1 Meeting #93 Busan, South Korea, May 21-25, 2018, Source: Ericsson, Title: Feature lead summary for beam measurement and reporting.
R1-180xxxx 3GPP TSG RAN WG1 Meeting #92bis, Sanya, China, Apr. 16-20, 2018, Source: MediaTek, Inc., Title: Summary 1 on Remaining issues on Beam Failure Recovery.
R1-1803362 3GPP TSG RAN WG1 Meeting #92, Athens, Greece, Feb. 26-Mar. 2, 2018, Source:MediaTek, Inc., Title: Summary on remaining issues on Beam Failure Recovery.
R1-180xxxx 3GPP TSG RAN WG1 Meeting #93 Busan, South Korea, May 21-25, 2018, Source: MediaTek Inc., Title: Summary on Remaining issues on Beam Failure Recovery.
R1-1704400 3GPP TSG RAN WG1 Meeting #88bis, Spokane, USA, Apr. 3-7, 2017, Source: ZTE, ZTE Microelectronics, Title: Discussion on beam recovery mechanism.
R1-1704465 3GPP TSG RAN WG1 Meeting #88bis, Spokane, USA, Apr. 3-7, 2017, Source: MediaTek, Inc., Title: Discussion on beam recovery mechanism.
R2-1802554 3GPP TSG-RAN WG2 #101, Athens, Greece, Feb. 26-Mar. 2, 2018, Source: ASUSTeK, Title: Discussion on Beam Failure Recovery Request in NR.
R2-1803195 3GPP TSG-RAN WG2 #101, Athens, Greece, Feb. 26-Mar. 2, 2018, Source: Ericsson, Title: Beam Failure Recovery in Scell.
R2-1804877 3GPP TSG-RAN WG2 Meeting #101 bis, Sanya, China, Apr. 16-20, 2018, Source: Xiaomi, Title: Consideration on SR Transmission Occasion Overlap with a UL-SCH Resource.
R2-18006164 3GPP TSG-RAN WG2 Meeting #101 bis, Sanya, China, Apr. 16-20, 2018, Source: Media Tek Inc., Title: On Parallel SR and RACH Procedure in NR.
R1-170xxxx 3GPP TSG RAN WG1 Meeting #88b, Spokane, USA, Apr. 3-7, 2017, Source: Huawei, HiSilicon, Title: WF on Beam Failure Recovery.
R1-171xxxx 3GPP TSG RAN WG1 Meeting #90, Prague, Czech Republic, Aug. 21-25, 2017, Source: MediaTek Inc. Title: Offline Discussion on Beam Recovery Mechanism.
R1-1704230 3GPP TSG RAN WG1 Meeting #88b, Spokane, USA, Apr. 3-7, 2017, Source: Huawei, HiSilicon, Title: Link recovery procedure for beam failure.
3GPP TS 36.212 V14.3.0 (Jun. 2017); Technical Specification; 3rd Generation Partnership Project; Technical Specification Group Radio Access Network; Evolved Universal Terrestrial Radio Access (E-UTRA); Multiplexing and channel coding (Release 14).
3GPP TSG RAN WG1 Meeting #90, Prague, Czech Republic, Aug. 21-25, 2017, Title: RAN1 Chairman's Notes.
R1-1705719 3GPP TSG RAN WG1 Meeting #88bis, Spokane, USA, Apr. 3-7, 2017, Source: NTT Docomo, Inc., Title: Further views on mechanism to recover from beam failure.
R1-1711016 3GPP TSG RAN WG1 #89AH-NR, Qingdao, China, Jun. 27-30, 2017, Source: Ericsson, Title: UL beam management details.
R1-1712223 3GPP TSG RAN WG1 Meeting #90, Prague, Czech Republic, Aug. 21-25, 2017, Source: Huawei, HiSilicon, Title: UL beam management.
R1-1712224 3GPP TSG RAN WG1 Meeting #90, Prague, Czech Republic, Aug. 21-25, 2017, Source: Huawei, HiSilicon, Title: Procedure details for beam failure recovery.
R1-1712268 3GPP TSG RAN WG1 Meeting #90, Prague, Czech Republic, Aug. 21-25, 2017, Source: Xinwei, Title: Discussion on beam failure recovery.
R1-1712299 3GPP TSG RAN WG1 Meeting #90, Prague, Czech Republic, Aug. 21-25, 2017, Source: ZTE, Title: UL beam management for NR MIMO.
R1-1712378 3GPP TSG RAN WG1 Meeting #90, Prague, Czech Republic, Aug. 21-25, 2017, Source: CATT, Title: Considerations on UL beam management.
R1-1712379 3GPP TSG RAN WG1 Meeting #90, Prague, Czech Republic, Aug. 21-25, 2017, Source: CATT, Title: Beam failure detection and recovery.
R1-1712551 3GPP TSG RAN WG1 Meeting #90, Prague, Czech Republic, Aug. 21-25, 2017, Source: Intel Corporation, Title: Details for UL beam management.
R1-1712552 3GPP TSG RAN WG1 Meeting #90, Prague, Czech Republic, Aug. 21-25, 2017, Source: Intel Corporation, Title: Discussion for mechanism to recover from beam failure.
R1-1721672 3GPP TSG RAN WG1 Meeting #90, Prague, Czech Republic, Aug. 21-25, 2017, Source: Lenovo, Motorola Mobility, Title: Discussion of beam failure recovery.
R1-1712713 3GPP TSG RAN WG1 Meeting #90, Prague, Czech Republic, Aug. 21-25, 2017, Source: AT&T, Title: Mechanisms to recover from beam failure.
R1-1712838 3GPP TSG RAN WG1 Meeting #90, Prague, Czech Republic, Aug. 21-25, 2017, Source: Vivo, Title: Discussion on uplink beam management.
R1-1712966 3GPP TSG RAN WG1 Meeting #90, Prague, Czech Republic, Aug. 21-25, 2017, Source: Sony, Title: Considerations on UL beam management.
R1-1713287 3GPP TSG RAN WG1 Meeting #90, Prague, Czech Republic, Aug. 21-25, 2017, Source: Guangdong OPPO Mobile Telecom, Title: Discussion on the UL beam management.
R1-1713596 3GPP TSG RAN WG1 Meeting #90, Prague, Czech Republic, Aug. 21-25, 2017, Source: Samsung, Title: Discussion on UL beam management.
R1-1714143 3GPP TSG RAN WG1 Meeting #90, Prague, Czech Republic, Aug. 21-25, 2017, Source: InterDigital, Inc., Title: On efficient UL beam management.
R1-1714250 3GPP TSG RAN WG1 Meeting #90, Prague, Czech Republic, Aug. 21-25, 2017, Source: Nokia, Nokia Shanghai Bell, Title: SRS transmission for beam management.
R1-1714292 3GPP TSG RAN WG1 Meeting #90, Prague, Czech Republic, Aug. 21-25, 2017, Source: Ericsson, Title: On UL beam management.
R1-1714383 3GPP TSG RAN WG1 Meeting #90, Prague, Czech Republic, Aug. 21-25, 2017, Source: ASUSTeK, Title: Considerations on UE Beamforming Management.
3GPP TSG RAN WG1 Meeting NR#3, Nagoya, Japan, Sep. 18-21, 2017, Title: RAN1 Chairman's Notes.
R1-1715441 3GPP TSG RAN WG1 Meeting NR#3, Nagoya, Japan, Sep. 18-21, 2017, Source: ZTE, Sanechips, Title: Discussion on beam recovery.
R1-1715620 3GPP TSG RAN WG1 Meeting NR#3, Nagoya, Japan, Sep. 18-21, 2017, Source: Vivo, Title: Discussion on beam failure recovery procedure.
R1-1715802 3GPP TSG RAN WG1 Meeting NR#3, Nagoya, Japan, Sep. 18-21, 2017, Source: CATT, Title: Beam failure detection and recovery.
R2-1708696 3GPP TSG RAN WG2 #99, Berlin, Germany, Aug. 21-25, 2017, Source: Huawei, HiSilicon, Title: Consideration on DRX with beam management.
R2-1708755 3GPP TSG RAN WG2 #99, Berlin, Germany, Aug. 21-25, 2017, Source: LG Electronics, Title: DRX related timers in NR (Revision of R2-1706750).
R2-1708791 3GPP TSG RAN WG2 #99, Berlin, Germany, Aug. 21-25, 2017, Source: Intel Corporation, Title: C-DRX enhancement in NR (Revision of R2-1707026).
R2-1709223 3GPP TSG RAN WG2 #99, Berlin, Germany, Aug. 21-25, 2017, Source: Qualcomm Incorporated, Title: Beam management in C-DRX.

(56) References Cited

OTHER PUBLICATIONS

R2-1709588 3GPP TSG RAN WG2 #99, Berlin, Germany, Aug. 21-25, 2017, Source: Samsung, Title: NR beamformed C-DRX operation (updated resubmission of R2-1705734).
R2-1709652 3GPP TSG RAN WG2 #99, Berlin, Germany, Aug. 21-25, 2017, Source: Qualcomm Incorporated, Apple, OPPO, Title: Wake-Up Signaling for C-DRX Mode.
R2-1709916 3GPP TSG RAN WG2 #99, Berlin, Germany, Aug. 21-25, 2017, Source: Ericsson, Title: Reply LS to SA2 on 5Qls for URLLC.
R2-1811483 3GPP TSG-RAN WG2 Meeting #103, Gothenburg, Sweden, Aug. 20-24, 2018, Source: ZTE, Sanechips, Title: CR for the reset of BFD in 38.321.
R2-1812108 3GPP TSG-RAN WG2 Meeting #103, Gothenburg, Sweden, Aug. 20-24, 2018, Source: Nokia, Nokia Shanghai Bell, Title: Reset of BFD.
3GPP TS 38.213 V15.2.0 (Jun. 2018), Technical Specification, 3rd Generation Partnership Project; Technical Specification Group Radio Access Network; NR; Physical layer procedures for control (Release 15).
R2-1806229 3GPP TSG-RAN WG2 Meeting #101 bis, Sanya, China, Apr. 16-20, 2018, Source: Samsung, Title: Miscellaneous corrections.
R2-1815644 3GPP TSG-RAN WG2 Meeting #103bis, Chengdu, PR China, Oct. 8-12, 2018, Source: Ericsson, Samsung, Title: Correction for Reconfiguration of CFRA during ongoing RA.
R2-1811325 3GPP TSG-RAN WG2 Meeting #103, Gothenburg, Sweden, Aug. 20-24, 2018, Source: Samsung Electronics, Title: Handling Beam Failure Recovery Configuration Update.
3GPP TS 38.321 V15.2.0 (Jun. 2018), Technical Specification, 3rd Generation Partnership Project; Technical Specification Group Radio Access Network; NR; Medium Access Control (MAC) protocol specification (Release 15).
R2-1811149 3GPP TSG-RAN WG2 Meeting #103, Gothenburg, Sweden, Aug. 20-24, 2018, Source: OPPO, Title: CR on beam failure recovery configuration.
RZ-1811593 3GPP TSG-RAN WG2 Meeting #103, Gothenburg, Sweden, Aug. 20-24, 2018, Source: ZTE Corporation, Sanechips, Title: CR for the configuration of BeamFailureRecoveryConfig.
3GPP TS 38.331 V15.2.1 (Jun. 2018), Technical Specification, 3rd Generation Partnership Project; Technical Specification Group Radio Access Network; NR; Radio Resource Control (RRC) protocol specification (Release 15).
R1-180XXXX 3GPP TSG-RAN WG1 Meeting #94, Gothenburg, Sweden, Aug. 20-24, 2018, Source: Ericsson, Title: Feature lead summary beam management vZ.
R2-1804763 3GPP TSG-RAN WG2 Meeting #101 bis, Sanya, China, Apr. 16-20, 2018, Source: Nokia, Nokia Shangha Bell, Title: Running MAC CR for euCA.
R1-180XXXX 3GPP TSG-RAN WG1 Meeting #94, Gothenburg, Sweden, Aug. 20-24, 2018, Source: NTT Docomo, Inc., Title: Offline summary for PDCCH structure and search space.
R1-180XXXX 3GPP TSG-RAN WG1 Meeting #94, Gothenburg, Sweden, Aug. 20-24, 2018, Source: MediaTek Inc., Title: Summary #1 on Remaining Issues on Beam Failure Recovery.
R1-1712153 3GPP TSG RAN WG1 Meeting #90, Prague, Czech Republic, Aug. 21-25, 2017, Source: Huawei, HiSilicon, Title: Overview of bandwidth part.
R1-1713204 3GPP TSG RAN WG1 Meeting #90, Prague, Czech Republic, Aug. 21-25, 2017, Source: LG Electronics, Title: Further remaining details on wider bandwidth operation.
R1-1713978 3GPP TSG RAN WG1 Meeting #90, Prague, Czech Republic, Aug. 21-25, 2017, Source: MediaTek Inc., Title: Further Details on Bandwidth Part Operation in NR.
R1-1719650 3GPP TSG RAN WG1 Meeting #91, Reno, USA, Nov. 27-Dec. 1, 2017, Source: AT&T, Title: Remaining details on bandwidth parts.
R1-1719651 3GPP TSG RAN WG1 Meeting #91, Reno, USA, Nov. 27-Dec. 1, 2017, Source: AT&T, Title: Remaining details on carrier aggregation.
R1-1721027 3GPP TSG RAN WG1 Meeting #91, Reno, USA, Nov. 27-Dec. 1, 2017, Source: Ericsson, Title: On Carrier aggregation related aspects.
R1-1800879 3GPP TSG RAN WG1 NR Ad Hoc, Vancouver, Canada, Jan. 22-26, 2018, Source: Qualcomm Incorporated, Title: Remaining Issues on BWP.
R1-1803622 3GPP TSG RAN WG1 Meeting #92, Sanya, China, Apr. 16-20, 2018, Source: NEC, Title: Remaining issues on beam failure recovery.
R1-1804211 3GPP TSG-RAN WG1 Meeting #92bis, Sanya, China, Apr. 16-20, 2018, Source: Lenovo, Motorola Mobility, Title: Discussion of beam failure recovery for Carrier Aggregation.
R1-1806281 3GPP TSG-RAN WG1 #93, Busan, Korea, May 21-25, 2018, Source: CATT, Title: Remaining issues on beam failure recovery.
R1-1806508 3GPP TSG-RAN WG1 #93, Busan, Korea, May 21-25, 2018, Source: Intel Corporation, Title: Remaining issues on beam failure recovery.
R1-1806789 3GPP TSG-RAN WG1 #93, Busan, Korea, May 21-25, 2018, Source: MediaTek Inc., Title: Remaining issues on beam failure recovery.
R1-1807796 3GPP TSG-RAN WG1 #93, Busan, Korea, May 21-25, 2018, Source: MediaTek Inc., Title: Summary 2 on Remaining issues on beam failure recovery.
R1-1808720 3GPP TSG-RAN WG1 Meeting #94, Gothenburg, Sweden, Aug. 20-24, 2018, Source: Intel Corporation, Title: On SCell Beam Failure Recovery.
R1-1810020 3GPP TSG-RAN WG1 Meeting #94, Gothenburg, Sweden, Aug. 20-24, 2018, Source: Samsung, Title: CR to 38.213 capturing the RAN1#94 meeting agreements.
R2-1713170 3GPP TSG RAN WG2 Meeting #100, Reno, USA, Nov. 27-Dec. 1, 2017, Source: Nokia (rapporteur), Title: Report of [99bis#32][LTE/euCA] Faster activation for Scells (Nokia).
R2-1714289 3GPP TSG RAN WG2 Meeting #100, Reno, USA, Nov. 27-Dec. 1, 2017, Source: Nokia, Nokia Shanghai Bell, Title: Running CR for euCA Stage-2.
R2-1800866 3GPP TSG-RAN WG2 AH, Vancouver, Canada, Jan. 22-26, Z018, Source: vivo, Title: RACH configuration for beam recovery.
R2-1800895 3GPP TSG-RAN WG2 AH, Vancouver, Canada, Jan. 22-26, 2018, Source: vivo, Title: Discussion on the impact on beam failure recovery.
R2-1801432 3GPP TSG RAN WG2 NR Ad Hoc, Vancouver, Canada, Jan. 22-26, Z018, Source: Qualcomm Incorporated, Title: Dormant BWP for fast SCell activation.
R2-1801926 3GPP TSG-RAN WG2 #101, Athens, Greece, Feb. 26-Mar. 2, Z018, Source: ZTE, Sanechips, Title: Remaining considerations on RACH procedure for BFR.
RZ-1802143 3GPP TSG-RAN WG2 #101, Athens, Greece, Feb. 26-Mar. 2, Z018, Source: CATT, Title: RACH reattempt considering beam selection.
R2-1802151 3GPP TSG-RAN WG2 #101, Athens, Greece, Feb. 26-Mar. 2, Z018, Source: CATT, Title: Beam failure recovery.
R2-1802756 3GPP TSG RAN WG2 Meeting #101, Athens, Greece, Feb. 26-Mar. 2, 2018, Source: Nokia, Nokia Shanghai Bell, Title: Remaining details on temporary CQI reporting during activation.
R2-1803229 3GPP TSG-RAN WG2 #101, Athens, Greece, Feb. 26-Mar. 2, 2018, Source: Nokia, Nokia Shanghai Bell, Title: BWP switch interaction with contention free BFR preamble.
R2-1803564 3GPP TSG RAN WG2 Meeting #101, Athens, Greece, Feb. 26-Mar. 2, 2018, Source: Qualcomm Incorporated, Title: Dormant BWP for fast SCell activation.
R2-1804279 3GPP TSG-RAN WG2 Meeting #101, Sanya, China, Apr. 16-20, Z018, Source: ASUSTeK, Title: UE behaviours upon beam failure and recovery.
R2-1804303 3GPP TSG-RAN WG2 Meeting #101, Sanya, China, Apr. 16-20, Z018, Source: Samsung, Title: MAC Impacts: Beam Failure Recovery for SCell.
R2-1804407 3GPP TSG-RAN WG2 Meeting #101, Sanya, China, Apr. 16-20, Z018, Source: ZTE, Sanechips, Title Consideration on beam failure recovery for SCell.

(56) References Cited

OTHER PUBLICATIONS

R2-1804410 3GPP TSG-RAN WG2 Meeting #101, Sanya, China, Apr. 16-20, Z018, Source: Huawei, HiSilicon, Title Beam failure recovery using MAC CE.
R2-1804411 3GPP TSG-RAN WG2 Meeting #101, Sanya, China, Apr. 16-20, Z018, Source: Huawei, HiSilicon, Title BWP issues for BFR.
R2-1804434 3GPP TSG-RAN WG2 Meeting #101, Sanya, China, Apr. 16-20, Z018, Source: OPPO, Title: Issues on supporting SCell BFR RACH.
R2-1804481 3GPP TSG-RAN WG2 Meeting #101, Sanya, China, Apr. 16-20, Z018, Source: CATT, Title: Leftover issues for BFR.
R2-1804482 3GPP TSG-RAN WG2 Meeting #101, Sanya, China, Apr. 16-20, 2018, Source: CATT, Title: BFR configurations and fallback options.
R2-1804483 3GPP TSG-RAN WG2 Meeting #101, Sanya, China, Apr. 16-20, 2018, Source: CATT, Title: BFR on SCell.
R2-1804696 3GPP TSG-RAN WG2 Meeting #101, Sanya, China, Apr. 16-20, 2018, Source: vivo, Title: Discussion on the SCell BFR.
R1-1719423 3GPP TSG RAN WG1 Meeting #91, Reno, USA, Nov. 27-Dec. 1, 2017, Source: Huawei, HiSilicon, Title: Remaining details on beam failure recovery.
R1-1719619 3GPP TSG RAN WG1 Meeting #91, Reno, USA, Nov. 27-Dec. 1, 2017, Source: Fujitsu, Title: Discussion on beam failure recovery.
R1-1719633 3GPP TSG RAN WG1 Meeting #91, Reno, USA, Nov. 27-Dec. 1, 2017, Source: AT&T, Title: Remaining Details on Mechanisms to Recover from Beam Failure.
R1-1719695 3GPP TSG RAN WG1 Meeting #91, Reno, USA, Nov. 27-Dec. 1, 2017, Source: Spreadtrum Communications, Title: Remaining issues on beam failure recovery mechanism.
R1-1719770 3GPP TSG RAN WG1 Meeting #91, Reno, USA, Nov. 27-Dec. 1, 2017, Source: vivo, Title: Remaining details on mechanism to recover from beam failure.
R1-1719809 3GPP TSG RAN WG1 Meeting #91, Reno, USA, Nov. 27-Dec. 1, 2017, Source: Huawei, HiSilicon, Title: Design of PUCCH-based Beam Failure Recovery.
R1-1719908 3GPP TSG RAN WG1 Meeting #91, Reno, USA, Nov. 27-Dec. 1, 2017, Source: LG Electronics, Title: Discussion on beam failure recovery.
R1-1719988 3GPP TSG RAN WG1 Meeting #91, Reno, USA, Nov. 27-Dec. 1, 2017, Source: Discussion on Beam Recovery Mechanism.
R1-1720072 3GPP TSG RAN WG1 Meeting #91, Reno, USA, Nov. 27-Dec. 1, 2017, Source: Intel Corporation, Title: Remaining Issues on Beam Failure Recovery.
R1-1720291 3GPP TSG RAN WG1 Meeting #91, Reno, USA, Nov. 27-Dec. 1, 2017, Source Samsung, Title: Beam failure recovery.
R1-1720305 3GPP TSG RAN WG1 Meeting #91, Reno, USA, Nov. 27-Dec. 1, 2017, Source: Samsung, Title: Discussion on cross-carrier beam management.
R1-1720574 3GPP TSG RAN WG1 Meeting #91, Reno, USA, Nov. 27-Dec. 1, 2017, Source: NEC, Title: On Partial Beam Failure Recovery.
R1-1720631 3GPP TSG RAN WG1 Meeting #91, Reno, USA, Nov. 27-Dec. 1, 2017, Source: InterDigital, Inc., Title: Remaining issues on beam recovery.
R1-1720804 3GPP TSG RAN WG1 Meeting #91, Reno, USA, Nov. 27-Dec. 1, 2017, Source: NTT Docomo, Title: Remaining issue on beam recovery.
R1-1720891 3GPP TSG RAN WG1 Meeting #91, Reno, USA, Nov. 27-Dec. 1, 2017, Source: Nokia, Nokia Shanghai Bell, Title: Beam Recovery in NR.
R1-1721523 3GPP TSG RAN WG1 Meeting #91, Reno, USA, Nov. 27-Dec. 1, 2017, Source: NTT Docomo, Samsung, Mediatek, AT&T, ZTE, Intel, Huawei, CATT, Qualcomm, Fujitsu, Spreadtrum, Title: WF for handling partial beam failure.
R1-1721673 3GPP TSG RAN WG1 Meeting #91, Reno, USA, Nov. 27-Dec. 1, 2017, Source: NTT Docomo, Intel, Huawei, NEC, Spreadtrum, Mediatek, China Telecom, AT&T, Samsung, ZTE, CATT, Qualcomm, Fujitsu, Nokia, Title: WF for handling partial beam failure.
R1-1800100 3GPP TSG RAN WG1 Meeting Ad Hoc, Vancouver, Canada, Jan. 22-26, 2018, Source: Huawei, HiSilicon, Title: Summary of remaining issues of beam measurement, reporting and indication.
R1-1800101 3GPP TSG RAN WG1 Meeting Ad Hoc, Vancouver, Canada, Jan. 22-26, 2018, Source: Huawei, HiSilicon, Title: Summary of remaining issues on beam failure recovery.
R1-1800110 3GPP TSG RAN WG1 Meeting Ad Hoc, Vancouver, Canada, Jan. 22-26, 2018, Source: ZTE, Sanechips, Title: Remaining details on bean management.
R1-1800111 3GPP TSG RAN WG1 Meeting Ad Hoc, Vancouver, Canada, Jan. 22-26, 2018, Source: ZTE, Sanechips, Title: Remaining details on mean management.
R1-1800312 3GPP TSG RAN WG1 Meeting Ad Hoc, Vancouver, Canada, Jan. 22-26, 2018, Source: Intel Corporation, Title: Remaining Issues on Beam Failure Recovery.
R1-1800526 3GPP TSG RAN WG1 Meeting Ad Hoc, Vancouver, Canada, Jan. 22-26, 2018, Source: Huawei, HiSilicon, Title: Remaining details of PHR.
R1-1800542 3GPP TSG RAN WG1 Meeting Ad Hoc, Vancouver, Canada, Jan. 22-26, 2018, Source: CMCC, Title: Discussion on remaining issues for beam indication.
R1-1800543 3GPP TSG RAN WG1 Meeting Ad Hoc, Vancouver, Canada, Jan. 22-26, 2018, Source: CMCC, Title: Discussion on beam recovery mechanism.
R1-1800582 3GPP TSG RAN WG1 Meeting Ad Hoc, Vancouver, Canada, Jan. 22-26, 2018, Source: AT&T, Title: TCI states configuration design to support dynamic BWP switching.
R1-1800583 3GPP TSG RAN WG1 Meeting Ad Hoc, Vancouver, Canada, Jan. 22-26, 2018, Source: AT&T, Title: In support of partial beam failure.
R1-1800622 3GPP TSG RAN WG1 Meeting Ad Hoc, Vancouver, Canada, Jan. 22-26, 2018, Source: ASUSTeK, Title: Remaining Issues for Beam Failure Recovery Procedure.
R1-1800629 3GPP TSG RAN WG1 Meeting Ad Hoc, Vancouver, Canada, Jan. 22-26, 2018, Source: InterDigital, Inc., Title: Remaining details on beam failure recovery.
R1-1800642 3GPP TSG RAN WG1 Meeting Ad Hoc, Vancouver, Canada, Jan. 22-26, 2018, Source: ITRI, Title: Discussion on timer for beam failure recovery.
R1-1800660 3GPP TSG RAN WG1 Meeting Ad Hoc, Vancouver, Canada, Jan. 22-26, 2018, Source: NTT Docomo, Title: Remaining Issue on Beam Indication.
R1-1800661 3GPP TSG RAN WG1 Meeting Ad Hoc, Vancouver, Canada, Jan. 22-26, 2018, Source: NTT Docomo, Title: Remaining issue on beam recovery.
R1-1800682 3GPP TSG RAN WG1 Meeting Ad Hoc, Vancouver, Canada, Jan. 22-26, 2018, Source: NTT Docomo, Inc., Title: Remaining issues on PHR.
R1-1800699 3GPP TSG RAN WG1 Meeting Ad Hoc, Vancouver, Canada, Jan. 22-26, 2018, Source: Ericsson, Title: Remaining details on beam management.
R1-1800700 3GPP TSG RAN WG1 Meeting Ad Hoc, Vancouver, Canada, Jan. 22-26, 2018, Source: Ericsson, Title: Remaining details and corrections for beam recovery.
R1-1800734 3GPP TSG RAN WG1 Meeting Ad Hoc, Vancouver, Canada, Jan. 22-26, 2018, Source: InterDigital, Inc., Title: Remaining issues on beam management.
R1-1800751 3GPP TSG RAN WG1 Meeting Ad Hoc, Vancouver, Canada, Jan. 22-26, 2018, Source: Nokia, Nokia Shanghai Bell, Title: Remaining details on beam indication, measurement and reporting.
R1-1800752 3GPP TSG RAN WG1 Meeting Ad Hoc, Vancouver, Canada, Jan. 22-26, 2018, Source: Nokia, Nokia Shanghai Bell, Title: Remaining Details on Beam Recovery.
R1-1800859 3GPP TSG RAN WG1 Meeting Ad Hoc, Vancouver, Canada, Jan. 22-26, 2018, Source: Qualcomm, Title: Beam management for NR.

(56) References Cited

OTHER PUBLICATIONS

R1-1800860 3GPP TSG RAN WG1 Meeting Ad Hoc, Vancouver, Canada, Jan. 22-26, 2018, Source: Qualcomm Incorporated, Title: Remaining details on beam recovery procedure.
R1-1801006 3GPP TSG RAN WG1 Meeting Ad Hoc, Vancouver, Canada, Jan. 22-26, 2018, Source: Ericsson, Title; Feature lead summary 1 of beam measurement and reporting.
R1-1801089 3GPP TSG RAN WG1 Meeting Ad Hoc, Vancouver, Canada, Jan. 22-26, 2018, Source: Media Tec Inc., Title: Summary for Remaining issue on Beam Failure Recovery.
R1-1801143 3GPP TSG RAN WG1 Meeting Ad Hoc, Vancouver, Canada, Jan. 22-26, 2018, Source: Ericsson, Title: Feature lead summary 2 of beam measurement and reporting.
R1-1801160 3GPP TSG RAN WG1 Meeting Ad Hoc, Vancouver, Canada, Jan. 22-26, 2018, Source: NTT Docomo, Qualcomm, Huawei, HiSilicon, ZTE, Sanechips, Fujitsu, Title: Updated offline proposal on PHR.
R1-1801187 3GPP TSG RAN WG1 Meeting Ad Hoc, Vancouver, Canada, Jan. 22-26, 2018, Source: Ericsson, Title: Feature lead summary 3 of beam measurement and reporting.
R1-1801197 3GPP TSG RAN WG1 Meeting Ad Hoc, Vancouver, Canada, Jan. 22-26, 2018, Source: MediaTek Inc., Title: Offline Summary for Remaining issues on Beam Failure Recovery.
R1-1801223 3GPP TSG RAN WG1 Meeting Ad Hoc, Vancouver, Canada, Jan. 22-26, 2018, Source: MediaTek Inc., Title: Offline Discussion Summary for Beam Failure Recovery.
R1-1801228 3GPP TSG RAN WG1 Meeting Ad Hoc, Vancouver, Canada, Jan. 22-26, 2018, Source: Ericsson, Title: Text proposal on source QCL for semi-persistent CSI-RS.
R1-1801229 3GPP TSG RAN WG1 Meeting Ad Hoc, Vancouver, Canada, Jan. 22-26, 2018, Source: Ericsson, Title: Text proposal for source spatial relation for semi-persistent SRS.
R1-1801230 3GPP TSG RAN WG1 Meeting Ad Hoc, Vancouver, Canada, Jan. 22-26, 2018, Source: Ericsson, Title: Text proposal on priority rules for PUCCH carrying RSRP reports and SRS.
Sep. 25, 2019—European Extended Search Report—EP 19166863.1.
R1-1803368 3GPP TSG RAN WG1 Meeting #92, Athens, Greece, Feb. 26-Mar. 2, 2018, Source: [RAN1], Title: Draft LS reply to RAN2 on beam failure recovery.
R1-1803441 3GPP TSG RAN WG1 Meeting #92, Athens, Greece, Feb. 26-Mar. 2, 2018, Source: MediaTek Inc., Title: Summary 2 on Remaing issues on Beam Failure Recovery.
R1-1801454 3GPP TSG RAN WG1 Meeting #92, Athens, Greece, Feb. 26-Mar. 2, 2018, Source: Huawei, HiSilicon, Title: Remaining issues on beam failure recovery.
R1-1801722 3GPP TSG RAN WG1 Meeting #92, Athens, Greece, Feb. 26-Mar. 2, 2018, Source: CATT, Title: Remaining issues on DL beam failure recovery.
R1-1802393 3GPP TSG RAN WG1 Meeting #92, Athens, Greece, Feb. 26-Mar. 2, 2018, Source: Intel Corporation, Title: On beam management issues for mutli-CC operation.
R1-1802397 3GPP TSG RAN WG1 Meeting #92, Athens, Greece, Feb. 26-Mar. 2, 2018, Source: Intel Corporation, Title: Remaining Issues on Beam Failure Recovery.
R1-1802472 3GPP TSG RAN WG1 Meeting #92, Athens, Greece, Feb. 26-Mar. 2, 2018, Source: NTT Docomo, Title: Remaining issues on beam recovery.
R1-1802557 3GPP TSG RAN WG1 Meeting #92, Athens, Greece, Feb. 26-Mar. 2, 2018, Source: Nokia, Nokia Shanghai Bell, Title: Remaining Details on Beam Recovery.
R1-1802593 3GPP TSG RAN WG1 Meeting #92, Athens, Greece, Feb. 26-Mar. 2, 2018, Source: AT&T, Title: In support of partial beam failure.
R1-1802744 3GPP TSG RAN WG1 Meeting #92, Athens, Greece, Feb. 26-Mar. 2, 2018, Source: Ericsson, Title: Remaining details on beam recovery.
R1-1802824 3GPP TSG RAN WG1 Meeting #92, Athens, Greece, Feb. 26-Mar. 2, 2018, Source: Qualcomm Incorporated, Title: Beam recovery procedures.

R1-1803397 3GPP TSG RAN WG1 Meeting #92, Athens, Greece, Feb. 26-Mar. 2, 2018, Source: CATT, Title: Summary of Email Discussion on Beam Failure Recovery on Scell.
R1-1803745 3GPP TSG-RAN WG1 Meeting #92bis, Sanya, China, Apr. 16-20, 2018, Source: CATT, Title: Remaining Details on Beam Failure Recovery.
R1-1804210 3GPP TSG-RAN WG1 Meeting #92bis, Sanya, China, Apr. 16-20, 2018, Source: Lenovo, Motorola Mobility, Title: Discussion of Beam Measurement for Carrier Aggregation.
R1-1804363 3GPP TSG-RAN WG1 Meeting #92bis, Sanya, China, Apr. 16-20, 2018, Source: Samsung, Title: Simultaneous Reception of Physical Channels and Reference Signals.
R1-1804789 3GPP TSG-RAN WG1 Meeting #92bis, Sanya, China, Apr. 16-20, 2018, Source: Qualcomm Incorporated, Title: Details on Simultaneous Reception/Transmission of PHY Channels and RS in FR2.
R1-1804975 3GPP TSG-RAN WG1 Meeting #92bis, Sanya, China, Apr. 16-20, 2018, Source: Ericsson, Title: Remaining Issues on Beam Recovery.
R1-1804977 3GPP TSG-RAN WG1 Meeting #92bis, Sanya, China, Apr. 16-20, 2018, Source: Ericsson, Title: On Simultaneous Reception of Physical and Reference Signals Across CCs.
R1-1805538 3GPP TSG-RAN WG1 Meeting #92bis, Sanya, China, Apr. 16-20, 2018, Source: NTT Docomo, Inc., Title: Offline Summary for AI 7.1.3.1.2 Search Space.
R1-1806616 3GPP TSG-RAN WG1 #93, Busan, Korea, May 21-25, 2018, Source: LG Electronics, Title: Remaining Issues on Search Space.
R1-1806729 3GPP TSG-RAN WG1 #93, Busan, Korea, May 21-25, 2018, Source: Samsung, Title: Corrections on Search Space Design.
R2-1707999 3GPP TSG-RAN WG2 #99, Beriin, Germany, Aug. 21-25, 2017, Source: MediaTek Inc., Title: Beam Management and Beam Recovery in MAC.
R2-1708677 3GPP TSG RAN WG2 #99, Berlin, Germany, Aug. 21-25, 2017, Source: Nokia, Nokia Shanghai Bell, Title: Beam Recovery in NR.
R2-1708697 3GPP TSG RAN WG2 #99, Berlin, Germany, Aug. 21-25, 2017, Source: Huawei, HiSilicon, Title: Handling of Resources for Beam Failure Recovery.
R2-1709085 3GPP TSG-RAN WG2 #99, Berlin, Germany, Aug. 21-25, 2017, Source: Qualcomm Incorporated, Title: Beam Recovery Request.
R2-1709320 3GPP TSG-RAN WG2 #99, Berlin, Germany, Aug. 21-25, 2017, Source: ASUSTeK, Title: Discussion on Beam Recover Request in NR.
R2-1800042 3GPP TSG-RAN WG2 AH, Vancouver, Canada, Jan. 22-26, 2018, Source: ASUSTeK, Title: Discussion on Beam Failure Recovery Request in NR.
R2-1800049 3GPP TSG-RAN WG2 AH, Vancouver, Canada, Jan. 22-26, 2018, Source: ASUSTeK, Title: UE Behaviours Upon Beam Failure and Recovery.
R2-1800168 3GPP TSG-RAN WG2 AH, Vancouver, Canada, Jan. 22-26, 2018, Source: CATT, Title: Solution for PH Type Inconsistency Between RAN1 and RAN2.
R2-1800169 3GPP TSG-RAN WG2 AH, Vancouver, Canada, Jan. 22-26, 2018, Source: CATT, Title: PHR MAC CE for EN-DC.
R2-1800231 3GPP TSG-RAN WG2 #100, Reno, USA, Nov. 27-Dec. 1, 2017, Source: Xiaomi, Title: Consideration on PHR Trigger Condition for Supporting SUL.
R2-1800253 3GPP TSG-RAN WG2 AH, Vancouver, Canada, Jan. 22-26, 2018, Source: ASUSTeK, Title: Pathloss Change for Triggering PHR.
R2-1800254 3GPP TSG-RAN WG2 AH, Vancouver, Canada, Jan. 22-26, 2018, Source: CATT, Title: RA Procedure and Parameters for BFR.
R2-1800343 3GPP TSG-RAN WG2 AH, Vancouver, Canada, Jan. 22-26, 2018, Source: Ericsson, Title: PHR Format for SUL.
R2-1800614 3GPP TSG-RAN WG2 AH, Vancouver, Canada, Jan. 22-26, 2018, Source: Samsung, Title: Support for Type 2 PH in NR.
R2-1800619 3GPP TSG-RAN WG2 AH, Vancouver, Canada, Jan. 22-26, 2018, Source: Samsung, Title: SUL and PHR.

(56) References Cited

OTHER PUBLICATIONS

R2-1800642 3GPP TSG-RAN WG2 AH, Vancouver, Canada, Jan. 22-26, 2018, Source: Huawei, HiSilicon, Title: PHR Alignment Between RAN1 and RAN2.
R2-1800680 3GPP TSG-RAN WG2 AH, Vancouver, Canada, Jan. 22-26, 2018, Source: Lenovo, Motorola Mobility, Title: PHR for NR CA.
R2-1800822 3GPP TSG-RAN WG2 AH, Vancouver, Canada, Jan. 22-26, 2018, Source: Spreadtrum Communications, Title: Beam Failure Recovery Clarification.
R2-1801008 3GPP TSG-RAN WG2 AH, Vancouver, Canada, Jan. 22-26, 2018, Source: Huawei, HiSilicon, Title: Discussion on Power Sharing and its Impact on PHR for EN-DC.
R2-1801009 3GPP TSG-RAN WG2 AH, Vancouver, Canada, Jan. 22-26, 2018, Source: Huawei, HiSilicon, Title: General Consideration on RA Procedure for Beam Failure Recovery.
R2-1801041 TSG-RAN WG2 AH, Vancouver, Canada, Jan. 22-26, 2018, Source: Huawei, HiSilicon, Title: Remaining Issue of Power Management in NR.
R2-1801043 3GPP TSG-RAN WG2 AH, Vancouver, Canada, Jan. 22-26, 2018, Source: Huawei, HiSilicon, Title: Consideration of PHR with Multi-Beam Operation.
R2-1801404 TSG-RAN WG2 AH, Vancouver, Canada, Jan. 22-26, 2018, Source: NTT Docomo, Inc., Title: Discussion on Beam Failure Recovery.
R2-1801406 3GPP TSG-RAN WG2 AH, Vancouver, Canada, Jan. 22-26, 2018, Source: NTT Docomo, Inc., Title: Remaining Issue on PHR.
R2-1801539 3GPP TSG-RAN WG2 AH, Vancouver, Canada, Jan. 22-26, 2018, Source: CATT, Title: PHR MAC CE for EN-DC.
R2-1801540 3GPP TSG-RAN WG2 AH, Vancouver, Canada, Jan. 22-26, 2018, Source: CATT, Title: Correction on PHR MAC CE in EN-DC in TS38.321.
R2-1801564 3GPP TSG-RAN WG2 AH, Vancouver, Canada, Jan. 22-26, 2018, Source: NTT Docomo, Inc., Title: LS on PHR.
R2-1801568 3GPP TSG-RAN WG2 AH, Vancouver, Canada, Jan. 22-26, 2018, Source: Ran WG2, Title: LS on PHR.
R2-1801814 3GPP TSG-RAN WG2 #101, Athens, Greece, Feb. 26-Mar. 2, 2018, Source: Huawei, HiSilicon, Title: Beam Failure Recovery on SCell.
R2-1802490 3GPP TSG-RAN WG2 #101, Athens, Greece, Feb. 26-Mar. 2, 2018, Source: CATT, Huawei, HiSilicon, Title: Discussion on Beam Failure Recovery for CE.
Aug. 27, 2019—European Extended Search Report—EP 19173892.1.
3GPP TSG-RAN WG1 #89: "Beam failure recovery mechanism", May 15, 2017.
3GPP TSG-RAN WG2 Meeting#AH: "Random access procedure for beam recovery request", Jun. 27, 2017.
R2-1805204 3GPP TSG-RAN WG2 Meeting #101, Sanya, China, Apr. 16-20, 2018, Source: Lenovo, Motorola Mobility, Title: Dedicated PRACH resource for beam failure recovery.
R2-1805414 3GPP TSG-RAN WG2 Meeting #101, Sanya, China, Apr. 16-20, 2018, Source: Ericsson, Title: Beam Failure Recovery in SCell and contention-based BFR on SpCell.
R2-1805896 3GPP TSG-RAN WG2 Meeting #101, Sanya, China, Apr. 16-20, 2018, Source: Huawei, HiSilicon, Title: ASN.1 for Beam Failure Recovery.
R2-1805905 3GPP TSG-RAN WG2 Meeting #101, Sanya, China, Apr. 16-20, 2018, Source: Huawei, HiSilicon, Title: Discussions on RA for SCells BFR.
R2-1806120 3GPP TSG-RAN WG2 Meeting #101, Sanya, China, Apr. 16-20, 2018, Source: ITL, Title: Beam Failure Recovery on SCell.
R2-1806166 3GPP TSG-RAN WG2 Meeting #101, Sanya, China, Apr. 16-20, 2018, Source: MediaTek, Inc., Title: On switching between CFRA and CBRA.
R2-1806774 3GPP TSG-RAN WG2 Meeting #102, Sanya, China, Apr. 16-20, 2018, Source: Nokia, Nokia Shanghai Bell, Title: Finalization of dormant SCell state.

R2-1806819 3GPP TSG-RAN WG2 Meeting #102, Busan, Korea, May 21-25, 2018, Source: Samsung, Title: MAC Impacts: Beam Failure Recovery for SCell.
R2-1806924 3GPP TSG-RAN WG2 Meeting #102, Busan, Korea, May 21-25, 2018, Source: Qualcomm, Inc., Title: SCell Dormant State Transitions based on New Timers & MAC-CEs.
R2-1806998 3GPP TSG-RAN WG2 Meeting #102, Busan, Korea, May 21-25, 2018, Source: CATT, Title: The validity of CFRA resources for BFR.
R2-1807160 3GPP TSG-RAN WG2 Meeting #102, Busan, Korea, May 21-25, 2018, Source: Panasonic, Title: Timer associated with the dedicated BFR PRACH resource.
R2-1807405 3GPP TSG-RAN WG2 Meeting #102, Busan, Korea, May 21-25, 2018, Source: ZTE, Title: Discussion on the beam failure recovery timer.
R2-1807415 3GPP TSG-RAN WG2 Meeting #102, Busan, Korea, May 21-25, 2018, Source: OPPO, Title: MAC impacts on supporting BFR procedure on SCell.
R2-1807444 3GPP TSG-RAN WG2 Meeting #102, Busan, Korea, May 21-25, 2018, Source: Huawei, HiSilicon, Title BWP switch for BFR.
R2-1807481 3GPP TSG-RAN WG2 Meeting #102, Busan, Korea, May 21-25, 2018, Source: Huawei, HiSilicon, Title: Remaining issues of temporary CQI reporting.
R2-1807584 3GPP TSG-RAN WG2 Meeting #102, Busan, Korea, May 21-25, 2018, Source: vivo, Title: Discussion on the SCell BFR.
R2-1807961 3GPP TSG-RAN WG2 Meeting #102, Busan, Korea, May 21-25, 2018, Source: Huawei, HiSilicon, Title Discussion on BFR-config for SCell BFR.
R2-1807975 3GPP TSG-RAN WG2 Meeting #102, Busan, Korea, May 21-25, 2018, Source: Huawei, HiSilicon, Title Discussion on beam failure recovery for SCell.
R2-1808024 3GPP TSG-RAN WG2 Meeting #102, Busan, Korea, May 21-25, 2018, Source: Nokia, Nokia Shanghai Bell, Title: SCell Beam Failure Recovery.
R2-1808570 3GPP TSG-RAN WG2 Meeting #102, Busan, Korea, May 21-25, 2018, Source: Qualcomm Incorporated, Title: Dormant BWP for fast SCell activation.
R2-1808658 3GPP TSG-RAN WG2 Meeting #102, Busan, Korea, May 21-25, 2018, Source: ITL, Title: Beam failure recovery on SCell.
R2-1808809 3GPP TSG-RAN WG2 Meeting #102, Busan, Korea, May 21-25, 2018, Source: Ericsson, Title: CR on Dormat SCell state transition MAC CE.
R2-1809515 3GPP TSG RAN WG2 AH-1807, Montreal, Canada, Jul. 2-6, 2018, Source: CATT, Title: Further issues with DL BWP switching for CFRA.
R2-1809523 3GPP TSG RAN WG2 AH-1807, Montreal, Canada, Jul. 2-6, 2018, Source: CATT, Title: Further discussion on BFR termination criterion.
R2-1809721 3GPP TSG RAN WG2 AH-1807, Montreal, Canada, Jul. 2-6, 2018, Source: InterDigital, Title: BWP switching for RA-BFR.
R2-1809872 3GPP TSG RAN WG2 AH-1807, Montreal, Canada, Jul. 2-6, 2018, Source: vivo, Title: Remaining configuration issues for BFR.
R2-1809894 3GPP TSG RAN WG2 AH-1807, Montreal, Canada, Jul. 2-6, 2018, Source: vivo, Title: Preamble Selection when CFRA Resource Available.
R2-1809925 3GPP TSG RAN WG2 AH-1807, Montreal, Canada, Jul. 2-6, 2018, Source: OPPO, Title: The issue of BWP switching for BFR RACH.
R2-1810008 3GPP TSG RAN WG2 AH-1807, Montreal, Canada, Jul. 2-6, 2018, Source: Sharp, Title: Remaining issues on DL BWP switching upon RACH procedure initiation.
R2-1810063 3GPP TSG RAN WG2 AH-1807, Montreal, Canada, Jul. 2-6, 2018, Source: Ericsson, Title: Dormant SCell state in NR.
R2-1810091 3GPP TSG RAN WG2 AH-1807, Montreal, Canada, Jul. 2-6, 2018, Source: Huawei, HiSilicon, Title: BWP switch for BFR.
R2-1810424 3GPP TSG RAN WG2 AH-1807, Montreal, Canada, Jul. 2-6, 2018, Source: Qualcomm Inc., Title: BFD procedure in DRX mode.

(56) References Cited

OTHER PUBLICATIONS

R2-1810513 3GPP TSG RAN WG2 AH-1807, Montreal, Canada, Jul. 2-6, 2018, Source: Huawei, HiSilicon, Title: Clarification on RA procedure for BFR on BWPs without CBRA occasions.
R2-1810641 3GPP TSG RAN WG2 AH-1807, Montreal, Canada, Jul. 2-6, 2018, Source: Huawei, HiSilicon, Title Issues on BWP switch and search space configuration for BFR.
R2-1810643 3GPP TSG RAN WG2 AH-1807, Montreal, Canada, Jul. 2-6, 2018, Source: Huawei, HiSilicon, Title RACH configuration on BWPs.
R2-1810797 3GPP TSG RAN WG2 AH-1807, Montreal, Canada, Jul. 2-6, 2018, Source: CATT, Title: Offline discussion #100 on DL-UL linking for CFRA.
R2-1811482 3GPP TSG RAN WG2 Meeting #103, Gothenburg, Sweden, Aug. 20-24, 2018, Source: ZTE, Sanechips, Title: Consideration on implicit configuration of RS for BFD.
R2-1811896 3GPP TSG RAN WG2 Meeting #103, Gothenburg, Sweden, Aug. 20-24, 2018, Source: Huawei, HiSilicon, Title: BWP switch for BFR.
R2-181Z639 3GPP TSG RAN WG2 Meeting #103, Gothenburg, Sweden, Aug. 20-24, 2018, Source: LG Electronics Inc., Title: BWP operation for BFR RA.
R2-1814198 3GPP TSG RAN WG2 Meeting #103bis, Chengdu, China, Oct. 8-12, 2018, Source: vivo, Title: Clarification on the beam change during BFR.
RP-181344 3GPP TSG RAN Meeting #80, La Jolla, USA, Jun. 11-14, 2018, Source: Ericsson, Nokia, Nokia Shanghai Bell, Huawei, Title: New WID on MR-DC enhancements (NR_MRDC_Enh).
U.S. Appl. No. 16/101,189, Priority of Beam Failure Recovery Request and Uplink Channels, filed Aug. 10, 2018.
U.S. Appl. No. 16/101,239, Resource Configuration of Beam Failure Recovery Request Transmission, filed Aug. 10, 2018.
U.S. Appl. No. 16/101,283, Transmission Power Control for Beam Failure Recovery Requests, filed Aug. 10, 2018.
U.S. Appl. No. 16/101,307, Beam Failure Recovery Request Transmission, filed Aug. 10, 2018.
U.S. Appl. No. 16/125,434, Unified Downlink Control Information for Beam Management, filed Sep. 7, 2018.
U.S. Appl. No. 16/193,971, Beam Paging Assistance, filed Nov. 16, 2018.
U.S. Appl. No. 16/243,714, Beam Selection in Beam Failure Recovery Request Retransmission, filed Jan. 9, 2019.
U.S. Appl. No. 16/271,435, Beam Failure Recovery in Carrier Aggregation, filed Feb. 8, 2019.
U.S. Appl. No. 16/277,400, Beam Failure Report, filed Feb. 15, 2019.
U.S. Appl. No. 16/354,752, Downlink Partial Beam Failure Recovery, filed Mar. 15, 2019.
U.S. Appl. No. 16/370,476, Configuration for Beam Failure Recovery, filed Mar. 29, 2019.
U.S. Appl. No. 16/372,858, Beam Failure Recovery, filed Apr. 2, 2019.
U.S. Appl. No. 16/409,103, Prioritization in Beam Failure Recovery Procedures, filed May 10, 2019.
Dec. 16, 2019—European Extended Search Report—EP 19191018.1.
Dec. 20, 2019—European Extended Search Report—EP 19199208.0.
R2-1811208 3GPP TSG-RAN WG2 Meeting #103, Gothenburg, Sweden, Aug. 20-24, 2018, Source: CATT, Title: UL/DL BWP linkage for PDCCH order initiated CFRA.
3GPP TS 38.321 V0.3.0 (Aug. 2017); Technical Specification; 3rd Generation Partnership Project; Technical Specification Group Radio Access Network; NR; Medium Access Control (MAC) protocol specification (Release 15).

* cited by examiner

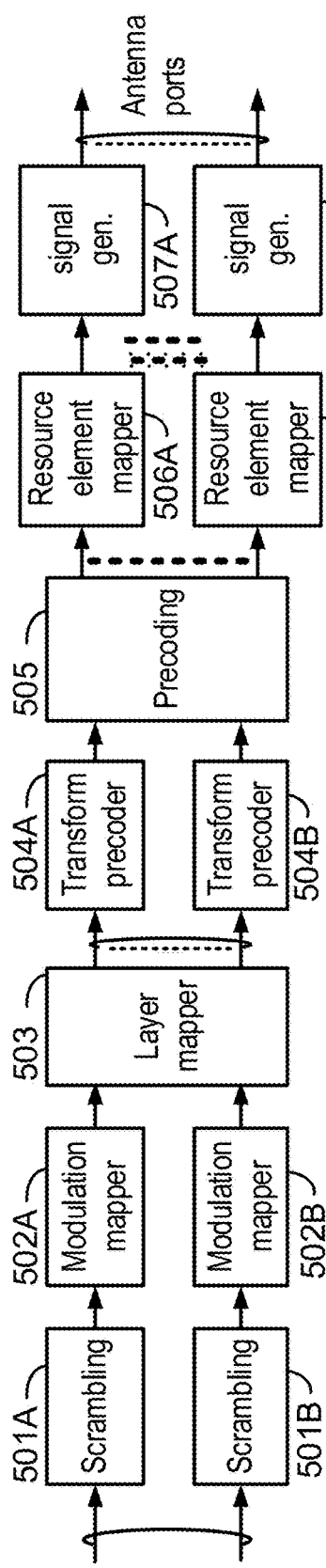
FIG. 5A Example uplink physical channel
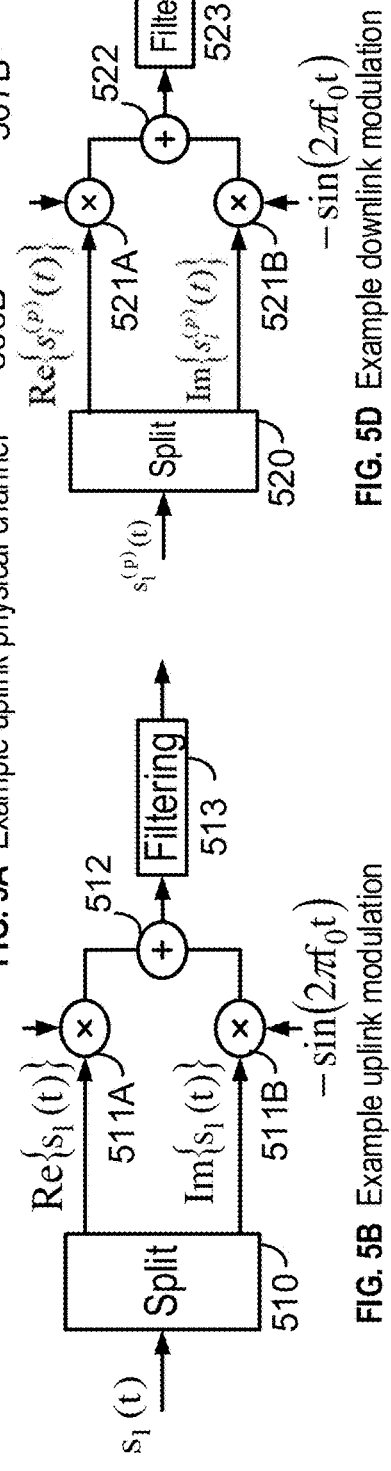
FIG. 5B Example uplink modulation
FIG. 5D Example downlink modulation
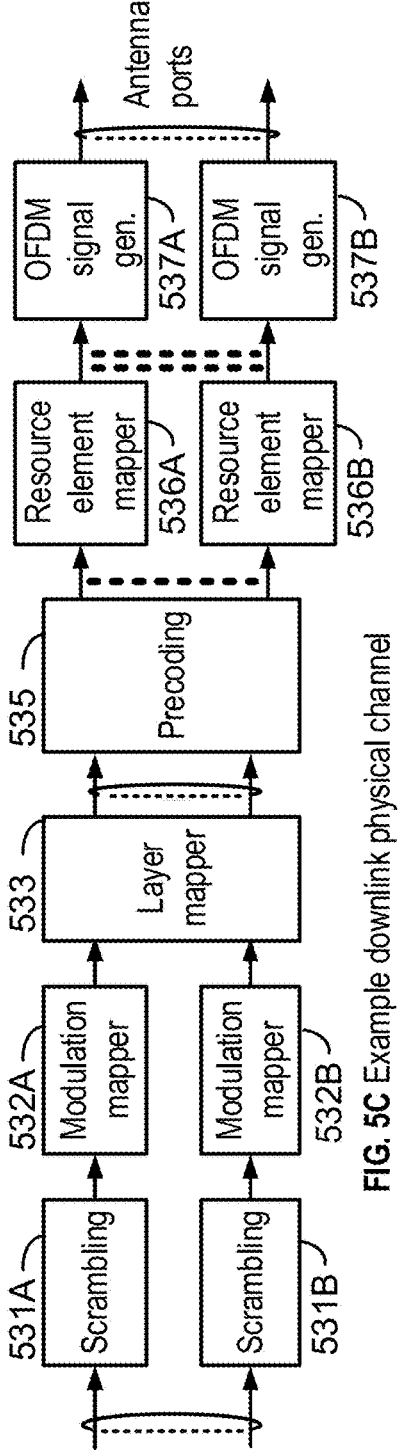
FIG. 5C Example downlink physical channel

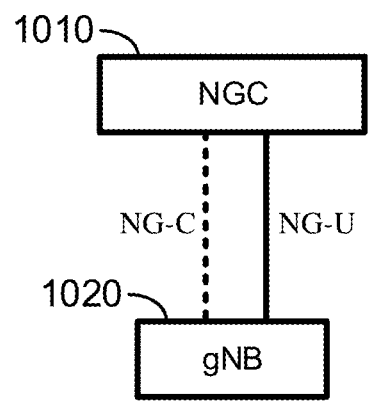
FIG. 10A gNB connected to NGC
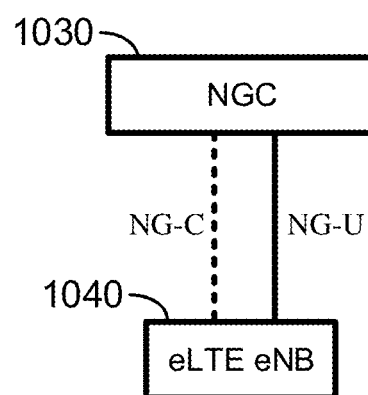
FIG. 10B eLTE eNB connected to NGC

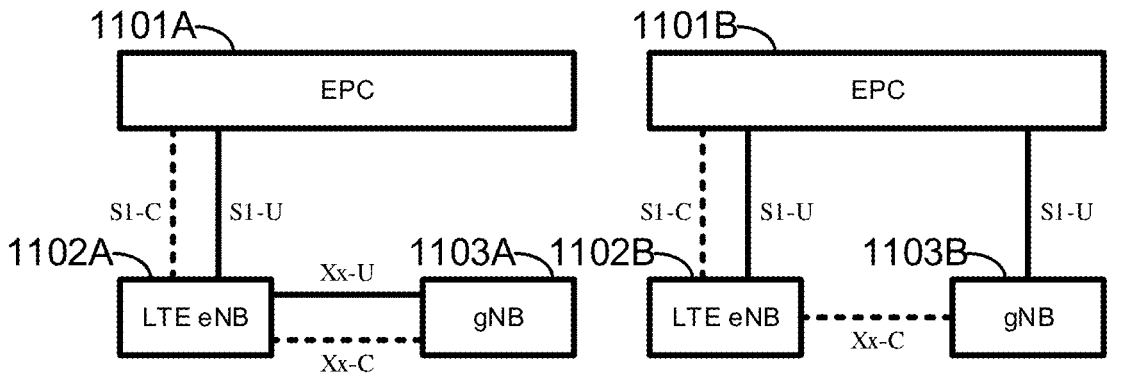

FIG. 11A LTE eNB connected to EPC with non-standalone gNB.
gNB user plane connected to EPC via LTE eNB.

FIG. 11B LTE eNB connected to EPC with non-standalone gNB.
gNB user plane connected to EPC directly.

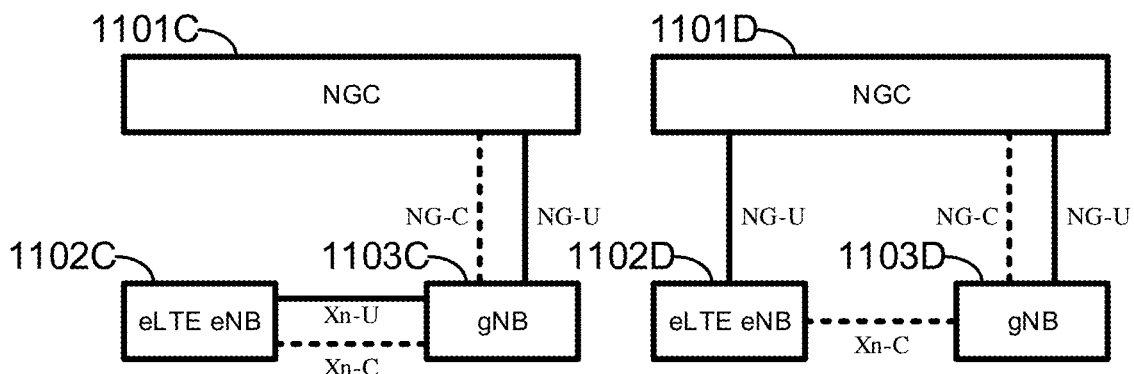

FIG. 11C gNB connected to NGC with non-standalone eLTE eNB.
eLTE eNB user plane connected to NGC via gNB.

FIG. 11D gNB connected to NGC with non-standalone eLTE eNB.
eLTE eNB user plane connected to NGC directly.

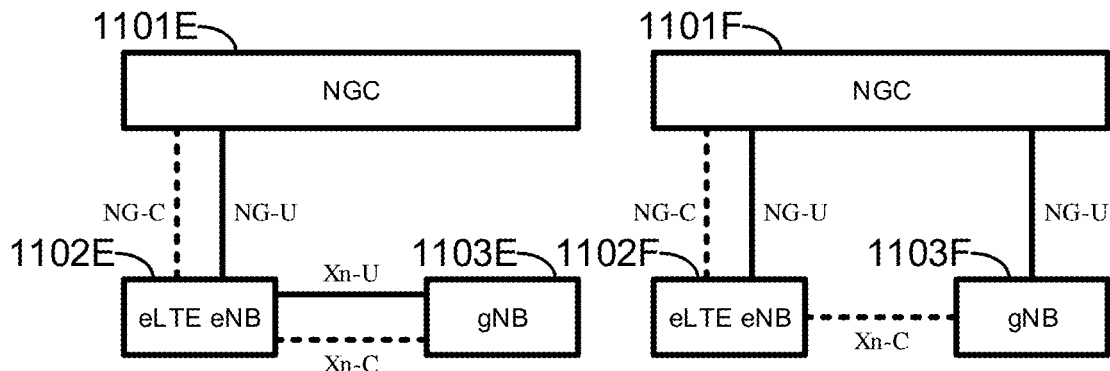

FIG. 11E eLTE eNB connected to NGC with non-standalone gNB.
gNB user plane connected to NGC via eLTE eNB.

FIG. 11F eLTE eNB connected to NGC with non-standalone gNB.
gNB user plane connected to NGC directly.

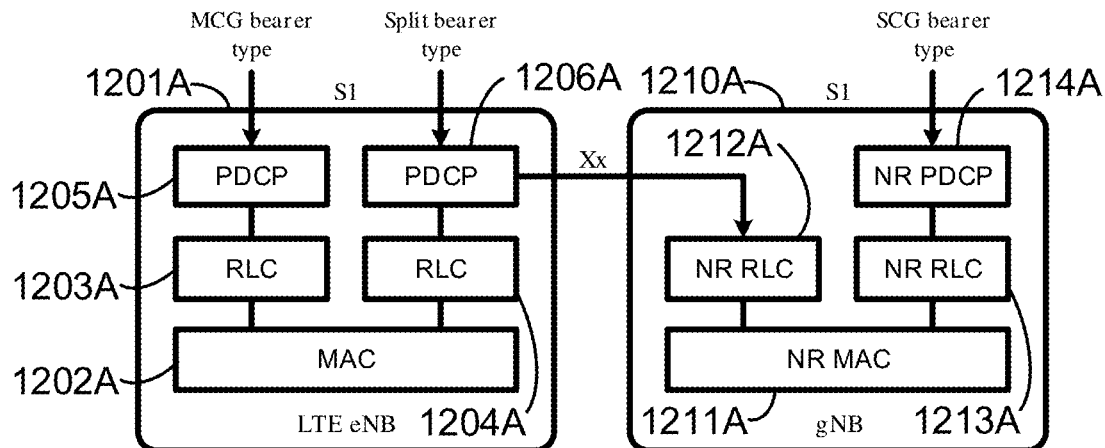
FIG. 12A Radio protocol architecture for split bearer and SCG bearer. LTE eNB connected to EPC with non-standalone gNB.
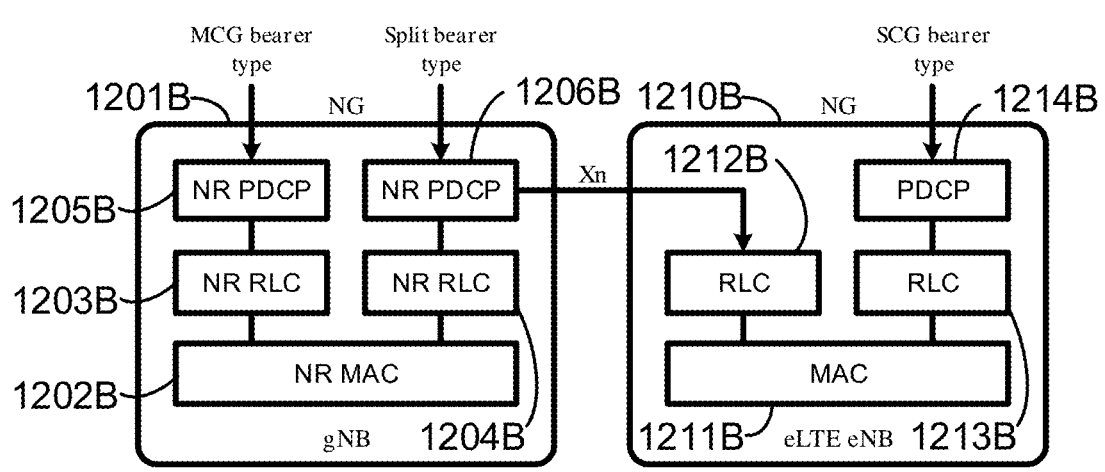
FIG. 12B Radio protocol architecture for split bearer and SCG bearer. gNB connected to NGC with non-standalone eLTE eNB.
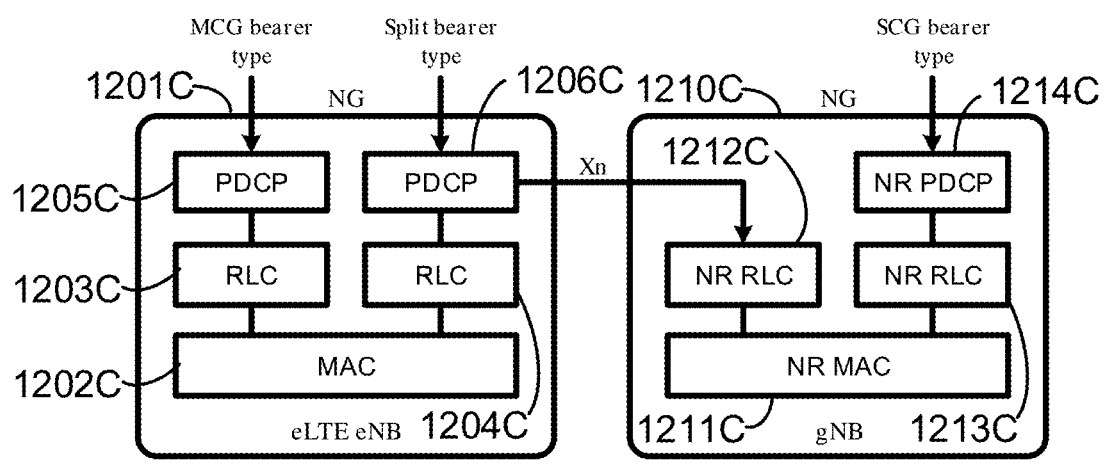
FIG. 12C Radio protocol architecture for split bearer and SCG bearer. eLTE eNB connected to NGC with non-standalone gNB.

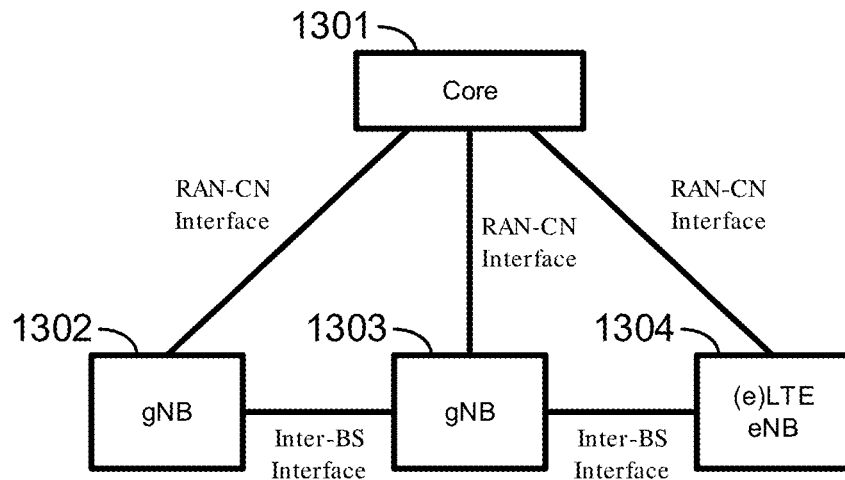
FIG. 13A Non-centralized deployment
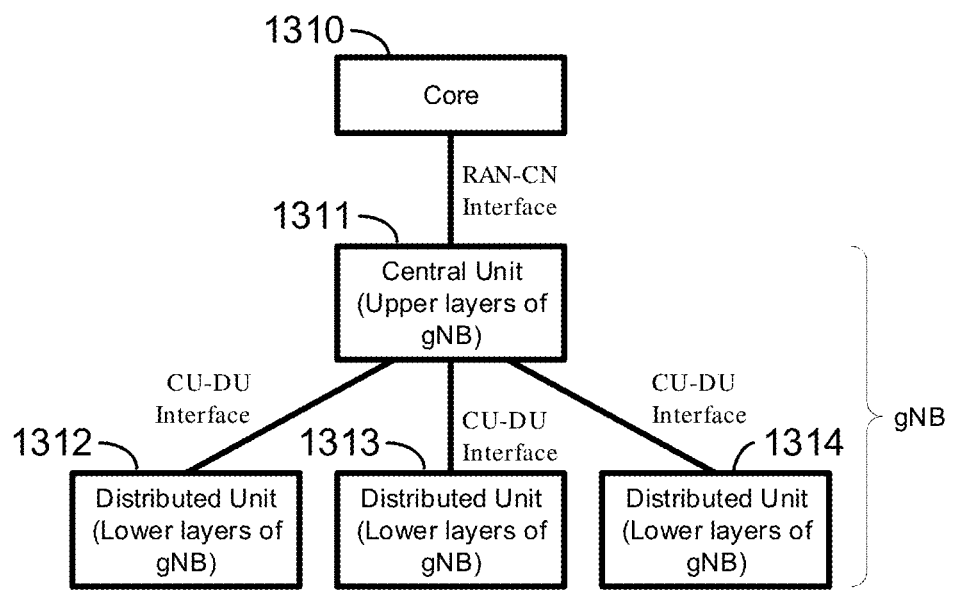
FIG. 13B Centralized deployment

```
PhysicalConfigDedicated ::=        SEQUENCE {
    pdsch-ConfigDedicated           PDSCH-ConfigDedicated           OPTIONAL,   -- Need ON
    pucch-ConfigDedicated           PUCCH-ConfigDedicated           OPTIONAL,   -- Need ON
    pusch-ConfigDedicated           PUSCH-ConfigDedicated           OPTIONAL,   -- Need ON
    uplinkPowerControlDedicated     UplinkPowerControlDedicated     OPTIONAL,   -- Need ON
    tpc-PDCCH-ConfigPUCCH           TPC-PDCCH-Config                OPTIONAL,   -- Need ON
    tpc-PDCCH-ConfigPUSCH           TPC-PDCCH-Config                OPTIONAL,   -- Need ON
...
    cqi-ReportConfig-v1130          CQI-ReportConfig-v1130          OPTIONAL,   -- Need ON
...
}
CQI-ReportConfig-v1130 ::= SEQUENCE {
    cqi-ReportPeriodic-v1130        CQI-ReportPeriodic-v1130,
    cqi-ReportBoth-r11              CQI-ReportBoth-r11
}
CQI-ReportBoth-r11 ::=          SEQUENCE {
    csi-IM-ConfigToReleaseList-r11  CSI-IM-ConfigToReleaseList-r11  OPTIONAL,   -- Need ON
    csi-IM-ConfigToAddModList-r11   CSI-IM-ConfigToAddModList-r11   OPTIONAL,   -- Need ON
    csi-ProcessToReleaseList-r11    CSI-ProcessToReleaseList-r11    OPTIONAL,   -- Need ON
    csi-ProcessToAddModList-r11     CSI-ProcessToAddModList-r11     OPTIONAL    -- Need ON
}
CSI-ProcessToAddModList-r11 ::=    SEQUENCE (SIZE (1..maxCSI-Proc-r11)) OF CSI-Process-r11
CSI-Process-r11 ::=      SEQUENCE {
    csi-ProcessId-r11           CSI-ProcessId-r11,
    csi-RS-ConfigNZPId-r11      CSI-RS-ConfigNZPId-r11,
    csi-IM-ConfigId-r11         CSI-IM-ConfigId-r11,
    p-C-AndCBSRList-r11         P-C-AndCBSR-Pair-r13a,
    cqi-ReportBothProc-r11      CQI-ReportBothProc-r11          OPTIONAL,   -- Need OR
    cqi-ReportPeriodicProcId-r11 INTEGER (0..maxCQI-ProcExt-r11) OPTIONAL,   -- Need OR
    cqi-ReportAperiodicProc-r11 CQI-ReportAperiodicProc-r11     OPTIONAL,   -- Need OR
    ...,
    [[ alternativeCodebookEnabledFor4TXProc-r12  ENUMERATED {true}  OPTIONAL, -- Need ON
        csi-IM-ConfigIdList-r12     CHOICE {
            release                 NULL,
            setup                   SEQUENCE (SIZE (1..2)) OF CSI-IM-ConfigId-r12
        }                                                           OPTIONAL,   -- Need ON
        cqi-ReportAperiodicProc2-r12 CHOICE {
            release                 NULL,
            setup                   CQI-ReportAperiodicProc-r11
        }                                                           OPTIONAL    -- Need ON
    ]],
    [[ cqi-ReportAperiodicProc-v1310  CHOICE {
            release                     NULL,
            setup                       CQI-ReportAperiodicProc-v1310
        }                                                           OPTIONAL,   -- Need ON
        cqi-ReportAperiodicProc2-v1310 CHOICE {
            release                 NULL,
            setup                   CQI-ReportAperiodicProc-v1310
        }                                                           OPTIONAL,   -- Need ON
        eMIMO-Type-r13              CSI-RS-ConfigEMIMO-r13          OPTIONAL    -- Need ON
    ]],
    [[ eMIMO-Type-v1430            CSI-RS-ConfigEMIMO-v1430        OPTIONAL,   -- Need ON
        eMIMO-Hybrid-r14           CSI-RS-ConfigEMIMO-Hybrid-r14   OPTIONAL,   -- Need ON
        advancedCodebookEnabled-r14 BOOLEAN                         OPTIONAL    -- Need ON
    ]]
}
CSI-RS-Config-v1430 ::=     SEQUENCE {
    eMIMO-Type-v1430            CSI-RS-ConfigEMIMO-v1430        OPTIONAL,   -- Need ON
    eMIMO-Hybrid-r14            CSI-RS-ConfigEMIMO-Hybrid-r14   OPTIONAL,   -- Need ON
    advancedCodebookEnabled-r14 BOOLEAN                         OPTIONAL    -- Need ON
}
```

FIG. 19A

```
CSI-RS-ConfigEMIMO-v1430 ::=    CHOICE {
    release                     NULL,
    setup                       CHOICE {
        nonPrecoded-v1430           CSI-RS-ConfigNonPrecoded-v1430,
        beamformed-v1430            CSI-RS-ConfigBeamformed-v1430
    }
}
CSI-RS-ConfigBeamformed-v1430::=    SEQUENCE {
    csi-RS-ConfigNZP-ApList-r14         SEQUENCE (SIZE (1..8)) OF CSI-RS-ConfigNZP-r11
                                                            OPTIONAL,  -- Need OR
    nzp-ResourceConfigOriginal-v1430    CSI-RS-Config-NZP-v1430   OPTIONAL,  -- Need OR
    csi-RS-NZP-Activation-r14           CSI-RS-ConfigNZP-Activation-r14 OPTIONAL -- Need OR
}

CSI-RS-ConfigNZP-Activation-r14::=  SEQUENCE {
    csi-RS-NZP-mode-r14                 ENUMERATED {semiPersistent, aperiodic},
    activatedResources-r14              INTEGER (0..4)
}
CSI-RS-ConfigNZP-r11 ::=        SEQUENCE {
    csi-RS-ConfigNZPId-r11          CSI-RS-ConfigNZPId-r11,
    antennaPortsCount-r11           ENUMERATED {an1, an2, an4, an8},
    resourceConfig-r11              INTEGER (0..31),
    subframeConfig-r11              INTEGER (0..154),
    scramblingIdentity-r11          INTEGER (0..503),
    qcl-CRS-Info-r11                SEQUENCE {
        qcl-ScramblingIdentity-r11      INTEGER (0..503),
        crs-PortsCount-r11              ENUMERATED {n1, n2, n4, spare1},
        mbsfn-SubframeConfigList-r11    CHOICE {
            release                         NULL,
            setup                           SEQUENCE {
                subframeConfigList              MBSFN-SubframeConfigList
            }
        }                                                   OPTIONAL    -- Need ON
    }                                                       OPTIONAL,   -- Need OR
    ...,
    [[  csi-RS-ConfigNZPId-v1310        CSI-RS-ConfigNZPId-v1310    OPTIONAL    -- Need ON
    ]],
    [[  transmissionComb-r14            NZP-TransmissionComb-r14    OPTIONAL,   -- Need OR
        frequencyDensity-r14            NZP-FrequencyDensity-r14    OPTIONAL    -- Need OR
    ]],
    [[  mbsfn-SubframeConfigList-v1430  CHOICE {
            release                         NULL,
            setup                           SEQUENCE {
                subframeConfigList-v1430        MBSFN-SubframeConfigList-v1430
            }
        }                                                   OPTIONAL    -- Need OP
    ]]
}
```

FIG. 19B

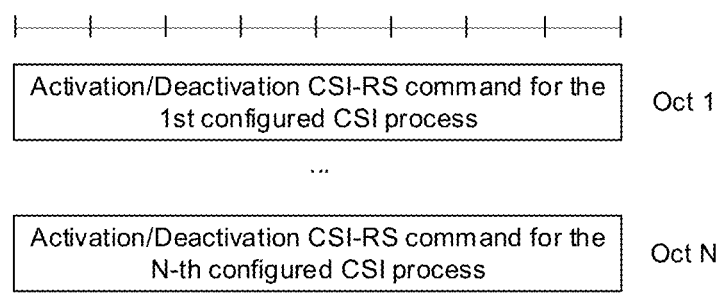
FIG. 20A Activation/Deactivation of CSI-RS resources MAC Control Element
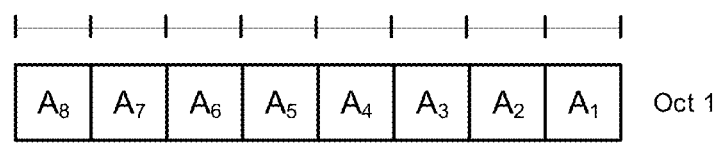
FIG. 20B Actviation/Deactivation CSI-RS command

```
SoundingRS-UL-ConfigCommon ::=    CHOICE {
    release                           NULL,
    setup                             SEQUENCE {
        srs-BandwidthConfig               ENUMERATED {bw0, bw1, bw2, bw3, bw4, bw5, bw6, bw7},
        srs-SubframeConfig                ENUMERATED {
                                              sc0, sc1, sc2, sc3, sc4, sc5, sc6, sc7,
                                              sc8, sc9, sc10, sc11, sc12, sc13, sc14, sc15},
        ackNackSRS-SimultaneousTransmission  BOOLEAN,
        srs-MaxUpPts                      ENUMERATED {true}                        OPTIONAL    -- Cond TDD
    }
}

SoundingRS-UL-ConfigDedicated ::=  CHOICE{
    release                           NULL,
    setup                             SEQUENCE {
        srs-Bandwidth                     ENUMERATED {bw0, bw1, bw2, bw3},
        srs-HoppingBandwidth              ENUMERATED {hbw0, hbw1, hbw2, hbw3},
        freqDomainPosition                INTEGER (0..23),
        duration                          BOOLEAN,
        srs-ConfigIndex                   INTEGER (0..1023),
        transmissionComb                  INTEGER (0..1),
        cyclicShift                       ENUMERATED {cs0, cs1, cs2, cs3, cs4, cs5, cs6, cs7}
    }
}

SoundingRS-UL-ConfigDedicatedAperiodic-r10 ::= CHOICE{
    release                           NULL,
    setup                             SEQUENCE {
        srs-ConfigIndexAp-r10             INTEGER (0..31),
        srs-ConfigApDCI-Format4-r10       SEQUENCE (SIZE (1..3)) OF SRS-ConfigAp-r10   OPTIONAL,    --Need ON
        srs-ActivateAp-r10                CHOICE {
            release                           NULL,
            setup                             SEQUENCE {
                srs-ConfigApDCI-Format0-r10       SRS-ConfigAp-r10,
                srs-ConfigApDCI-Format1a2b2c-r10  SRS-ConfigAp-r10,
                ...
            }
        }                                                                                OPTIONAL    -- Need ON
    }
}

SRS-ConfigAp-r10 ::= SEQUENCE {
    srs-AntennaPortAp-r10             SRS-AntennaPort,
    srs-BandwidthAp-r10               ENUMERATED {bw0, bw1, bw2, bw3},
    freqDomainPositionAp-r10          INTEGER (0..23),
    transmissionCombAp-r10            INTEGER (0..1),
    cyclicShiftAp-r10                 ENUMERATED {cs0, cs1, cs2, cs3, cs4, cs5, cs6, cs7}
}
```

FIG. 25

```
DRX-Config ::=                          CHOICE {
    release                                 NULL,
    setup                                   SEQUENCE {
        onDurationTimer                         ENUMERATED {
                                                    psf1, psf2, psf3, psf4, psf5, psf6,
                                                    psf8, psf10, psf20, psf30, psf40,
                                                    psf50, psf60, psf80, psf100,
                                                    psf200},
        drx-InactivityTimer                     ENUMERATED {
                                                    psf1, psf2, psf3, psf4, psf5, psf6,
                                                    psf8, psf10, psf20, psf30, psf40,
                                                    psf50, psf60, psf80, psf100,
                                                    psf200, psf300, psf500, psf750,
                                                    psf1280, psf1920, psf2560, psf0-v1020,
                                                    spare9, spare8, spare7, spare6,
                                                    spare5, spare4, spare3, spare2,
                                                    spare1},
        drx-RetransmissionTimer                 ENUMERATED {
                                                    psf1, psf2, psf4, psf6, psf8, psf16,
                                                    psf24, psf33},
        longDRX-CycleStartOffset                CHOICE {
            sf10                                    INTEGER(0..9),
            f20                                     INTEGER(0..19),
            sf32                                    INTEGER(0..31),
            sf40                                    INTEGER(0..39),
            sf64                                    INTEGER(0..63),
            sf80                                    INTEGER(0..79),
            sf128                                   INTEGER(0..127),
            sf160                                   INTEGER(0..159),
            sf256                                   INTEGER(0..255),
            sf320                                   INTEGER(0..319),
            sf512                                   INTEGER(0..511),
            sf640                                   INTEGER(0..639),
            sf1024                                  INTEGER(0..1023),
            sf1280                                  INTEGER(0..1279),
            sf2048                                  INTEGER(0..2047),
            sf2560                                  INTEGER(0..2559)
        },
        shortDRX                                SEQUENCE {
            shortDRX-Cycle                          ENUMERATED {
                                                        sf2, sf5, sf8, sf10, sf16, sf20,
                                                        sf32, sf40, sf64, sf80, sf128, sf160,
                                                        sf256, sf320, sf512, sf640},
            drxShortCycleTimer                      INTEGER (1..16)
        }       OPTIONAL                                                            -- Need OR
    }
}
```

FIG. 29

BEAM MANAGEMENT WITH DRX CONFIGURATION

CROSS-REFERENCE TO RELATED APPLICATIONS

This application claims the benefit of U.S. Provisional Application No. 62/564,665, titled "Beam Management With DRX Configuration" and filed on Sep. 28, 2017, the disclosure of which is hereby incorporated by reference in its entirety.

BACKGROUND

In wireless communications, various beam procedures may be performed such as uplink beam management, downlink beam failure recovery, or downlink beam management. A misalignment between a discontinuous reception (DRX) operation and one or more beam procedures may result in an unsuccessful beam procedure. It is desired to improve wireless communications by reducing misalignment between a DRX operation and one or more beam procedures.

SUMMARY

The following summary presents a simplified summary of certain features. The summary is not an extensive overview and is not intended to identify key or critical elements.

Systems, apparatuses, and methods are described for communications associated with beam procedures. A base station may transmit, to a wireless device, one or more radio resource control messages comprising one or more parameters. A first one or more of the parameters may be associated with a DRX operation. A second one or more of the parameters may be associated with one or more beam procedures. The one or more beam procedures may comprise, for example, an uplink beam management procedure, a downlink beam failure recovery procedure, or a downlink beam management procedure. Based on whether a medium access control (MAC) entity of the wireless device is in a DRX active time, the wireless device may monitor a downlink control channel for downlink control information (DCI). The wireless device may determine whether the MAC entity is in a DRX active time based on one or more: DRX parameters, and/or timers. The wireless device may receive the DCI. The wireless device may receive one or more data packets, for example, after receiving the DCI.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5A, FIG. 5B, FIG. 5C and FIG. 5D show examples for uplink and downlink signal transmission.

FIG. 10A and FIG. 10B show examples for interfaces between a 5G core network and base stations.

FIG. 11A, FIG. 11B, FIG. 11C, FIG. 11D, FIG. 11E, and FIG. 11F show examples for architectures of tight interworking between a 5G RAN and a long term evolution (LTE) radio access network (RAN).

FIG. 12A, FIG. 12B, and FIG. 12C show examples for radio protocol structures of tight interworking bearers.

FIG. 13A and FIG. 13B show examples for gNodeB (gNB) deployment.

FIG. 19A and FIG. 19B show examples for radio resource control signaling.

FIG. 20A shows an example of an activation/deactivation of a CSI-RS resources MAC control element.

FIG. 20B shows an example of an activation/deactivation of a CSI-RS command.

FIG. 25 shows an example of high layer signaling for SRS parameter configuration.

FIG. 29 shows an example of signaling for a discontinuous reception (DRX) configuration.

DETAILED DESCRIPTION

Figure 1:
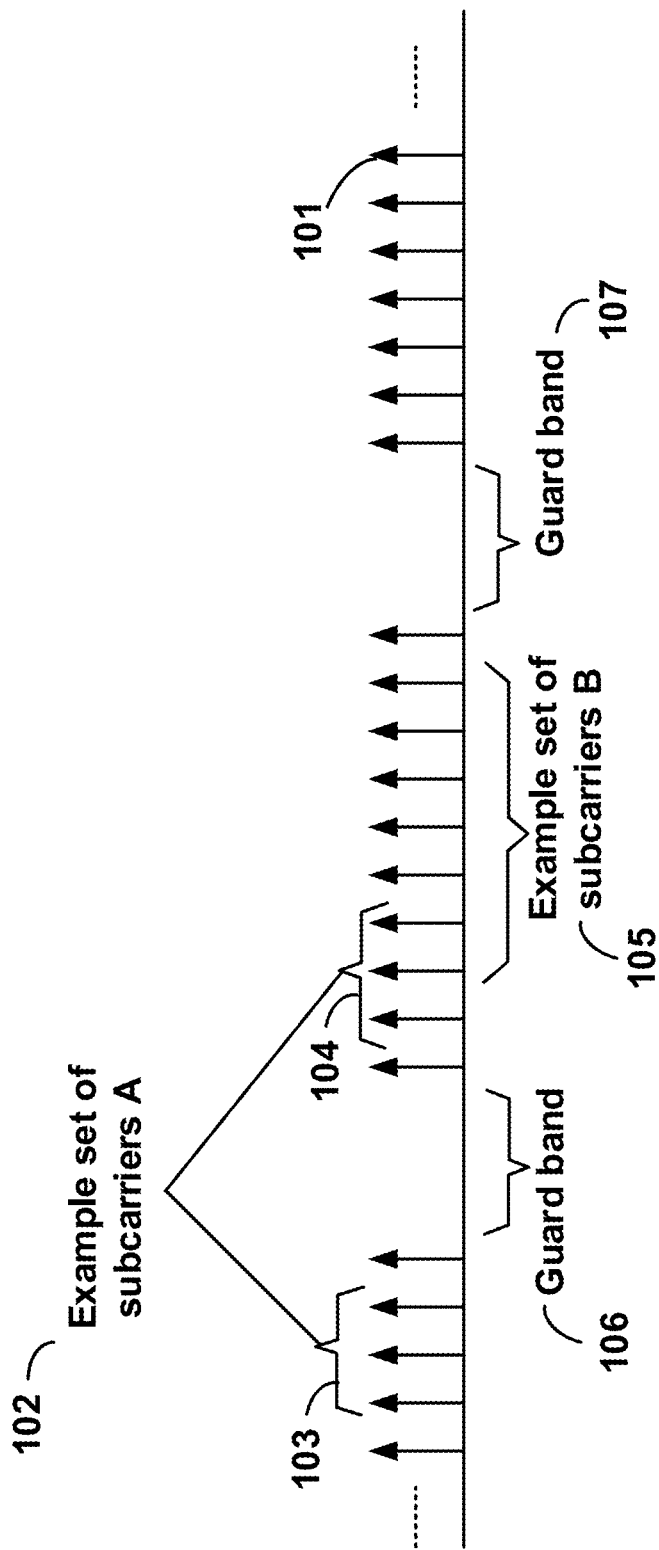
FIG. 1 shows example sets of orthogonal frequency division multiplexing (OFDM) subcarriers.

The accompanying drawings, which form a part hereof, show examples of the disclosure.

It is to be understood that the examples shown in the drawings and/or discussed herein are non-exclusive and that there are other examples of how the disclosure may be practiced.

Examples may enable operation of carrier aggregation and may be employed in the technical field of multicarrier communication systems. Examples may relate to beam management procedures with a discontinuous reception configuration in multicarrier communication systems.

The following acronyms are used throughout the present disclosure, provided below for convenience although other acronyms may be introduced in the detailed description:
3GPP 3rd Generation Partnership Project
5G 5th generation wireless systems
5GC 5G Core Network
ACK Acknowledgement
AMF Access and Mobility Management Function
ASIC application-specific integrated circuit
BPSK binary phase shift keying
CA carrier aggregation
CC component carrier
CDMA code division multiple access
CP cyclic prefix
CPLD complex programmable logic devices
CSI channel state information
CSS common search space
CU central unit
DC dual connectivity
DCI downlink control information
DFTS-OFDM discrete Fourier transform spreading OFDM
DL downlink
DU distributed unit
eLTE enhanced LTE
eMBB enhanced mobile broadband
eNB evolved Node B
EPC evolved packet core
E-UTRAN evolved-universal terrestrial radio access network
FDD frequency division multiplexing
FPGA field programmable gate arrays
Fs-C Fs-control plane
Fs-U Fs-user plane
gNB next generation node B
HARQ hybrid automatic repeat request
HDL hardware description languages
ID identifier
IE information element
LTE long term evolution
MAC media access control
MCG master cell group
MeNB master evolved node B
MIB master information block
MME mobility management entity
mMTC massive machine type communications
NACK Negative Acknowledgement
NAS non-access stratum
NG CP next generation control plane core
NGC next generation core
NG-C NG-control plane
NG-U NG-user plane
NR MAC new radio MAC
NR PDCP new radio PDCP
NR PHY new radio physical
NR RLC new radio RLC
NR RRC new radio RRC
NR new radio
NSSAI network slice selection assistance information
OFDM orthogonal frequency division multiplexing
PCC primary component carrier
PCell primary cell
PDCCH physical downlink control channel
PDCP packet data convergence protocol
PDU packet data unit
PHICH physical HARQ indicator channel
PHY physical
PLMN public land mobile network
PSCell primary secondary cell
pTAG primary timing advance group
PUCCH physical uplink control channel
PUSCH physical uplink shared channel
QAM quadrature amplitude modulation
QPSK quadrature phase shift keying
RA random access
RACH random access channel
RAN radio access network
RAP random access preamble
RAR random access response
RB resource blocks
RBG resource block groups
RLC radio link control
RRC radio resource control
RRM radio resource management
RV redundancy version
SCC secondary component carrier
SCell secondary cell
SCG secondary cell group
SC-OFDM single carrier-OFDM
SDU service data unit
SeNB secondary evolved node B
SFN system frame number
S-GW serving gateway
SIB system information block
SC-OFDM single carrier orthogonal frequency division multiplexing
SRB signaling radio bearer
sTAG(s) secondary timing advance group(s)
TA timing advance
TAG timing advance group
TAI tracking area identifier
TAT time alignment timer
TDD time division duplexing
TDMA time division multiple access
TTI transmission time interval
TB transport block
UE user equipment
UL uplink
UPGW user plane gateway
URLLC ultra-reliable low-latency communications
VHDL VHSIC hardware description language
Xn-C Xn-control plane Xn-U Xn-user plane
Xx-C Xx-control plane
Xx-U Xx-user plane Examples may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be used for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 shows example sets of OFDM subcarriers. As shown in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is shown as an example, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As shown in FIG. 1, guard band 106 is between subcarriers 103 and subcarriers 104. The example set of subcarriers A 102 includes subcarriers 103 and subcarriers 104. FIG. 1 also shows an example set of subcarriers B 105. As shown, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
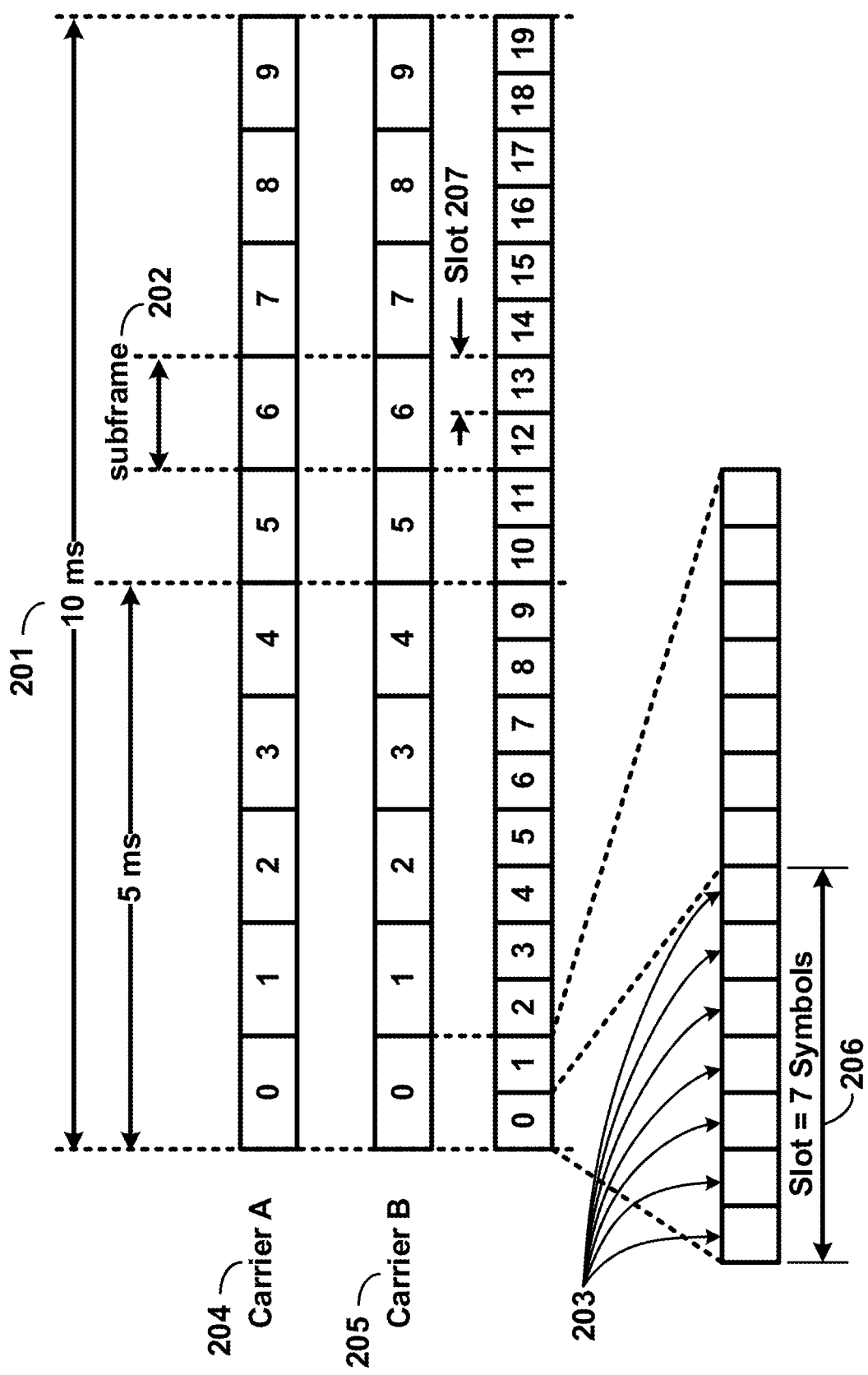
FIG. 2 shows example transmission time and reception time for two carriers in a carrier group.

FIG. 2 shows an example timing arrangement with transmission time and reception time for two carriers. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 milliseconds (msec). Other frame durations, for example, in the range of 1 to 100 msec may also be supported. In this example, each 10 msec radio frame 201 may be divided into ten equally sized subframes 202. Other subframe durations such as including 0.5 msec, 1 msec, 2 msec, and 5 msec may also be supported. Subframe(s) may consist of two or more slots (e.g., slots 206 and 207). For the example of FDD, 10 subframes may be available for downlink transmission and 10 subframes may be available for uplink transmissions in each 10 msec interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may include all downlink, all uplink, or a downlink part and an uplink part, and/or alike. Slot aggregation may be supported, e.g., data transmission may be scheduled to span one or multiple slots. For example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
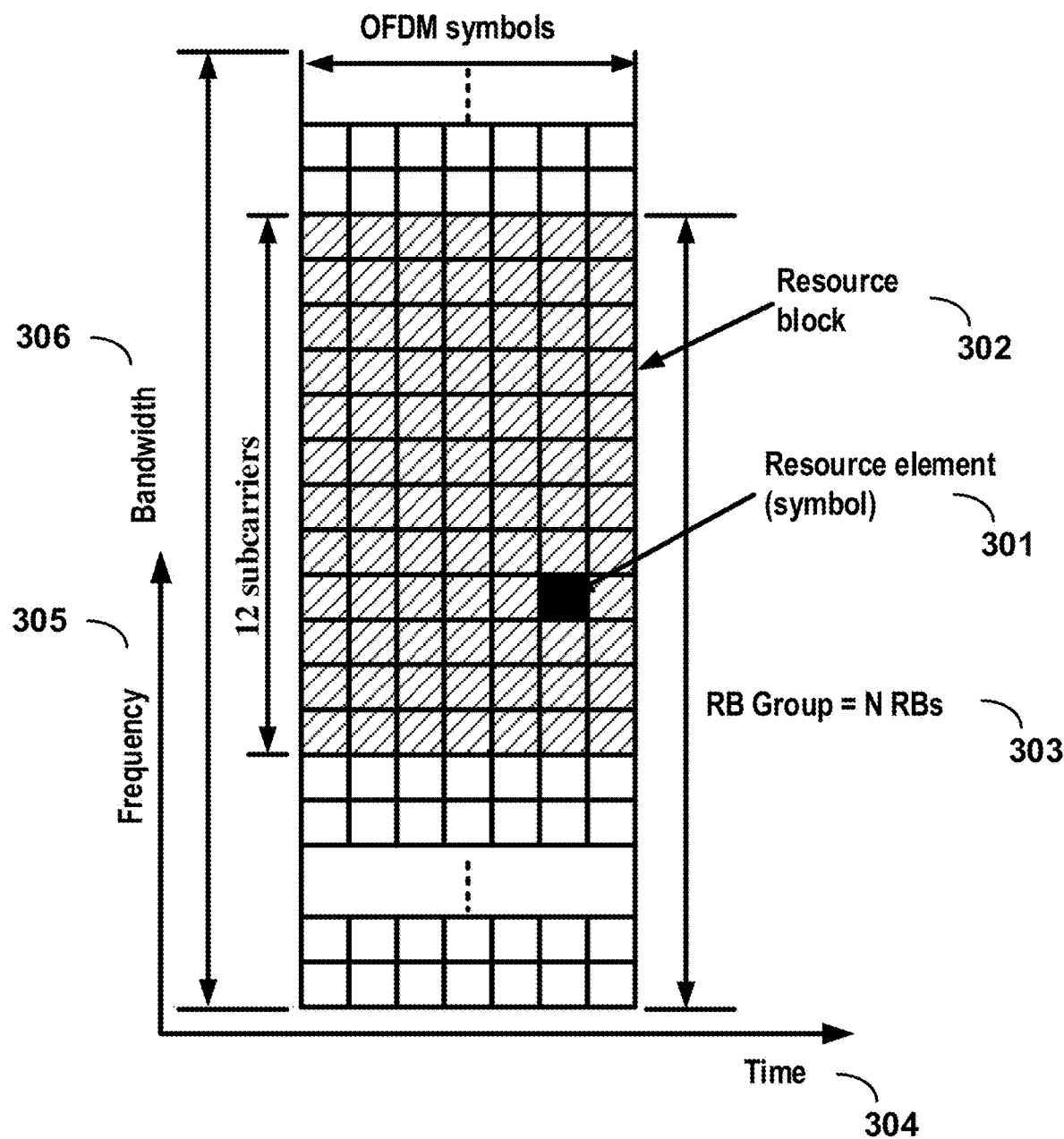
FIG. 3 shows example OFDM radio resources.

FIG. 3 shows an example of OFDM radio resources. The resource grid structure in time 304 and frequency 305 is shown in FIG. 3. The quantity of downlink subcarriers or RBs may depend, at least in part, on the downlink transmission bandwidth 306 configured in the cell. The smallest radio resource unit may be called a resource element (e.g., 301). Resource elements may be grouped into resource blocks (e.g., 302). Resource blocks may be grouped into larger radio resources called Resource Block Groups (RBG) (e.g., 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. A resource block may correspond to one slot in the time domain and 180 kHz in the frequency domain (for 15 kHz subcarrier bandwidth and 12 subcarriers).

Multiple numerologies may be supported. A numerology may be derived by scaling a basic subcarrier spacing by an integer N. Scalable numerology may allow at least from 15 kHz to 480 kHz subcarrier spacing. The numerology with 15 kHz and scaled numerology with different subcarrier spacing with the same CP overhead may align at a symbol boundary every 1 msec in a NR carrier.

Figure 4:
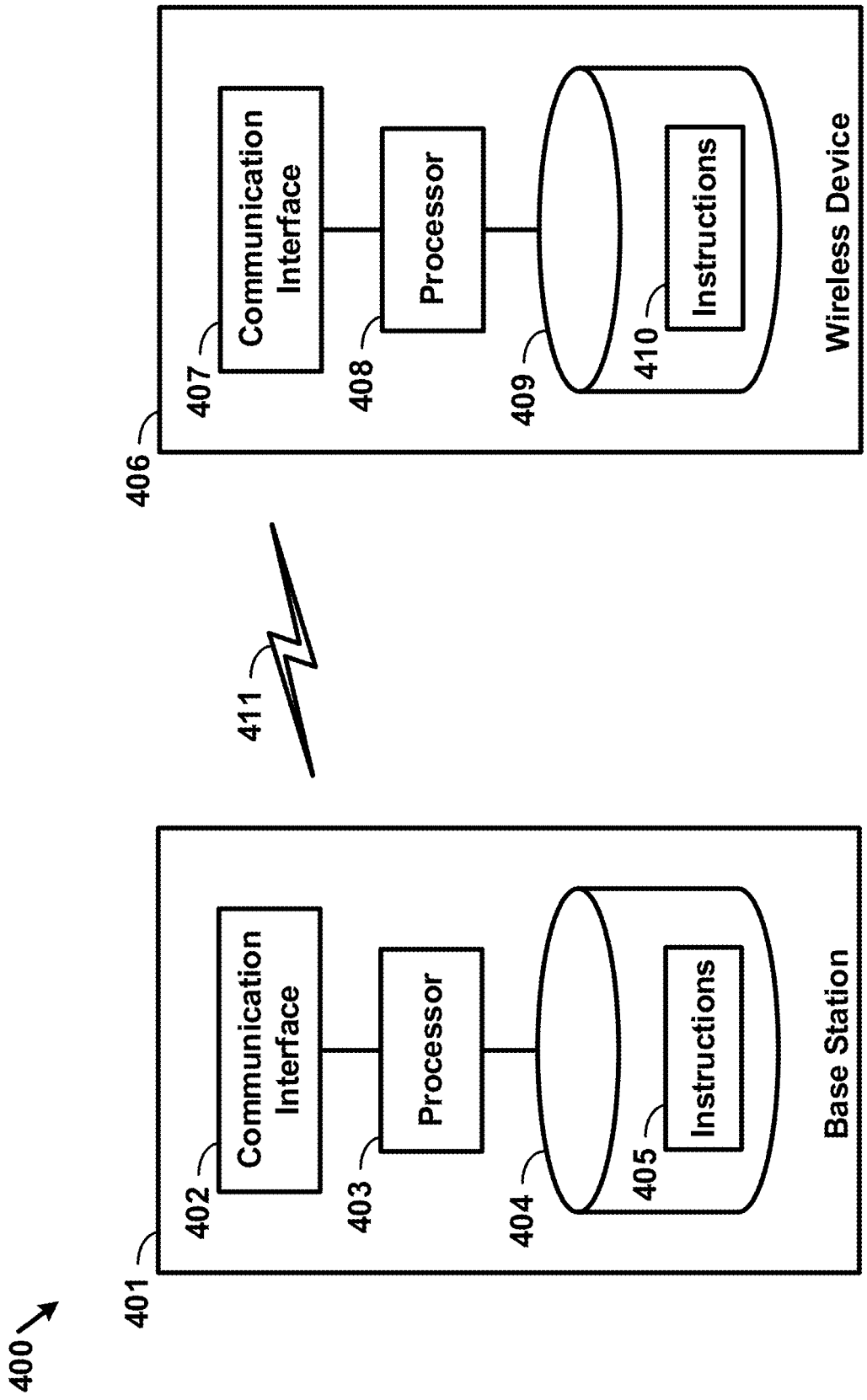
FIG. 4 shows hardware elements of a base station and a wireless device.

FIG. 4 shows hardware elements of a base station 401 and a wireless device 406. A communication network 400 may include at least one base station 401 and at least one wireless device 406. The base station 401 may include at least one communication interface 402, one or more processors 403, and at least one set of program code instructions 405 stored in non-transitory memory 404 and executable by the one or more processors 403. The wireless device 406 may include at least one communication interface 407, one or more processors 408, and at least one set of program code instructions 410 stored in non-transitory memory 409 and executable by the one or more processors 408. A communication interface 402 in the base station 401 may be configured to engage in communication with a communication interface 407 in the wireless device 406, such as via a communication path that includes at least one wireless link 411. The wireless link 411 may be a bi-directional link. The communication interface 407 in the wireless device 406 may also be configured to engage in communication with the communication interface 402 in the base station 401. The base station 401 and the wireless device 406 may be configured to send and receive data over the wireless link 411 using multiple frequency carriers. Base stations, wireless devices, and other communication devices may include structure and operations of transceiver(s). A transceiver is a device that includes both a transmitter and receiver. Transceivers may be employed in devices such as wireless devices, base stations, relay nodes, and/or the like. Examples for radio technology implemented in the communication interfaces 402, 407 and the wireless link 411 are shown in FIG. 1, FIG. 2, FIG. 3, FIG. 5, and associated text. The communication network 400 may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network 400, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

The communications network 400 may comprise Radio Access Network (RAN) architecture. The RAN architecture may comprise one or more RAN nodes that may be a next generation Node B (gNB) (e.g., 401) providing New Radio (NR) user plane and control plane protocol terminations towards a first wireless device (e.g. 406). A RAN node may be a next generation evolved Node B (ng-eNB), providing Evolved UMTS Terrestrial Radio Access (E-UTRA) user plane and control plane protocol terminations towards a second wireless device. The first wireless device may communicate with a gNB over a Uu interface. The second wireless device may communicate with a ng-eNB over a Uu interface. Base station 401 may comprise one or more of a gNB, ng-eNB, and/or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in RRC_INACTIVE state, distribution function for Non-Access Stratum (NAS) messages, RAN sharing, and dual connectivity or tight interworking between NR and E-UTRA.

One or more gNBs and/or one or more ng-eNBs may be interconnected with each other by means of Xn interface. A gNB or an ng-eNB may be connected by means of NG interfaces to 5G Core Network (5GC). 5GC may comprise one or more AMF/User Plane Function (UPF) functions. A gNB or an ng-eNB may be connected to a UPF by means of an NG-User plane (NG-U) interface. The NG-U interface may provide delivery (e.g., non-guaranteed delivery) of user plane Protocol Data Units (PDUs) between a RAN node and the UPF. A gNB or an ng-eNB may be connected to an AMF by means of an NG-Control plane (e.g., NG-C) interface. The NG-C interface may provide functions such as NG interface management, UE context management, UE mobility management, transport of NAS messages, paging, PDU session management, configuration transfer or warning message transmission.

A UPF may host functions such as anchor point for intra-/inter-Radio Access Technology (RAT) mobility (if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

An AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or a non-operational state. Configured may also refer to specific settings in a device that effect the operational characteristics of the device whether the device is in an operational or a non-operational state. In other words, the hardware, software, firmware, registers, memory values, and/or the like may be "configured" within a device, whether the device is in an operational or a nonoperational state, to provide the device with specific characteristics. Terms such as "a control message to cause in a device" may mean that a control message has parameters that may be used to configure specific characteristics in the device, whether the device is in an operational or a non-operational state.

A network may include a multitude of base stations, providing a user plane NR PDCP/NR RLC/NR MAC/NR PHY and control plane (e.g., NR RRC) protocol terminations towards the wireless device. The base station(s) may be interconnected with other base station(s) (e.g., employing an Xn interface). The base stations may also be connected employing, for example, an NG interface to an NGC. FIG. 10A and FIG. 10B show examples for interfaces between a 5G core network (e.g., NGC) and base stations (e.g., gNB and eLTE eNB). For example, the base stations may be interconnected to the NGC control plane (e.g., NG CP) employing the NG-C interface and to the NGC user plane (e.g., UPGW) employing the NG-U interface. The NG interface may support a many-to-many relation between 5G core networks and base stations.

A base station may include many sectors, for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g., TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC); in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC); in the uplink, the carrier corresponding to an SCell may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or cell index may also identify the downlink carrier or uplink carrier of the cell (depending on the context in which it is used). The cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, reference to a first physical cell ID for a first downlink carrier may indicate that the first physical cell ID is for a cell comprising the first downlink carrier. The same concept may apply to, for example, carrier activation. Reference to a first carrier that is activated may indicate that the cell comprising the first carrier is activated.

A device may be configured to operate as needed by freely combining any of the examples. The disclosed mechanisms may be performed if certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. One or more criteria may be satisfied. It may be possible to implement examples that selectively implement disclosed protocols.

A base station may communicate with a variety of wireless devices. Wireless devices may support multiple technologies, and/or multiple releases of the same technology. Wireless devices may have some specific capability(ies) depending on its wireless device category and/or capability(ies). A base station may comprise multiple sectors. Reference to a base station communicating with a plurality of wireless devices may indicate that a base station may communicate with a subset of the total wireless devices in a coverage area. A plurality of wireless devices of a given LTE or 5G release, with a given capability and in a given sector of the base station, may be used. The plurality of wireless devices may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

A base station may transmit (e.g., to a wireless device) one or more messages (e.g. RRC messages) that may comprise a plurality of configuration parameters for one or more cells. One or more cells may comprise at least one primary cell and at least one secondary cell. An RRC message may be broadcasted or unicasted to the wireless device. Configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC- _Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). The other SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may send its radio access capability information which may be static. A base station may request what capabilities for a wireless device to report based on band information. If allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

If CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. If adding a new SCell, dedicated RRC signaling may be employed to send all required system information of the SCell. In connected mode, wireless devices may not need to acquire broadcasted system information directly from the SCells.

An RRC connection reconfiguration procedure may be used to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be used to establish (or reestablish, resume) an RRC connection. An RRC connection establishment procedure may comprise SRB1 establishment. The RRC connection establishment procedure may be used to transfer the initial NAS dedicated information message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure, e.g., after successful security activation. A measurement report message may be employed to transmit measurement results.

FIG. 5A, FIG. 5B, FIG. 5C, and FIG. 5D show examples of architecture for uplink and downlink signal transmission. FIG. 5A shows an example for an uplink physical channel. The baseband signal representing the physical uplink shared channel may be processed according to the following processes, which may be performed by structures described below. These structures and corresponding functions are shown as examples, however, it is anticipated that other structures and/or functions may be implemented in various examples. The structures and corresponding functions may comprise, e.g., one or more scrambling devices 501A and 501B configured to perform scrambling of coded bits in each of the codewords to be transmitted on a physical channel; one or more modulation mappers 502A and 502B configured to perform modulation of scrambled bits to generate complex-valued symbols; a layer mapper 503 configured to perform mapping of the complex-valued modulation symbols onto one or several transmission layers; one or more transform precoders 504A and 504B to generate complex-valued symbols; a precoding device 505 configured to perform precoding of the complex-valued symbols; one or more resource element mappers 506A and 506B configured to perform mapping of precoded complex-valued symbols to resource elements; one or more signal generators 507A and 507B configured to perform the generation of a complex-valued time-domain DFTS-OFDM/SC-FDMA signal for each antenna port; and/or the like.

FIG. 5B shows an example for performing modulation and up-conversion to the carrier frequency of the complex-valued DFTS-OFDM/SC-FDMA baseband signal, e.g., for each antenna port and/or for the complex-valued physical random access channel (PRACH) baseband signal. For example, the baseband signal, represented as $s_1(t)$, may be split, by a signal splitter 510, into real and imaginary components, $Re\{s_1(t)\}$ and $Im\{s_1(t)\}$, respectively. The real component may be modulated by a modulator 511A, and the imaginary component may be modulated by a modulator 511B. The output signal of the modulator 511A and the output signal of the modulator 511B may be mixed by a mixer 512. The output signal of the mixer 512 may be input to a filtering device 513, and filtering may be employed by the filtering device 513 prior to transmission.

FIG. 5C shows an example structure for downlink transmissions. The baseband signal representing a downlink physical channel may be processed by the following processes, which may be performed by structures described below. These structures and corresponding functions are shown as examples, however, it is anticipated that other structures and/or functions may be implemented in various examples. The structures and corresponding functions may comprise, e.g., one or more scrambling devices 531A and 531B configured to perform scrambling of coded bits in each of the codewords to be transmitted on a physical channel; one or more modulation mappers 532A and 532B configured to perform modulation of scrambled bits to generate complex-valued modulation symbols; a layer mapper 533 configured to perform mapping of the complex-valued modulation symbols onto one or several transmission layers; a precoding device 534 configured to perform precoding of the complex-valued modulation symbols on each layer for transmission on the antenna ports; one or more resource element mappers 535A and 535B configured to perform mapping of complex-valued modulation symbols for each antenna port to resource elements; one or more OFDM signal generators 536A and 536B configured to perform the generation of complex-valued time-domain OFDM signal for each antenna port; and/or the like.

FIG. 5D shows an example structure for modulation and up-conversion to the carrier frequency of the complex-valued OFDM baseband signal for each antenna port. For example, the baseband signal, represented as $s_1^{(p)}(t)$, may be split, by a signal splitter 520, into real and imaginary components, $\mathrm{Re}\{s_1^{(p)}(t)\}$ and $\mathrm{Im}\{s_1^{(p)}(t)\}$, respectively. The real component may be modulated by a modulator 521A, and the imaginary component may be modulated by a modulator 521B. The output signal of the modulator 521A and the output signal of the modulator 521B may be mixed by a mixer 522. The output signal of the mixer 522 may be input to a filtering device 523, and filtering may be employed by the filtering device 523 prior to transmission.

Figure 6:
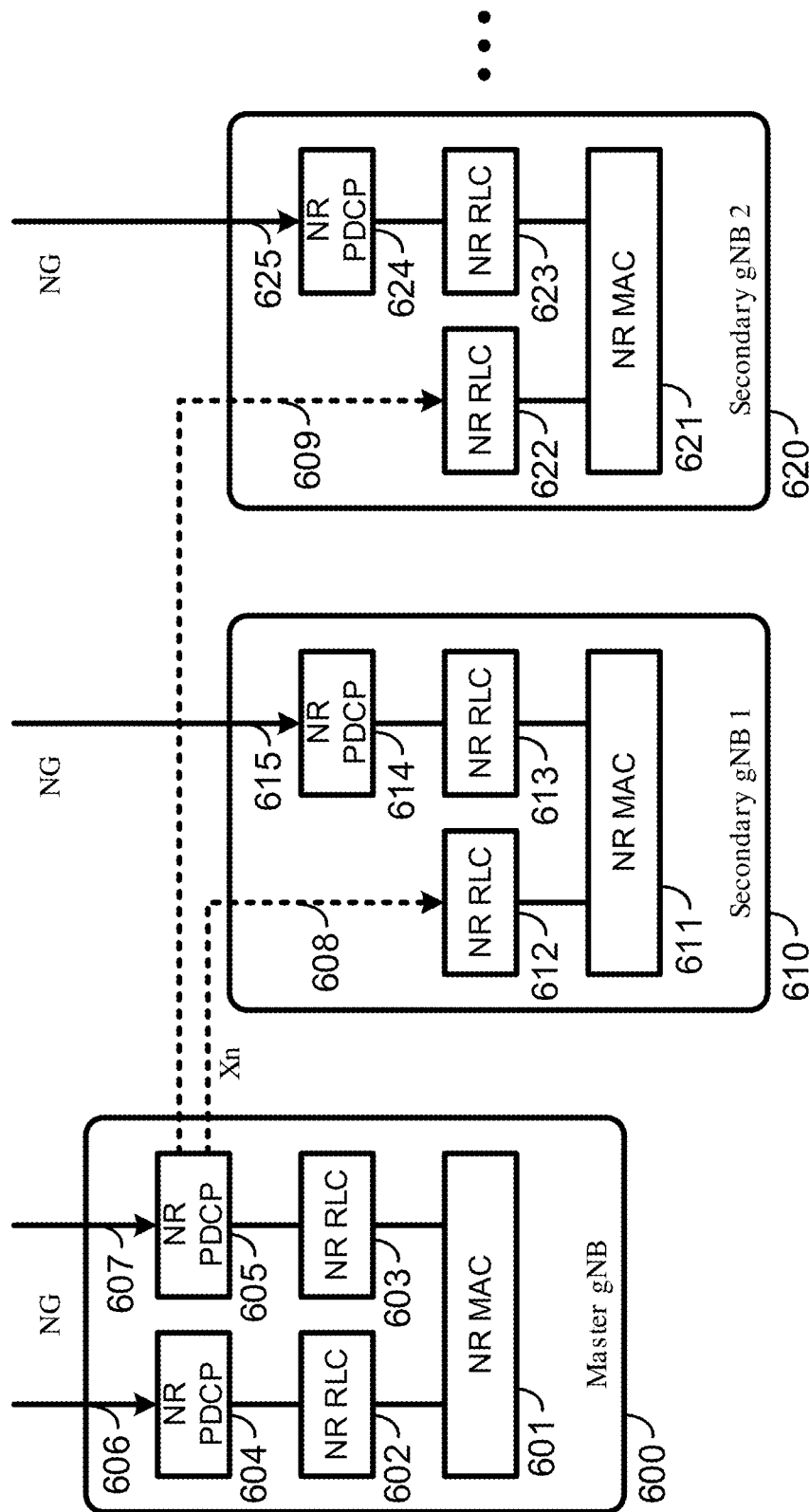
FIG. 6 shows an example protocol structure with multi-connectivity.
Figure 7:
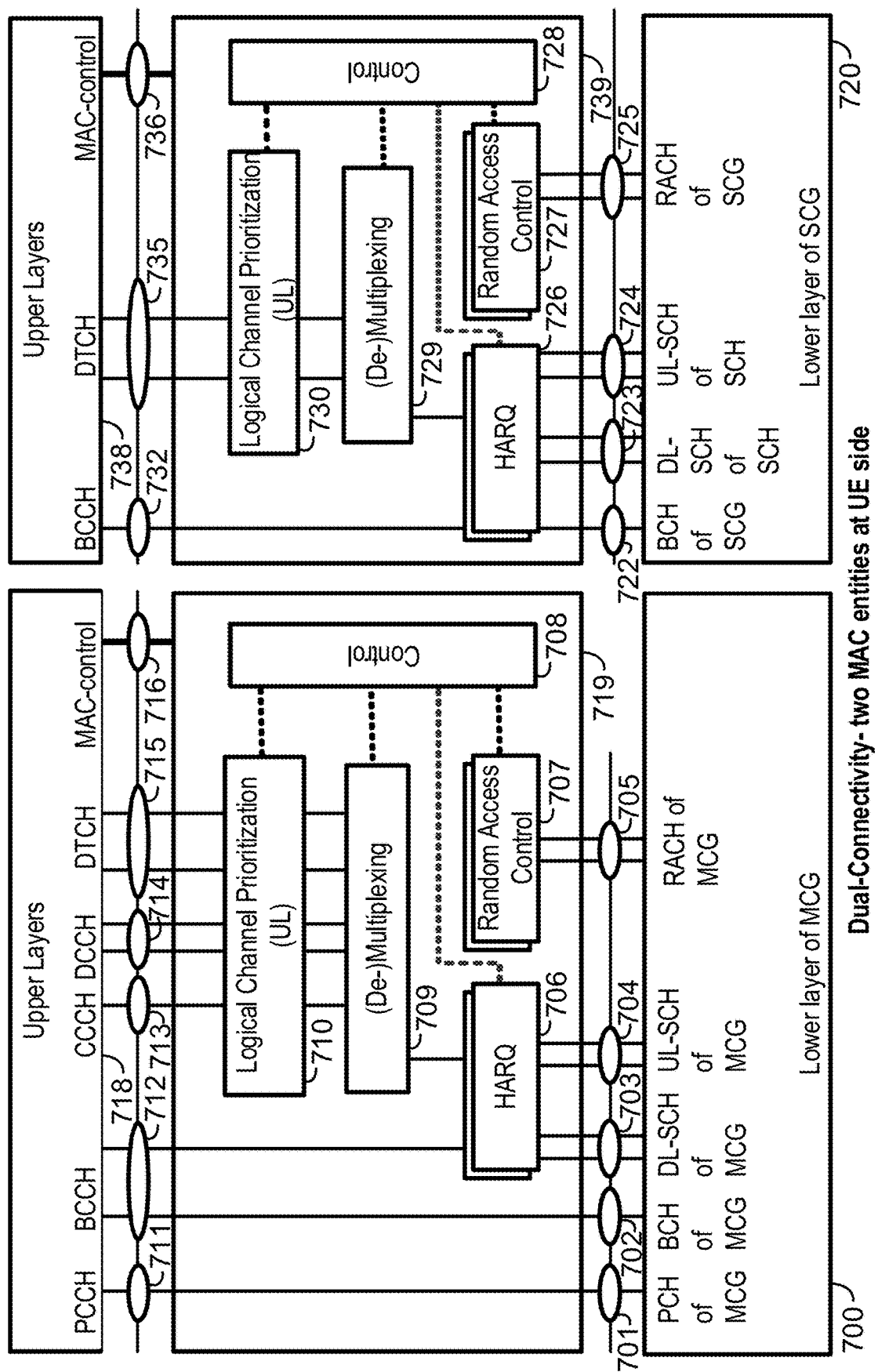
FIG. 7 shows an example protocol structure with carrier aggregation (CA) and dual connectivity (DC).

FIG. 6 and FIG. 7 show examples for protocol structures with CA and multi-connectivity. NR may support multi-connectivity operation, whereby a multiple receiver/transmitter (RX/TX) wireless device in RRC_CONNECTED may be configured to utilize radio resources provided by multiple schedulers located in multiple gNBs connected via a non-ideal or ideal backhaul over the Xn interface. gNBs involved in multi-connectivity for a certain wireless device may assume two different roles: a gNB may either act as a master gNB (e.g., 600) or as a secondary gNB (e.g., 610 or 620). In multi-connectivity, a wireless device may be connected to one master gNB (e.g., 600) and one or more secondary gNBs (e.g., 610 and/or 620). Any one or more of the Master gNB 600 and/or the secondary gNBs 610 and 620 may be a Next Generation (NG) NodeB. The master gNB 600 may comprise protocol layers NR MAC 601, NR RLC 602 and 603, and NR PDCP 604 and 605. The secondary gNB may comprise protocol layers NR MAC 611, NR RLC 612 and 613, and NR PDCP 614. The secondary gNB may comprise protocol layers NR MAC 621, NR RLC 622 and 623, and NR PDCP 624. The master gNB 600 may communicate via an interface 606 and/or via an interface 607, the secondary gNB 610 may communicate via an interface 615, and the secondary gNB 620 may communicate via an interface 625. The master gNB 600 may also communicate with the secondary gNB 610 and the secondary gNB 621 via interfaces 608 and 609, respectively, which may include Xn interfaces. For example, the master gNB 600 may communicate via the interface 608, at layer NR PDCP 605, and with the secondary gNB 610 at layer NR RLC 612. The master gNB 600 may communicate via the interface 609, at layer NR PDCP 605, and with the secondary gNB 620 at layer NR RLC 622.

FIG. 7 shows an example structure for the UE side MAC entities, e.g., if a Master Cell Group (MCG) and a Secondary Cell Group (SCG) are configured. Media Broadcast Multicast Service (MBMS) reception may be included but is not shown in this figure for simplicity.

In multi-connectivity, the radio protocol architecture that a particular bearer uses may depend on how the bearer is set up. As an example, three alternatives may exist, an MCG bearer, an SCG bearer, and a split bearer, such as shown in FIG. 6. NR RRC may be located in a master gNB and SRBs may be configured as a MCG bearer type and may use the radio resources of the master gNB. Multi-connectivity may have at least one bearer configured to use radio resources provided by the secondary gNB. Multi-connectivity may or may not be configured or implemented.

For multi-connectivity, the wireless device may be configured with multiple NR MAC entities: e.g., one NR MAC entity for a master gNB, and other NR MAC entities for secondary gNBs. In multi-connectivity, the configured set of serving cells for a wireless device may comprise two subsets: e.g., the Master Cell Group (MCG) including the serving cells of the master gNB, and the Secondary Cell Groups (SCGs) including the serving cells of the secondary gNBs.

At least one cell in a SCG may have a configured UL component carrier (CC) and one of the UL CCs, e.g., named PSCell (or PCell of SCG, or sometimes called PCell), may be configured with PUCCH resources. If the SCG is configured, there may be at least one SCG bearer or one split bearer. If a physical layer problem or a random access problem on a PSCell occurs or is detected, if the maximum number of NR RLC retransmissions has been reached associated with the SCG, or if an access problem on a PSCell during a SCG addition or a SCG change occurs or is detected, then an RRC connection re-establishment procedure may not be triggered, UL transmissions towards cells of the SCG may be stopped, a master gNB may be informed by the wireless device of a SCG failure type, and for a split bearer the DL data transfer over the master gNB may be maintained. The NR RLC Acknowledge Mode (AM) bearer may be configured for the split bearer Like the PCell, a PSCell may not be de-activated. The PSCell may be changed with an SCG change (e.g., with a security key change and a RACH procedure). A direct bearer type may change between a split bearer and an SCG bearer, or a simultaneous configuration of an SCG and a split bearer may or may not be supported.

A master gNB and secondary gNBs may interact for multi-connectivity. The master gNB may maintain the RRM measurement configuration of the wireless device, and the master gNB may, (e.g., based on received measurement reports, and/or based on traffic conditions and/or bearer types), decide to ask a secondary gNB to provide additional resources (e.g., serving cells) for a wireless device. If a request from the master gNB is received, a secondary gNB may create a container that may result in the configuration of additional serving cells for the wireless device (or the secondary gNB decide that it has no resource available to do so). For wireless device capability coordination, the master gNB may provide some or all of the Active Set (AS) configuration and the wireless device capabilities to the secondary gNB. The master gNB and the secondary gNB may exchange information about a wireless device configuration, such as by employing NR RRC containers (e.g., inter-node messages) carried in Xn messages. The secondary gNB may initiate a reconfiguration of its existing serving cells (e.g., PUCCH towards the secondary gNB). The secondary gNB may decide which cell is the PSCell within the SCG. The master gNB may or may not change the content of the NR RRC configuration provided by the secondary gNB. In an SCG addition and an SCG SCell addition, the master gNB may provide the latest measurement results for the SCG cell(s). Both a master gNB and a secondary gNBs may know the system frame number (SFN) and subframe offset of each other by operations, administration, and maintenance (OAM) (e.g., for the purpose of discontinuous reception (DRX) alignment and identification of a measurement gap). If adding a new SCG SCell, dedicated NR RRC signaling may be used for sending required system information of the cell for CA, except, e.g., for the SFN acquired from an MIB of the PSCell of an SCG.

FIG. 7 shows an example of dual-connectivity (DC) for two MAC entities at a wireless device side. A first MAC entity may comprise a lower layer of an MCG 700, an upper layer of an MCG 718, and one or more intermediate layers of an MCG 719. The lower layer of the MCG 700 may comprise, e.g., a paging channel (PCH) 701, a broadcast channel (BCH) 702, a downlink shared channel (DL-SCH) 703, an uplink shared channel (UL-SCH) 704, and a random access channel (RACH) 705. The one or more intermediate layers of the MCG 719 may comprise, e.g., one or more hybrid automatic repeat request (HARQ) processes 706, one or more random access control processes 707, multiplexing and/or de-multiplexing processes 709, logical channel prioritization on the uplink processes 710, and a control processes 708 providing control for the above processes in the one or more intermediate layers of the MCG 719. The upper layer of the MCG 718 may comprise, e.g., a paging control channel (PCCH) 711, a broadcast control channel (BCCH) 712, a common control channel (CCCH) 713, a dedicated control channel (DCCH) 714, a dedicated traffic channel (DTCH) 715, and a MAC control 716.

A second MAC entity may comprise a lower layer of an SCG 720, an upper layer of an SCG 738, and one or more intermediate layers of an SCG 739. The lower layer of the SCG 720 may comprise, e.g., a BCH 722, a DL-SCH 723, an UL-SCH 724, and a RACH 725. The one or more intermediate layers of the SCG 739 may comprise, e.g., one or more HARQ processes 726, one or more random access control processes 727, multiplexing and/or de-multiplexing processes 729, logical channel prioritization on the uplink processes 730, and a control processes 728 providing control for the above processes in the one or more intermediate layers of the SCG 739. The upper layer of the SCG 738 may comprise, e.g., a BCCH 732, a DCCH 714, a DTCH 735, and a MAC control 736.

Serving cells may be grouped in a TA group (TAG). Serving cells in one TAG may use the same timing reference. For a given TAG, a wireless device may use at least one downlink carrier as a timing reference. For a given TAG, a wireless device may synchronize uplink subframe and frame transmission timing of uplink carriers belonging to the same TAG. Serving cells having an uplink to which the same TA applies may correspond to serving cells hosted by the same receiver. A wireless device supporting multiple TAs may support two or more TA groups. One TA group may include the PCell and may be called a primary TAG (pTAG). In a multiple TAG configuration, at least one TA group may not include the PCell and may be called a secondary TAG (sTAG). Carriers within the same TA group may use the same TA value and/or the same timing reference. If DC is configured, cells belonging to a cell group (e.g., MCG or SCG) may be grouped into multiple TAGs including a pTAG and one or more sTAGs.

Figure 8:
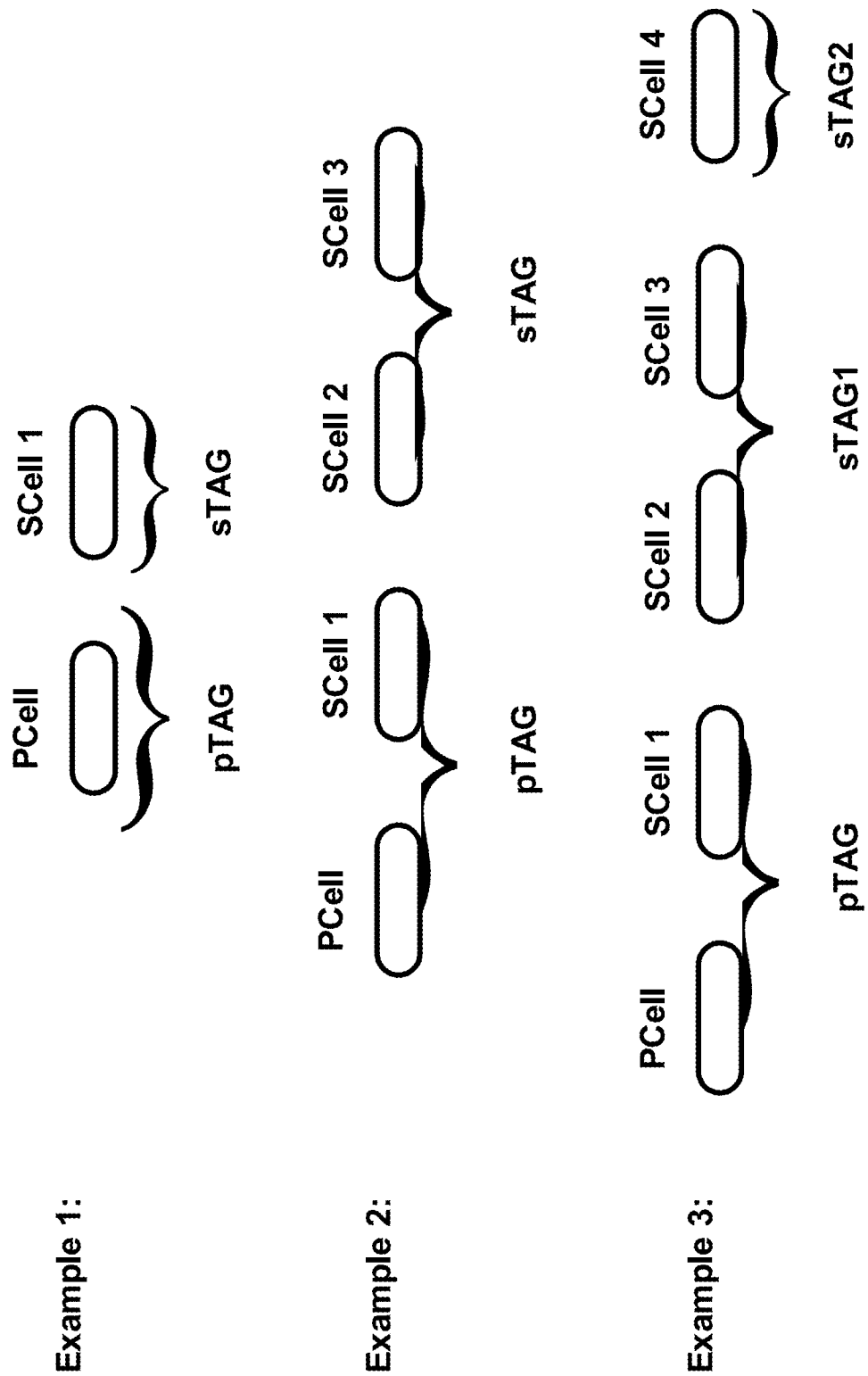
FIG. 8 shows example timing advance group (TAG) configurations.

FIG. 8 shows example TAG configurations. In Example 1, a pTAG comprises a PCell, and an sTAG comprises an SCell1. In Example 2, a pTAG comprises a PCell and an SCell1, and an sTAG comprises an SCell2 and an SCell3. In Example 3, a pTAG comprises a PCell and an SCell1, and an sTAG1 comprises an SCell2 and an SCell3, and an sTAG2 comprises a SCell4. Up to four TAGs may be supported in a cell group (MCG or SCG), and other example TAG configurations may also be provided. In various examples, structures and operations are described for use with a pTAG and an sTAG. Some of the examples may be used for configurations with multiple sTAGs.

An eNB may initiate an RA procedure, via a PDCCH order, for an activated SCell. The PDCCH order may be sent on a scheduling cell of this SCell. If cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
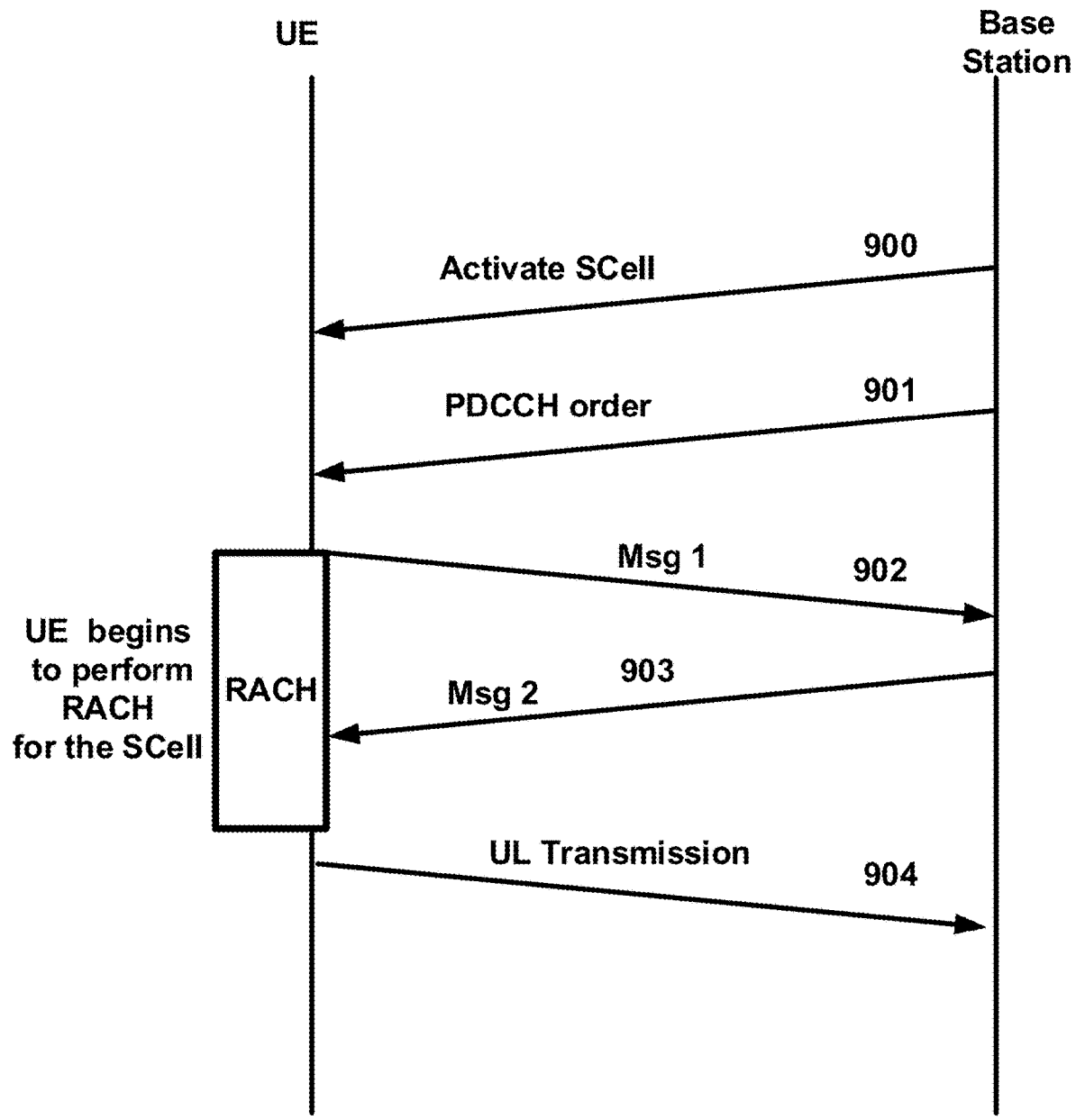
FIG. 9 shows example message flow in a random access process in a secondary TAG.

FIG. 9 shows an example of random access processes, and a corresponding message flow, in a secondary TAG. A base station, such as an eNB, may transmit an activation command 900 to a wireless device, such as a UE. The activation command 900 may be transmitted to activate an SCell. The base station may also transmit a PDDCH order 901 to the wireless device, which may be transmitted, e.g., after the activation command 900. The wireless device may begin to perform a RACH process for the SCell, which may be initiated, e.g., after receiving the PDDCH order 901. A wireless device may transmit to the base station (e.g., as part of a RACH process) a preamble 902 (e.g., Msg1), such as a random access preamble (RAP). The preamble 902 may be transmitted in response to the PDCCH order 901. The wireless device may transmit the preamble 902 via an SCell belonging to an sTAG. Preamble transmission for SCells may be controlled by a network using PDCCH format 1A. The base station may send a random access response (RAR) 903 (e.g., Msg2 message) to the wireless device. The RAR 903 may be in response to the preamble 902 transmission via the SCell. The RAR 903 may be addressed to a random access radio network temporary identifier (RA-RNTI) in a PCell common search space (CSS). If the wireless device receives the RAR 903, the RACH process may conclude. The RACH process may conclude, e.g., after or in response to the wireless device receiving the RAR 903 from the base station. After the RACH process, the wireless device may transmit an uplink transmission 904. The uplink transmission 904 may comprise uplink packets transmitted via the same SCell used for the preamble 902 transmission.

Timing alignment (e.g., initial timing alignment) for communications between the wireless device and the base station may be performed through a random access procedure, such as described above regarding FIG. 9. The random access procedure may involve a wireless device, such as a UE, transmitting a random access preamble and a base station, such as an eNB, responding with an initial TA command NTA (amount of timing advance) within a random access response window. The start of the random access preamble may be aligned with the start of a corresponding uplink subframe at the wireless device assuming NTA=0. The eNB may estimate the uplink timing from the random access preamble transmitted by the wireless device. The TA command may be derived by the eNB based on the estimation of the difference between the desired UL timing and the actual UL timing. The wireless device may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. If an eNB performs an SCell addition configuration, the related TAG configuration may be configured for the SCell. An eNB may modify the TAG configuration of an SCell by removing (e.g., releasing) the SCell and adding (e.g., configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In some examples, it may not be possible to change the TAG associated with an SCell, but rather, the SCell may need to be removed and a new SCell may need to be added with another TAG. For example, if there is a need to move an SCell from an sTAG to a pTAG, at least one RRC message, such as at least one RRC reconfiguration message, may be sent to the wireless device. The at least one RRC message may be sent to the wireless device to reconfigure TAG configurations, e.g., by releasing the SCell and configuring the SCell as a part of the pTAG. If, e.g., an SCell is added or configured without a TAG index, the SCell may be explicitly assigned to the pTAG. The PCell may not change its TA group and may be a member of the pTAG.

In LTE Release-10 and Release-11 CA, a PUCCH transmission is only transmitted on a PCell (e.g., a PSCell) to an eNB. In LTE-Release 12 and earlier, a wireless device may transmit PUCCH information on one cell (e.g., a PCell or a PSCell) to a given eNB. As the number of CA capable wireless devices increase, and as the number of aggregated carriers increase, the number of PUCCHs and the PUCCH payload size may increase. Accommodating the PUCCH transmissions on the PCell may lead to a high PUCCH load on the PCell. A PUCCH on an SCell may be used to offload the PUCCH resource from the PCell. More than one PUCCH may be configured. For example, a PUCCH on a PCell may be configured and another PUCCH on an SCell may be configured. One, two, or more cells may be configured with PUCCH resources for transmitting CSI, acknowledgment (ACK), and/or non-acknowledgment (NACK) to a base station. Cells may be grouped into multiple PUCCH groups, and one or more cell within a group may be configured with a PUCCH. In some examples, one SCell may belong to one PUCCH group. SCells with a configured PUCCH transmitted to a base station may be called a PUCCH SCell, and a cell group with a common PUCCH resource transmitted to the same base station may be called a PUCCH group.

A MAC entity may have a configurable timer, e.g., timeAlignmentTimer, per TAG. The timeAlignmentTimer may be used to control how long the MAC entity considers the serving cells belonging to the associated TAG to be uplink time aligned. If a Timing Advance Command MAC control element is received, the MAC entity may apply the Timing Advance Command for the indicated TAG; and/or the MAC entity may start or restart the timeAlignmentTimer associated with a TAG that may be indicated by the Timing Advance Command MAC control element. If a Timing Advance Command is received in a Random Access Response message for a serving cell belonging to a TAG, the MAC entity may apply the Timing Advance Command for this TAG and/or start or restart the timeAlignmentTimer associated with this TAG. Additionally or alternatively, if the Random Access Preamble is not selected by the MAC entity, the MAC entity may apply the Timing Advance Command for this TAG and/or start or restart the timeAlignmentTimer associated with this TAG. If the timeAlignmentTimer associated with this TAG is not running, the Timing Advance Command for this TAG may be applied, and the timeAlignmentTimer associated with this TAG may be started. If the contention resolution is not successful, a timeAlignmentTimer associated with this TAG may be stopped. If the contention resolution is successful, the MAC entity may ignore the received Timing Advance Command. The MAC entity may determine whether the contention resolution is successful or whether the contention resolution is not successful.

FIG. 10A and FIG. 10B show examples for interfaces between a 5G core network (e.g., NGC) and base stations (e.g., gNB and eLTE eNB). A base station, such as a gNB 1020, may be interconnected to an NGC 1010 control plane employing an NG-C interface. The base station, e.g., the gNB 1020, may also be interconnected to an NGC 1010 user plane (e.g., UPGW) employing an NG-U interface. As another example, a base station, such as an eLTE eNB 1040, may be interconnected to an NGC 1030 control plane employing an NG-C interface. The base station, e.g., the eLTE eNB 1040, may also be interconnected to an NGC 1030 user plane (e.g., UPGW) employing an NG-U interface. An NG interface may support a many-to-many relation between 5G core networks and base stations.

FIG. 11A, FIG. 11B, FIG. 11C, FIG. 11D, FIG. 11E, and FIG. 11F are examples for architectures of tight interworking between a 5G RAN and an LTE RAN. The tight interworking may enable a multiple receiver/transmitter (RX/TX) wireless device in an RRC_CONNECTED state to be configured to utilize radio resources provided by two schedulers located in two base stations (e.g., an eLTE eNB and a gNB). The two base stations may be connected via a non-ideal or ideal backhaul over the Xx interface between an LTE eNB and a gNB, or over the Xn interface between an eLTE eNB and a gNB. Base stations involved in tight interworking for a certain wireless device may assume different roles. For example, a base station may act as a master base station or a base station may act as a secondary base station. In tight interworking, a wireless device may be connected to both a master base station and a secondary base station. Mechanisms implemented in tight interworking may be extended to cover more than two base stations.

A master base station may be an LTE eNB 1102A or an LTE eNB 1102B, which may be connected to EPC nodes 1101A or 1101B, respectively. This connection to EPC nodes may be, e.g., to an MME via the S1-C interface and/or to an S-GW via the S1-U interface. A secondary base station may be a gNB 1103A or a gNB 1103B, either or both of which may be a non-standalone node having a control plane connection via an Xx-C interface to an LTE eNB (e.g., the LTE eNB 1102A or the LTE eNB 1102B). In the tight interworking architecture of FIG. 11A, a user plane for a gNB (e.g., the gNB 1103A) may be connected to an S-GW (e.g., the EPC 1101A) through an LTE eNB (e.g., the LTE eNB 1102A), via an Xx-U interface between the LTE eNB and the gNB, and via an S1-U interface between the LTE eNB and the S-GW. In the architecture of FIG. 11B, a user plane for a gNB (e.g., the gNB 1103B) may be connected directly to an S-GW (e.g., the EPC 1101B) via an S1-U interface between the gNB and the S-GW.

A master base station may be a gNB 1103C or a gNB 1103D, which may be connected to NGC nodes 1101C or 1101D, respectively. This connection to NGC nodes may be, e.g., to a control plane core node via the NG-C interface and/or to a user plane core node via the NG-U interface. A secondary base station may be an eLTE eNB 1102C or an eLTE eNB 1102D, either or both of which may be a non-standalone node having a control plane connection via an Xn-C interface to a gNB (e.g., the gNB 1103C or the gNB 1103D). In the tight interworking architecture of FIG. 11C, a user plane for an eLTE eNB (e.g., the eLTE eNB 1102C) may be connected to a user plane core node (e.g., the NGC 1101C) through a gNB (e.g., the gNB 1103C), via an Xn-U interface between the eLTE eNB and the gNB, and via an NG-U interface between the gNB and the user plane core node. In the architecture of FIG. 11D, a user plane for an eLTE eNB (e.g., the eLTE eNB 1102D) may be connected directly to a user plane core node (e.g., the NGC 1101D) via an NG-U interface between the eLTE eNB and the user plane core node.

A master base station may be an eLTE eNB 1102E or an eLTE eNB 1102F, which may be connected to NGC nodes 1101E or 1101F, respectively. This connection to NGC nodes may be, e.g., to a control plane core node via the NG-C interface and/or to a user plane core node via the NG-U interface. A secondary base station may be a gNB 1103E or a gNB 1103F, either or both of which may be a non-standalone node having a control plane connection via an Xn-C interface to an eLTE eNB (e.g., the eLTE eNB 1102E or the eLTE eNB 1102F). In the tight interworking architecture of FIG. 11E, a user plane for a gNB (e.g., the gNB 1103E) may be connected to a user plane core node (e.g., the NGC 1101E) through an eLTE eNB (e.g., the eLTE eNB 1102E), via an Xn-U interface between the eLTE eNB and the gNB, and via an NG-U interface between the eLTE eNB and the user plane core node. In the architecture of FIG. 11F, a user plane for a gNB (e.g., the gNB 1103F) may be connected directly to a user plane core node (e.g., the NGC 1101F) via an NG-U interface between the gNB and the user plane core node.

FIG. 12A, FIG. 12B, and FIG. 12C are examples for radio protocol structures of tight interworking bearers.

An LTE eNB 1201A may be an S1 master base station, and a gNB 1210A may be an S1 secondary base station. An example for a radio protocol architecture for a split bearer and an SCG bearer is shown. The LTE eNB 1201A may be connected to an EPC with a non-standalone gNB 1210A, via an Xx interface between the PDCP 1206A and an NR RLC 1212A. The LTE eNB 1201A may include protocol layers MAC 1202A, RLC 1203A and RLC 1204A, and PDCP 1205A and PDCP 1206A. An MCG bearer type may interface with the PDCP 1205A, and a split bearer type may interface with the PDCP 1206A. The gNB 1210A may include protocol layers NR MAC 1211A, NR RLC 1212A and NR RLC 1213A, and NR PDCP 1214A. An SCG bearer type may interface with the NR PDCP 1214A.

A gNB 1201B may be an NG master base station, and an eLTE eNB 1210B may be an NG secondary base station. An example for a radio protocol architecture for a split bearer and an SCG bearer is shown. The gNB 1201B may be connected to an NGC with a non-standalone eLTE eNB 1210B, via an Xn interface between the NR PDCP 1206B and an RLC 1212B. The gNB 1201B may include protocol layers NR MAC 1202B, NR RLC 1203B and NR RLC 1204B, and NR PDCP 1205B and NR PDCP 1206B. An MCG bearer type may interface with the NR PDCP 1205B, and a split bearer type may interface with the NR PDCP 1206B. The eLTE eNB 1210B may include protocol layers MAC 1211B, RLC 1212B and RLC 1213B, and PDCP 1214B. An SCG bearer type may interface with the PDCP 1214B.

An eLTE eNB 1201C may be an NG master base station, and a gNB 1210C may be an NG secondary base station. An example for a radio protocol architecture for a split bearer and an SCG bearer is shown. The eLTE eNB 1201C may be connected to an NGC with a non-standalone gNB 1210C, via an Xn interface between the PDCP 1206C and an NR RLC 1212C. The eLTE eNB 1201C may include protocol layers MAC 1202C, RLC 1203C and RLC 1204C, and PDCP 1205C and PDCP 1206C. An MCG bearer type may interface with the PDCP 1205C, and a split bearer type may interface with the PDCP 1206C. The gNB 1210C may include protocol layers NR MAC 1211C, NR RLC 1212C and NR RLC 1213C, and NR PDCP 1214C. An SCG bearer type may interface with the NR PDCP 1214C.

In a 5G network, the radio protocol architecture that a particular bearer uses may depend on how the bearer is setup. At least three alternatives may exist, e.g., an MCG bearer, an SCG bearer, and a split bearer, such as shown in FIG. 12A, FIG. 12B, and FIG. 12C. The NR RRC may be located in a master base station, and the SRBs may be configured as an MCG bearer type and may use the radio resources of the master base station. Tight interworking may have at least one bearer configured to use radio resources provided by the secondary base station. Tight interworking may or may not be configured or implemented.

The wireless device may be configured with two MAC entities: e.g., one MAC entity for a master base station, and one MAC entity for a secondary base station. In tight interworking, the configured set of serving cells for a wireless device may comprise of two subsets: e.g., the Master Cell Group (MCG) including the serving cells of the master base station, and the Secondary Cell Group (SCG) including the serving cells of the secondary base station.

At least one cell in a SCG may have a configured UL CC and one of them, e.g., a PSCell (or the PCell of the SCG, which may also be called a PCell), is configured with PUCCH resources. If the SCG is configured, there may be at least one SCG bearer or one split bearer. If one or more of a physical layer problem or a random access problem is detected on a PSCell, if the maximum number of (NR) RLC retransmissions associated with the SCG has been reached, and/or if an access problem on a PSCell during an SCG addition or during an SCG change is detected, then: an RRC connection re-establishment procedure may not be triggered, UL transmissions towards cells of the SCG may be stopped, a master base station may be informed by the wireless device of a SCG failure type, and/or for a split bearer the DL data transfer over the master base station may be maintained. The RLC AM bearer may be configured for the split bearer. Like the PCell, a PSCell may not be de-activated. A PSCell may be changed with an SCG change, e.g., with security key change and a RACH procedure. A direct bearer type change, between a split bearer and an SCG bearer, may not be supported. Simultaneous configuration of an SCG and a split bearer may not be supported.

A master base station and a secondary base station may interact. The master base station may maintain the RRM measurement configuration of the wireless device. The master base station may determine to ask a secondary base station to provide additional resources (e.g., serving cells) for a wireless device. This determination may be based on, e.g., received measurement reports, traffic conditions, and/or bearer types. If a request from the master base station is received, a secondary base station may create a container that may result in the configuration of additional serving cells for the wireless device, or the secondary base station may determine that it has no resource available to do so. The master base station may provide at least part of the AS configuration and the wireless device capabilities to the secondary base station, e.g., for wireless device capability coordination. The master base station and the secondary base station may exchange information about a wireless device configuration such as by using RRC containers (e.g., inter-node messages) carried in Xn or Xx messages. The secondary base station may initiate a reconfiguration of its existing serving cells (e.g., PUCCH towards the secondary base station). The secondary base station may determine which cell is the PSCell within the SCG. The master base station may not change the content of the RRC configuration provided by the secondary base station. If an SCG is added and/or an SCG SCell is added, the master base station may provide the latest measurement results for the SCG cell(s). Either or both of a master base station and a secondary base station may know the SFN and subframe offset of each other by OAM, (e.g., for the purpose of DRX alignment and identification of a measurement gap). If a new SCG SCell is added, dedicated RRC signaling may be used for sending required system information of the cell, such as for CA, except, e.g., for the SFN acquired from an MIB of the PSCell of an SCG.

FIG. 13A and FIG. 13B show examples for gNB deployment. A core 1301 and a core 1310 may interface with other nodes via RAN-CN interfaces. In a non-centralized deployment example, the full protocol stack (e.g., NR RRC, NR PDCP, NR RLC, NR MAC, and NR PHY) may be supported at one node, such as a gNB 1302, a gNB 1303, and/or an eLTE eNB or LTE eNB 1304. These nodes (e.g., the gNB 1302, the gNB 1303, and the eLTE eNB or LTE eNB 1304) may interface with one of more of each other via a respective inter-BS interface. In a centralized deployment example, upper layers of a gNB may be located in a Central Unit (CU) 1311, and lower layers of the gNB may be located in Distributed Units (DU) 1312, 1313, and 1314. The CU-DU interface (e.g., Fs interface) connecting CU 1311 and DUs 1312, 1312, and 1314 may be ideal or non-ideal. The Fs-C may provide a control plane connection over the Fs interface, and the Fs-U may provide a user plane connection over the Fs interface. In the centralized deployment, different functional split options between the CU 1311 and the DUs 1312, 1313, and 1314 may be possible by locating different protocol layers (e.g., RAN functions) in the CU 1311 and in the DU 1312, 1313, and 1314. The functional split may support flexibility to move the RAN functions between the CU 1311 and the DUs 1312, 1313, and 1314 depending on service requirements and/or network environments. The functional split option may change during operation (e.g., after the Fs interface setup procedure), or the functional split option may change only in the Fs setup procedure (e.g., the functional split option may be static during operation after Fs setup procedure).

Figure 14:
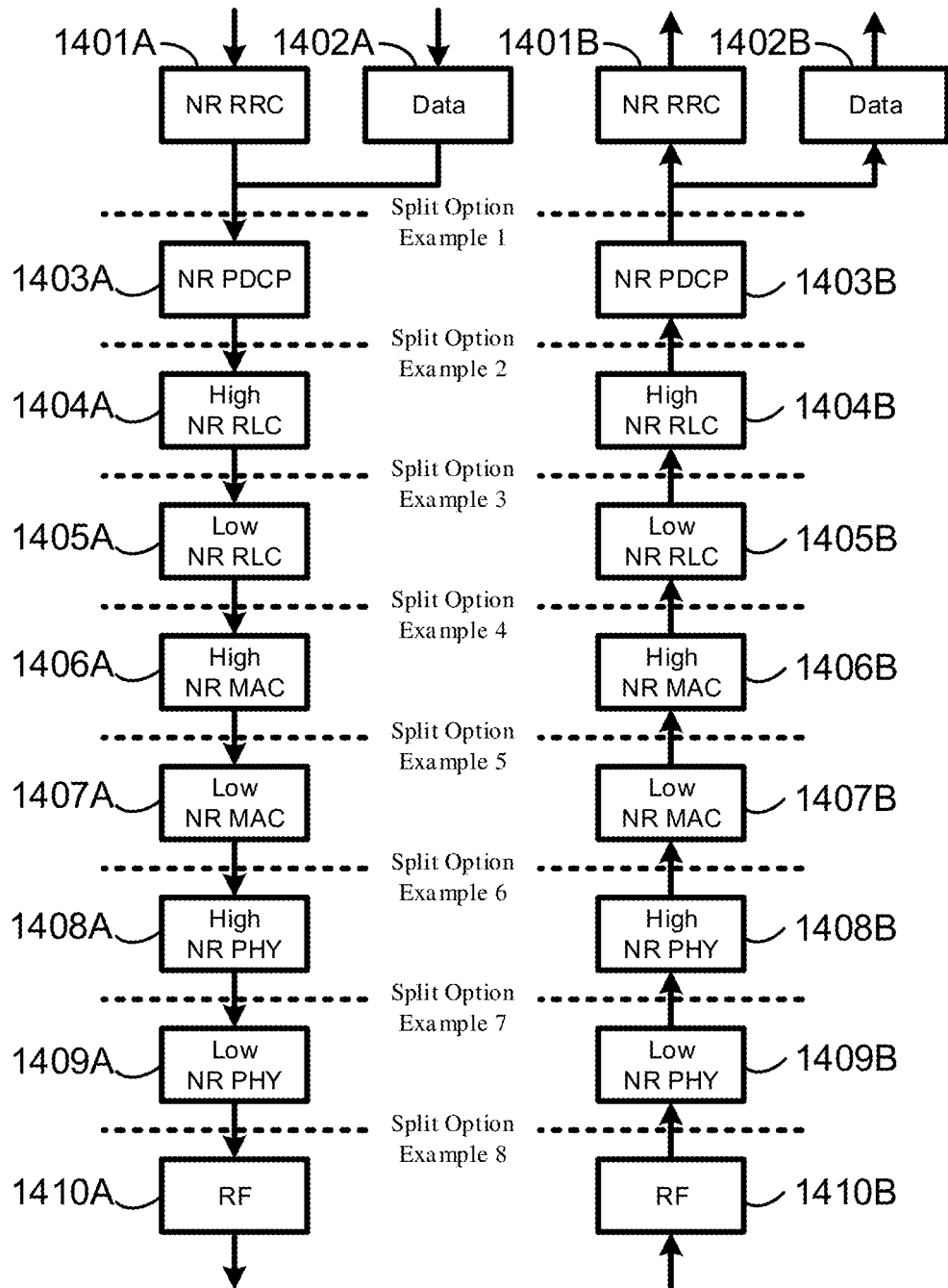
FIG. 14 shows functional split option examples of a centralized gNB deployment.

FIG. 14 shows examples for different functional split options of a centralized gNB deployment. Element numerals that are followed by "A" or "B" designations in FIG. 14 may represent the same elements in different traffic flows, e.g., either receiving data (e.g., data 1402A) or sending data (e.g., 1402B). In the split option example 1, an NR RRC 1401 may be in a CU, and an NR PDCP 1403, an NR RLC (e.g., comprising a High NR RLC 1404 and/or a Low NR RLC 1405), an NR MAC (e.g., comprising a High NR MAC 1406 and/or a Low NR MAC 1407), an NR PHY (e.g., comprising a High NR PHY 1408 and/or a LOW NR PHY 1409), and an RF 1410 may be in a DU. In the split option example 2, the NR RRC 1401 and the NR PDCP 1403 may be in a CU, and the NR RLC, the NR MAC, the NR PHY, and the RF 1410 may be in a DU. In the split option example 3, the NR RRC 1401, the NR PDCP 1403, and a partial function of the NR RLC (e.g., the High NR RLC 1404) may be in a CU, and the other partial function of the NR RLC (e.g., the Low NR RLC 1405), the NR MAC, the NR PHY, and the RF 1410 may be in a DU. In the split option example 4, the NR RRC 1401, the NR PDCP 1403, and the NR RLC may be in a CU, and the NR MAC, the NR PHY, and the RF 1410 may be in a DU. In the split option example 5, the NR RRC 1401, the NR PDCP 1403, the NR RLC, and a partial function of the NR MAC (e.g., the High NR MAC 1406) may be in a CU, and the other partial function of the NR MAC (e.g., the Low NR MAC 1407), the NR PHY, and the RF 1410 may be in a DU. In the split option example 6, the NR RRC 1401, the NR PDCP 1403, the NR RLC, and the NR MAC may be in CU, and the NR PHY and the RF 1410 may be in a DU. In the split option example 7, the NR RRC 1401, the NR PDCP 1403, the NR RLC, the NR MAC, and a partial function of the NR PHY (e.g., the High NR PHY 1408) may be in a CU, and the other partial function of the NR PHY (e.g., the Low NR PHY 1409) and the RF 1410 may be in a DU. In the split option example 8, the NR RRC 1401, the NR PDCP 1403, the NR RLC, the NR MAC, and the NR PHY may be in a CU, and the RF 1410 may be in a DU.

The functional split may be configured per CU, per DU, per wireless device, per bearer, per slice, and/or with other granularities. In a per CU split, a CU may have a fixed split, and DUs may be configured to match the split option of the CU. In a per DU split, each DU may be configured with a different split, and a CU may provide different split options for different DUs. In a per wireless device split, a gNB (e.g., a CU and a DU) may provide different split options for different wireless devices. In a per bearer split, different split options may be utilized for different bearer types. In a per slice splice, different split options may be applied for different slices.

A new radio access network (new RAN) may support different network slices, which may allow differentiated treatment customized to support different service requirements with end to end scope. The new RAN may provide a differentiated handling of traffic for different network slices that may be pre-configured, and the new RAN may allow a single RAN node to support multiple slices. The new RAN may support selection of a RAN part for a given network slice, e.g., by one or more slice ID(s) or NSSAI(s) provided by a wireless device or provided by an NGC (e.g., an NG CP). The slice ID(s) or NSSAI(s) may identify one or more of pre-configured network slices in a PLMN. For an initial attach, a wireless device may provide a slice ID and/or an NSSAI, and a RAN node (e.g., a gNB) may use the slice ID or the NSSAI for routing an initial NAS signaling to an NGC control plane function (e.g., an NG CP). If a wireless device does not provide any slice ID or NSSAI, a RAN node may send a NAS signaling to a default NGC control plane function. For subsequent accesses, the wireless device may provide a temporary ID for a slice identification, which may be assigned by the NGC control plane function, to enable a RAN node to route the NAS message to a relevant NGC control plane function. The new RAN may support resource isolation between slices. If the RAN resource isolation is implemented, shortage of shared resources in one slice does not cause a break in a service level agreement for another slice.

The amount of data traffic carried over networks is expected to increase for many years to come. The number of users and/or devices is increasing and each user/device accesses an increasing number and variety of services, e.g., video delivery, large files, and images. This requires not only high capacity in the network, but also provisioning very high data rates to meet customers' expectations on interactivity and responsiveness. More spectrum may be required for network operators to meet the increasing demand. Considering user expectations of high data rates along with seamless mobility, it is beneficial that more spectrum be made available for deploying macro cells as well as small cells for communication systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, if present, may be an effective complement to licensed spectrum for network operators, e.g., to help address the traffic explosion in some examples, such as hotspot areas. Licensed Assisted Access (LAA) offers an alternative for operators to make use of unlicensed spectrum, e.g., if managing one radio network, offering new possibilities for optimizing the network's efficiency.

Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

Discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access, e.g., via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by wireless devices, time synchronization of wireless devices, and frequency synchronization of wireless devices.

DL LAA design may employ subframe boundary alignment according to LTE-A carrier aggregation timing relationships across serving cells aggregated by CA. This may not indicate that the eNB transmissions may start only at the subframe boundary. LAA may support transmitting PDSCH if not all OFDM symbols are available for transmission in a subframe according to LBT. Delivery of necessary control information for the PDSCH may also be supported.

LBT procedures may be employed for fair and friendly coexistence of LAA with other operators and technologies operating in unlicensed spectrum. LBT procedures on a node attempting to transmit on a carrier in unlicensed spectrum may require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. Nodes may follow such regulatory requirements. A node may optionally use a lower threshold for energy detection than that specified by regulatory requirements. LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. A Category 4 LBT mechanism or other type of LBT mechanisms may be implemented.

Various example LBT mechanisms may be implemented. For some signals, in some implementation scenarios, in some situations, and/or in some frequencies, no LBT procedure may performed by the transmitting entity. For example, Category 2 (e.g., LBT without random back-off) may be implemented. The duration of time that the channel is sensed to be idle before the transmitting entity transmits may be deterministic. For example, Category 3 (e.g., LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle, e.g., before the transmitting entity transmits on the channel. For example, Category 4 (e.g., LBT with random back-off with a contention window of variable size) may be implemented. The transmitting entity may draw a random number N within a contention window. The size of contention window may be specified by the minimum and maximum value of N. The transmitting entity may vary the size of the contention window if drawing the random number N. The random number N may be used in the LBT procedure to determine the duration of time that the channel is sensed to be idle, e.g., before the transmitting entity transmits on the channel.

LAA may employ uplink LBT at the wireless device. The UL LBT scheme may be different from the DL LBT scheme, e.g., by using different LBT mechanisms or parameters. These differences in schemes may be due to the LAA UL being based on scheduled access, which may affect a wireless device's channel contention opportunities. Other considerations motivating a different UL LBT scheme may include, but are not limited to, multiplexing of multiple wireless devices in a single subframe.

LAA may use uplink LBT at the wireless device. The UL LBT scheme may be different from the DL LBT scheme, e.g., by using different LBT mechanisms or parameters. These differences in schemes may be due to the LAA UL being based on scheduled access, which may affect a wireless device's channel contention opportunities. Other considerations motivating a different UL LBT scheme may include, but are not limited to, multiplexing of multiple wireless devices in a single subframe.

A DL transmission burst may be a continuous transmission from a DL transmitting node, e.g., with no transmission immediately before or after from the same node on the same CC. An UL transmission burst from a wireless device perspective may be a continuous transmission from a wireless device, e.g., with no transmission immediately before or after from the same wireless device on the same CC. A UL transmission burst may be defined from a wireless device perspective or from an eNB perspective. If an eNB is operating DL and UL LAA over the same unlicensed carrier, DL transmission burst(s) and UL transmission burst(s) on LAA may be scheduled in a TDM manner over the same unlicensed carrier. An instant in time may be part of a DL transmission burst or part of an UL transmission burst.

A base station may transmit a plurality of beams to a wireless device. A serving beam may be determined, from the plurality of beams, for the wireless communications between the base station and the wireless device. One or more candidate beams may also be determined, from the plurality of beams, for providing the wireless communications if a beam failure event occurs, for example, such that the serving beam becomes unable to provide the desired communications. One or more candidate beams may be determined by a wireless device and/or by a base station. By determining and configuring a candidate beam, the wireless device and base station may continue wireless communications if the serving beam experiences a beam failure event.

Single beam and multi-beam operations may be supported, for example, in a NR (New Radio) system. In a multi-beam example, a base station (e.g., gNB) may perform a downlink beam sweep to provide coverage for downlink Synchronization Signals (SSs) and common control channels. Wireless devices may perform uplink beam sweeps for uplink direction to access a cell. For a single beam, a base station may configure time-repetition within one SS block. This time-repetition may comprise, for example, one or more of a primary synchronization signal (PSS), a secondary synchronization signal (SSS), or a physical broadcast channel (PBCH). These signals may be in a wide beam. In a multi-beam example, a base station may configure one or more of these signals and physical channels, such as in an SS block, in multiple beams. A wireless device may identify, for example, from an SS block, an OFDM symbol index, a slot index in a radio frame, and a radio frame number from an SS block.

Figure 15:
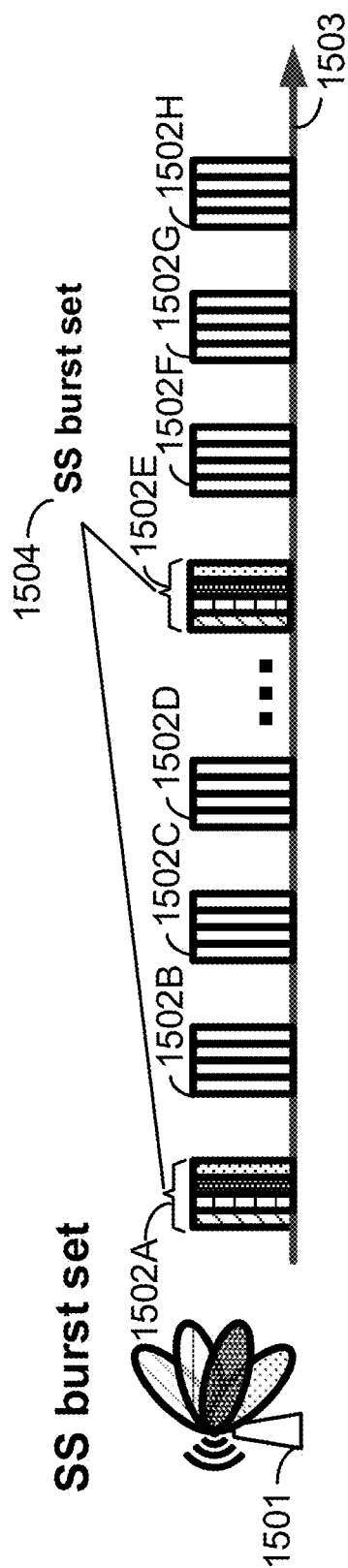
FIG. 15 shows an example of configuration of a synchronization signal burst set.

In an RRC_INACTIVE state or in an RRC_IDLE state, a wireless device may assume that SS blocks form an SS burst and an SS burst set. An SS burst set may have a given periodicity. SS blocks may be transmitted together in multiple beams (e.g., in multiple beam examples) to form an SS burst. One or more SS blocks may be transmitted via one beam. A beam may have a steering direction. If multiple SS bursts transmit beams, these SS bursts together may form an SS burst set, such as shown in FIG. 15. A base station 1501 (e.g., a gNB in NR) may transmit SS bursts 1502A to 1502H during time periods 1503. A plurality of these SS bursts may comprise an SS burst set, such as an SS burst set 1504 (e.g., SS bursts 1502A and 1502E). An SS burst set may comprise any number of a plurality of SS bursts 1502A to 1502H. Each SS burst within an SS burst set may transmitted at a fixed or variable periodicity during time periods 1503.

In a multi-beam example, one or more of PSS, SSS, or PBCH signals may be repeated for a cell, for example, to support cell selection, cell reselection, and/or initial access procedures. For an SS burst, an associated PBCH or a physical downlink shared channel (PDSCH) scheduling system information may be broadcasted by a base station to multiple wireless devices. The PDSCH may be indicated by a physical downlink control channel (PDCCH) in a common search space. The system information may comprise system information block type 2 (SIB2). SIB2 may carry a physical random access channel (PRACH) configuration for a beam. For a beam, a base station (e.g., a gNB in NR) may have a RACH configuration which may include a PRACH preamble pool, time and/or frequency radio resources, and other power related parameters. A wireless device may use a PRACH preamble from a RACH configuration to initiate a contention-based RACH procedure or a contention-free RACH procedure. A wireless device may perform a 4-step RACH procedure, which may be a contention-based RACH procedure or a contention-free RACH procedure. The wireless device may select a beam associated with an SS block that may have the best receiving signal quality. The wireless device may successfully detect a cell identifier that may be associated with the cell and decode system information with a RACH configuration. The wireless device may use one PRACH preamble and select one PRACH resource from RACH resources indicated by the system information associated with the selected beam. A PRACH resource may comprise at least one of: a PRACH index indicating a PRACH preamble, a PRACH format, a PRACH numerology, time and/or frequency radio resource allocation, power setting of a PRACH transmission, and/or other radio resource parameters. For a contention-free RACH procedure, the PRACH preamble and resource may be indicated in a DCI or other high layer signaling.

Figure 16:
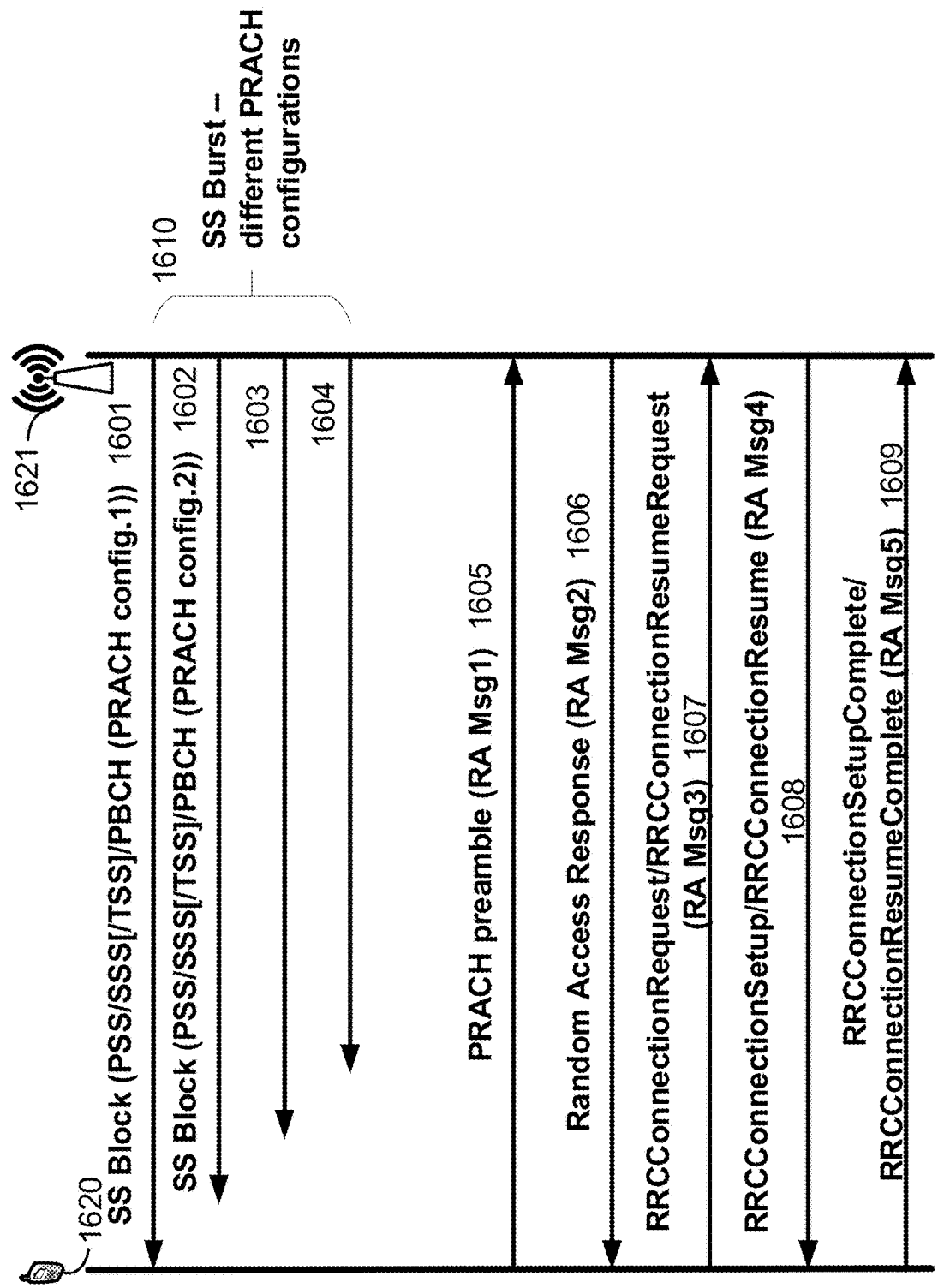
FIG. 16 shows an example of a random access procedure.

FIG. 16 shows an example of a random access procedure (e.g., via a RACH) that may include sending, by a base station, one or more SS blocks. A wireless device 1620 (e.g., a UE) may transmit one or more preambles to a base station 1621 (e.g., a gNB in NR). Each preamble transmission by the wireless device may be associated with a separate random access procedure, such as shown in FIG. 16. The random access procedure may begin at step 1601 with a base station 1621 (e.g., a gNB in NR) sending a first SS block to a wireless device 1621 (e.g., a UE). Any of the SS blocks may comprise one or more of a PSS, SSS, tertiary synchronization signal (TSS), or PBCH signal. The first SS block in step 1601 may be associated with a first PRACH configuration. At step 1602, the base station 1621 may send to the wireless device 1620 a second SS block that may be associated with a second PRACH configuration. At step 1603, the base station 1621 may send to the wireless device 1620 a third SS block that may be associated with a third PRACH configuration. At step 1604, the base station 1621 may send to the wireless device 1620 a fourth SS block that may be associated with a fourth PRACH configuration. Any number of SS blocks may be sent in the same manner in addition to, or replacing, steps 1603 and 1604. An SS burst may comprise any number of SS blocks. For example, SS burst 1610 comprises the three SS blocks sent during steps 1602-1604.

The wireless device 1620 may send to the base station 1621 a preamble, at step 1605, for example, after or in response to receiving one or more SS blocks or SS bursts. The preamble may comprise a PRACH preamble, and may be referred to as RA Msg 1. The PRACH preamble may be transmitted in step 1605 according to or based on a PRACH configuration that may be received in an SS block (e.g., one of the SS blocks from steps 1601-1604) that may be determined to be the best SS block beam. The wireless device 1620 may determine a best SS block beam from among SS blocks it may receive prior to sending the PRACH preamble. The base station 1621 may send a random access response (RAR), which may be referred to as RA Msg2, at step 1606, for example, after or in response to receiving the PRACH preamble. The RAR may be transmitted in step 1606 via a DL beam that corresponds to the SS block beam associated with the PRACH configuration. The base station 1621 may determine the best SS block beam from among SS blocks it previously sent prior to receiving the PRACH preamble. The base station 1621 may receive the PRACH preamble according to or based on the PRACH configuration associated with the best SS block beam.

The wireless device 1620 may send to the base station 1621 an RRCConnectionRequest and/or RRCConnectionResumeRequest message, which may be referred to as RA Msg3, at step 1607, for example, after or in response to receiving the RAR. The base station 1621 may send to the wireless device 1620 an RRCConnectionSetup and/or RRCConnectionResume message, which may be referred to as RA Msg4, at step 1608, for example, after or in response to receiving the RRCConnectionRequest and/or RRCConnectionResumeRequest message. The wireless device 1620 may send to the base station 1621 an RRCConnectionSetupComplete and/or RRCConnectionResumeComplete message, which may be referred to as RA Msg5, at step 1609, for example, after or in response to receiving the RRCConnectionSetup and/or RRCConnectionResume. An RRC connection may be established between the wireless device 1620 and the base station 1621, and the random access procedure may end, for example, after or in response to receiving the RRCConnectionSetupComplete and/or RRCConnectionResumeComplete message.

A best beam, including but not limited to a best SS block beam, may be determined based on a channel state information reference signal (CSI-RS). A wireless device may use a CSI-RS in a multi-beam system for estimating the beam quality of the links between the wireless device and a base station. For example, based on a measurement of a CSI-RS, a wireless device may report CSI for downlink channel adaption. A CSI parameter may include a precoding matrix index (PMI), a channel quality index (CQI) value, and/or a rank indicator (RI). A wireless device may report a beam index based on a reference signal received power (RSRP) measurement on a CSI-RS. The wireless device may report the beam index in a CSI resource indication (CRI) for downlink beam selection. A base station may transmit a CSI-RS via a CSI-RS resource, such as via one or more antenna ports, or via one or more time and/or frequency radio resources. A beam may be associated with a CSI-RS. A CSI-RS may comprise an indication of a beam direction. Each of a plurality of beams may be associated with one of a plurality of CSI-RSs. A CSI-RS resource may be configured in a cell-specific way, for example, via common RRC signaling. Additionally or alternatively, a CSI-RS resource may be configured in a wireless device-specific way, for example, via dedicated RRC signaling and/or layer 1 and/or layer 2 (L1/L2) signaling. Multiple wireless devices in or served by a cell may measure a cell-specific CSI-RS resource. A dedicated subset of wireless devices in or served by a cell may measure a wireless device-specific CSI-RS resource. A base station may transmit a CSI-RS resource periodically, using aperiodic transmission, or using a multi-shot or semi-persistent transmission. In a periodic transmission, a base station may transmit the configured CSI-RS resource using a configured periodicity in the time domain. In an aperiodic transmission, a base station may transmit the configured CSI-RS resource in a dedicated time slot. In a multi-shot or semi-persistent transmission, a base station may transmit the configured CSI-RS resource in a configured period. A base station may configure different CSI-RS resources in different terms for different purposes. Different terms may include, for example, cell-specific, device-specific, periodic, aperiodic, multi-shot, or other terms. Different purposes may include, for example, beam management, CQI reporting, or other purposes.

Figure 17:
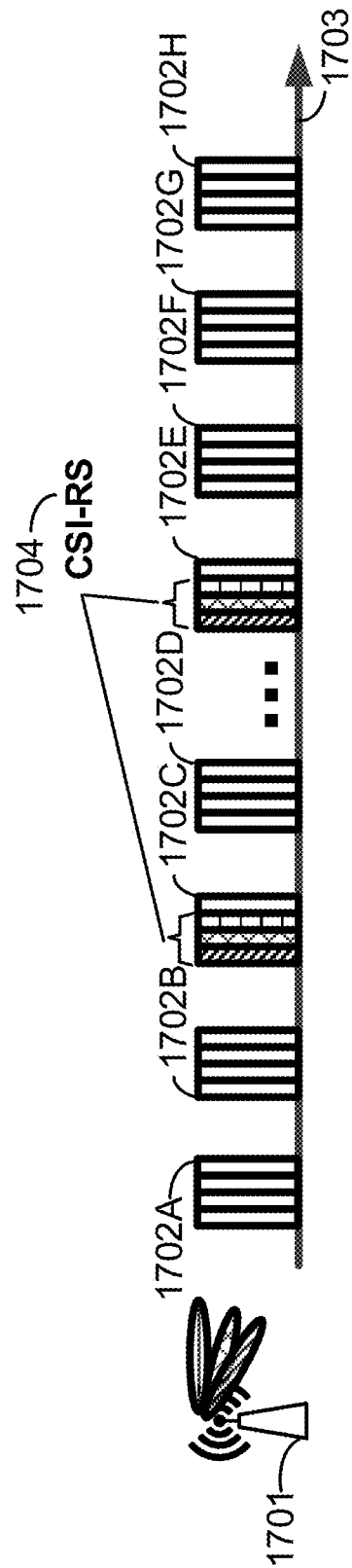
FIG. 17 shows an example of transmitting channel state information reference signals for a beam.

FIG. 17 shows an example of transmitting CSI-RS s periodically for a beam. A base station 1701 may transmit a beam in a predefined order in the time domain, such as during time periods 1703. Beams used for a CSI-RS transmission, such as for CSI-RS 1704 in transmissions 1702C and/or 1703E, may have a different beam width relative to a beam width for SS-blocks transmission, such as for SS blocks 1702A, 1702B, 1702D, and 1702F-1702H. Additionally or alternatively, a beam width of a beam used for a CSI-RS transmission may have the same value as a beam width for an SS block. Some or all of one or more CSI-RSs may be included in one or more beams. An SS block may occupy a number of OFDM symbols (e.g., 4), and a number of subcarriers (e.g., 240), carrying a synchronization sequence signal. The synchronization sequence signal may identify a cell.

Figure 18:
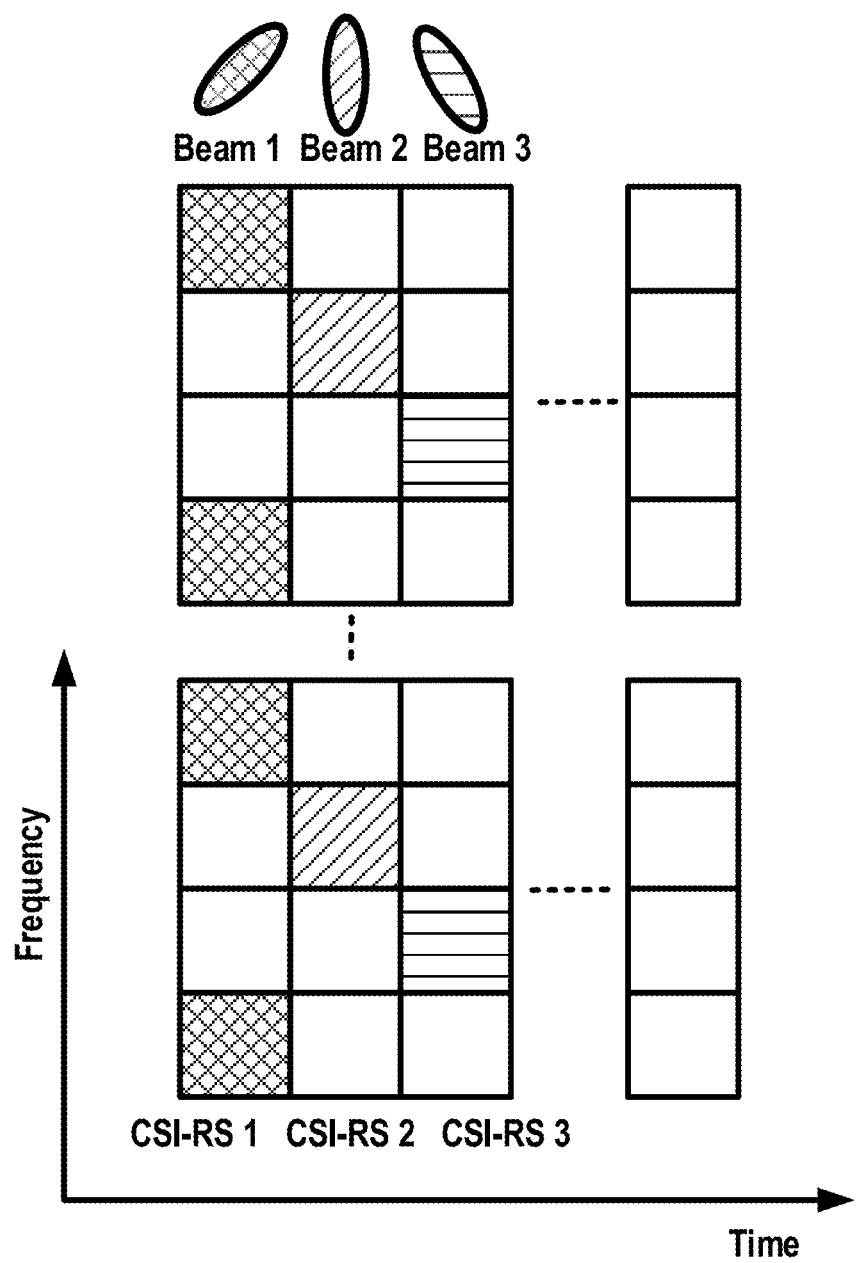
FIG. 18 shows an example of channel state information reference signal mapping.

FIG. 18 shows an example of a CSI-RS that may be mapped in time and frequency domains. Each square shown in FIG. 18 may represent a resource block within a bandwidth of a cell. Each resource block may comprise a number of subcarriers. A cell may have a bandwidth comprising a number of resource blocks. A base station (e.g., a gNB in NR) may transmit one or more Radio Resource Control (RRC) messages comprising CSI-RS resource configuration parameters for one or more CSI-RS. One or more of the following parameters may be configured by higher layer signaling for each CSI-RS resource configuration: CSI-RS resource configuration identity, number of CSI-RS ports, CSI-RS configuration (e.g., symbol and RE locations in a subframe), CSI-RS subframe configuration (e.g., subframe location, offset, and periodicity in a radio frame), CSI-RS power parameter, CSI-RS sequence parameter, code division multiplexing (CDM) type parameter, frequency density, transmission comb, QCL parameters (e.g., QCL-scramblingidentity, crs-portscount, mbsfn-subframeconfiglist, csi-rs-configZPid, qcl-csi-rs-configNZPid), and/or other radio resource parameters.

CSI-RS may be configured using common parameters, for example, when a plurality of wireless devices receive the same CSI-RS signal. CSI-RS may be configured using wireless device dedicated parameters, for example, when a CSI-RS is configured for a specific wireless device. CSI-RSs may be included in RRC signaling. A wireless device may be configured, for example, depending on different MIMO beamforming types (e.g., CLASS A or CLASS B), with one or more CSI-RS resource configurations per each CSI process. As an example, a wireless device may be configured using at least one of the RRC signaling shown in FIGS. 19A to 19B.

CSI-RS resources may be activated or deactivated (e.g., for some types of MIMO beamforming) by using MAC signaling. A device (e.g., a base station) communicating in a network may activate and/or deactivate configured CSI-RS resources of a serving cell by sending an activation/deactivation CSI-RS resources MAC control element. The configured CSI-RS resources may be initially deactivated, for example, during configuration and/or after a handover.

FIG. 20A shows an example of an activation/deactivation CSI-RS resources MAC control element. The activation/deactivation CSI-RS resources MAC control element may be identified by a MAC subheader with LCID. The activation/deactivation CSI-RS resources MAC control element may have a variable size that may be based on the number of CSI processes configured with csi-RS-NZP-Activation by RRC (N). The N number of octets, shown in FIG. 20A, each of which may comprise a number of A fields (e.g., A1 to Ai, described below), may be included in ascending order of a CSI process ID, such as the CSI-ProcessId.

FIG. 20B shows an example of an activation/deactivation CSI-RS command that may activate and/or deactivate CSI-RS resources for a CSI process. For example, for a wireless device that is configured with transmission mode 9, N equals 1. Transmission mode 9 may be a transmission mode in which a base station may transmit data packets with up to 8 layers, for example, if configured with multiple antennas. A wireless device may receive the data packets based on multiple DMRSs (e.g., up to 8 DMRSs (or DMRS ports)). The activation/deactivation CSI-RS resources MAC control element may apply to the serving cell on which the wireless device may receive the activation/deactivation of CSI-RS resources MAC control element.

Activation/deactivation CSI-RS resources MAC control elements may comprise an octet of fields, shown as fields A1 to A8, that may indicate the activation/deactivation status of the CSI-RS resources configured by upper layers for the CSI process. A1 may correspond to the first entry in a list of CSI-RS, which may be specified by csi-RS-ConfigNZP-ApList configured by upper layers. A2 may correspond to the second entry in the list of CSI-RS, and each of A3 through A8 may correspond to the third through eighth entry, respectively, in the list of CSI-RS. The Ai field may be set to "1" to indicate that the $i^{th}$ entry in the list of CSI-RS, which may be specified by csi-RS-ConfigNZP-ApList, shall be activated. The Ai field may be set to "0" to indicate that the $i^{th}$ entry in the list shall be deactivated. For each CSI process, the number of Ai fields (e.g., i=1, 2, . . . , 8) which are set to "1" may be equal to the value of a higher-layer parameter, such as activatedResources.

A wireless device may be triggered with aperiodic CSI reporting, for example, after receiving a RRC for CSI-RS configuration and a MAC layer signaling for CSI-RS activation. The aperiodic CSI reporting may be associated with the CSI-RS resources indicated in a DCI, for example, with DCI format OC. A CSI request field in DCI format OC may indicate for which CSI process and/or CSI-RS resource the CSI reporting is configured, such as shown in Table 1 below.

TABLE 1

CSI Request field for PDCCH/EPDCCH with uplink DCI format in wireless device specific search space

| Value of CSI request field | Description |
|---|---|
| 000 | No aperiodic CSI report is triggered |
| 001 | Aperiodic CSI report is triggered for a $1^{st}$ set of {CSI process, CSI-RS resource} configured by higher layers for serving cell $_c$ |
| 010 | Aperiodic CSI report is triggered for a $2^{nd}$ set of {CSI process, CSI-RS resource} configured by higher layers for serving cell $_c$ |
| 011 | Aperiodic CSI report is triggered for a $3^{rd}$ set of {CSI process, CSI-RS resource} configured by higher layers for serving cell $_c$ |
| 100 | Aperiodic CSI report is triggered for a $4^{th}$ set of {CSI process, CSI-RS resource} configured by higher layers for serving cell $_c$ |
| 101 | Aperiodic CSI report is triggered for a $5^{th}$ set of {CSI process, CSI-RS resource} configured by higher layers for serving cell $_c$ |
| 110 | Aperiodic CSI report is triggered for a $6^{th}$ set of {CSI process, CSI-RS resource} configured by higher layers for serving cell $_c$ |
| 111 | Aperiodic CSI report is triggered for a $7^{th}$ set of {CSI process, CSI-RS resource} configured by higher layers for serving cell $_c$ |

FIG. 18 shows three beams that may be configured for a wireless device, for example, in a wireless device-specific configuration. Any number of additional beams (e.g., represented by the column of blank squares) or fewer beams may be included. Beam 1 may be allocated with CSI-RS 1 that may be transmitted in some subcarriers in a resource block (RB) of a first symbol. Beam 2 may be allocated with CSI-RS 2 that may be transmitted in some subcarriers in a RB of a second symbol. Beam 3 may be allocated with CSI-RS 3 that may be transmitted in some subcarriers in a RB of a third symbol. All subcarriers in a RB may not necessarily be used for transmitting a particular CSI-RS (e.g., CSI-RS1) on an associated beam (e.g., beam 1) for that CSI-RS. By using frequency division multiplexing (FDM), other subcarriers, not used for beam 1 for the wireless device in the same RB, may be used for other CSI-RS transmissions associated with a different beam for other wireless devices. Additionally or alternatively, by using time domain multiplexing (TDM), beams used for a wireless device may be configured such that different beams (e.g., beam 1, beam 2, and beam 3) for the wireless device may be transmitted using some symbols different from beams of other wireless devices.

Beam management may use a device-specific configured CSI-RS. In a beam management procedure, a wireless device may monitor a channel quality of a beam pair link comprising a transmitting beam by a base station (e.g., a gNB in NR) and a receiving beam by the wireless device (e.g., a UE). When multiple CSI-RSs associated with multiple beams are configured, a wireless device may monitor multiple beam pair links between the base station and the wireless device.

A wireless device may transmit one or more beam management reports to a base station. A beam management report may indicate one or more beam pair quality parameters, comprising, for example, one or more beam identifications, RSRP, PMI, CQI, and/or RI, of a subset of configured beams.

Figure 22:
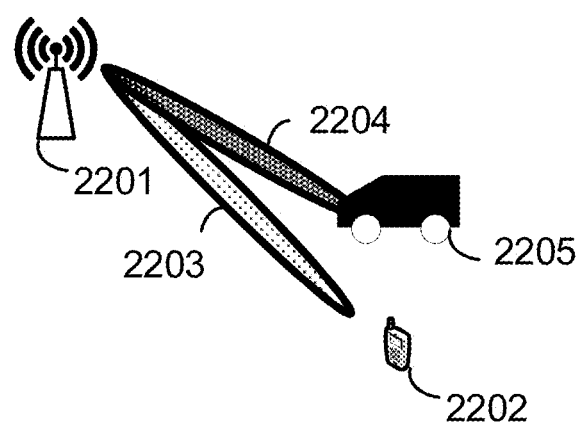
FIG. 22 shows an example of a beam failure event involving a single transmission and receiving point.
Figure 23:
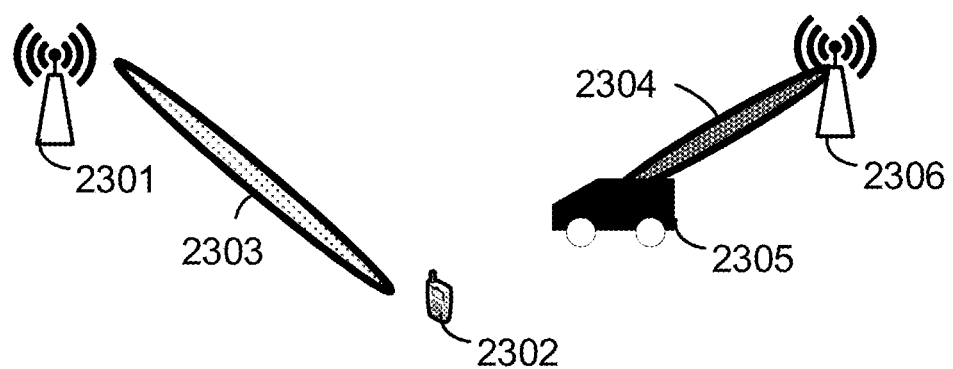
FIG. 23 shows an example of a beam failure event involving multiple transmission and receiving points.

A base station and/or a wireless device may perform a downlink L1/L2 beam management procedure. One or more downlink L1/L2 beam management procedures may be performed within one or multiple transmission and receiving points (TRPs), such as shown in FIG. 22 and FIG. 23, respectively.

Figure 21:
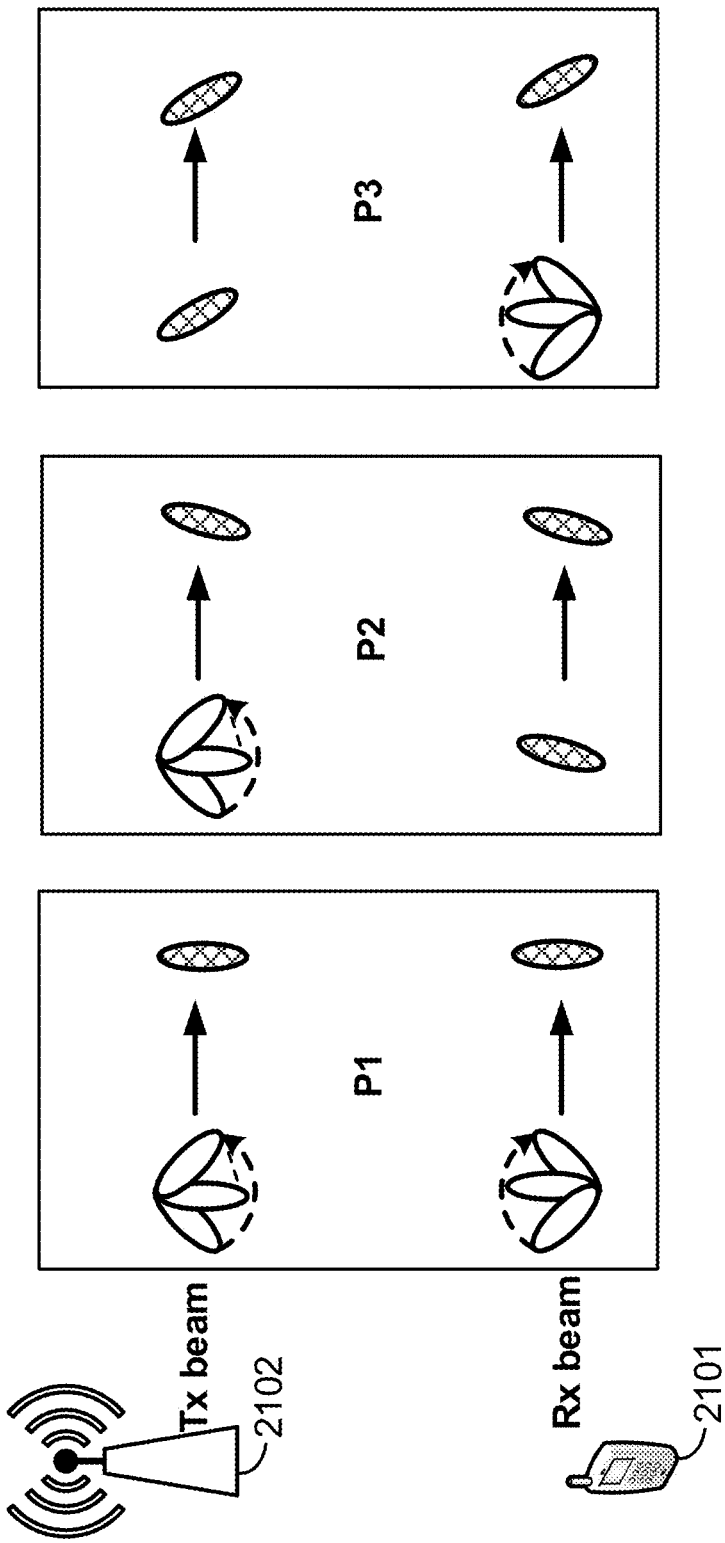
FIG. 21 shows an example for downlink beam management.

FIG. 21 shows examples of three beam management procedures, P1, P2, and P3. Procedure P1 may be used to enable a wireless device measurement on different transmit (Tx) beams of a TRP (or multiple TRPs), for example, to support a selection of Tx beams and/or wireless device receive (Rx) beam(s) (shown as shaded ovals in the top row and bottom row, respectively, of P1). Beamforming at a TRP (or multiple TRPs) may include, for example, an intra-TRP and/or inter-TRP Tx beam sweep from a set of different beams (shown, in the top rows of P1 and P2, as unshaded ovals rotated in a counter-clockwise direction indicated by the dashed arrow). Beamforming at a wireless device 2101, may include, for example, a wireless device Rx beam sweep from a set of different beams (shown, in the bottom rows of P1 and P3, as unshaded ovals rotated in a clockwise direction indicated by the dashed arrow). Procedure P2 may be used to enable a wireless device measurement on different Tx beams of a TRP (or multiple TRPs) (shown, in the top row of P2, as unshaded ovals rotated in a counter-clockwise direction indicated by the dashed arrow), for example, which may change inter-TRP and/or intra-TRP Tx beam(s). Procedure P2 may be performed, for example, on a smaller set of beams for beam refinement than in procedure P1. P2 may be a particular example of P1. Procedure P3 may be used to enable a wireless device measurement on the same Tx beam (shown as shaded oval in P3), for example, to change a wireless device Rx beam if the wireless device 2101 uses beamforming.

Based on a wireless device's beam management report, a base station may transmit, to the wireless device, a signal indicating that one or more beam pair links are the one or more serving beams. The base station may transmit PDCCH and/or PDSCH for the wireless device using the one or more serving beams.

A wireless device 2101 (e.g., a UE) and/or a base station 2102 (e.g., a gNB) may trigger a beam failure recovery mechanism. The wireless device 2101 may trigger a beam failure recovery (BFR) request transmission, for example, if a beam failure event occurs. A beam failure event may include, for example, a determination that a quality of beam pair link(s) of an associated control channel is unsatisfactory. A determination of an unsatisfactory quality of beam pair link(s) of an associated channel may be based on the quality falling below a threshold and/or an expiration of a timer.

The wireless device 2101 may measure a quality of beam pair link(s) using one or more reference signals (RS). One or more SS blocks, one or more CSI-RS resources, and/or one or more demodulation reference signals (DM-RSs) of a PBCH may be used as a RS for measuring a quality of a beam pair link. Each of the one or more CSI-RS resources may be associated with a CSI-RS resource index (CRI). A quality of a beam pair link may be based on one or more of an RSRP value, reference signal received quality (RSRQ) value, and/or CSI value measured on RS resources. The base station 2102 may indicate that an RS resource, for example, that may be used for measuring a beam pair link quality, is quasi-co-located (QCLed) with one or more DM-RSs of a control channel. The RS resource and the DM-RSs of the control channel may be QCLed when the channel characteristics from a transmission via an RS to the wireless device 2101, and the channel characteristics from a transmission via a control channel to the wireless device, are similar or the same under a configured criterion.

FIG. 22 shows an example of a beam failure event involving a single TRP. A single TRP such as at a base station 2201 may transmit, to a wireless device 2202, a first beam 2203 and a second beam 2204. A beam failure event may occur if, for example, a serving beam, such as the second beam 2204, is blocked by a moving vehicle 2205 or other obstruction (e.g., building, tree, land, or any object) and configured beams (e.g., the first beam 2203 and the second beam 2204), including the serving beam, are received from the single TRP. The wireless device 2202 may trigger a mechanism to recover from beam failure when a beam failure occurs.

FIG. 23 shows an example of a beam failure event involving multiple TRPs. Multiple TRPs, such as at a first base station 2301 and at a second base station 2306, may transmit, to a wireless device 2302, a first beam 2303 (e.g., from the first base station 2301) and a second beam 2304 (e.g., from the second base station 2306). A beam failure event may occur when, for example, a serving beam, such as the second beam 2304, is blocked by a moving vehicle 2305 or other obstruction (e.g., building, tree, land, or any object) and configured beams (e.g., the first beam 2303 and the second beam 2304) are received from multiple TRPs. The wireless device 2302 may trigger a mechanism to recover from beam failure when a beam failure occurs.

A wireless device may monitor a PDCCH, such as a New Radio PDCCH (NR-PDCCH), on M beam pair links simultaneously, where M>1 and the maximum value of M may depend at least on the wireless device capability. Such monitoring may increase robustness against beam pair link blocking. A base station may transmit, and the wireless device may receive, one or more messages configured to cause the wireless device to monitor NR-PDCCH on different beam pair link(s) and/or in different NR-PDCCH OFDM symbol.

A base station may transmit higher layer signaling, and/or a MAC control element (MAC CE), that may comprise parameters related to a wireless device Rx beam setting for monitoring NR-PDCCH on multiple beam pair links. A base station may transmit one or more indications of a spatial QCL assumption between a first DL RS antenna port(s) and a second DL RS antenna port(s). The first DL RS antenna port(s) may be for one or more of a cell-specific CSI-RS, device-specific CSI-RS, SS block, PBCH with DM-RSs of PBCH, and/or PBCH without DM-RSs of PBCH. The second DL RS antenna port(s) may be for demodulation of a DL control channel. Signaling for a beam indication for a NR-PDCCH (e.g., configuration to monitor NR-PDCCH) may be via MAC CE signaling, RRC signaling, DCI signaling, or specification-transparent and/or an implicit method, and any combination thereof.

For reception of unicast DL data channel, a base station may indicate spatial QCL parameters between DL RS antenna port(s) and DM-RS antenna port(s) of DL data channel. A base station may transmit DCI (e.g., downlink grants) comprising information indicating the RS antenna port(s). The information may indicate the RS antenna port(s) which may be QCLed with DM-RS antenna port(s). A different set of DM-RS antenna port(s) for the DL data channel may be indicated as a QCL with a different set of RS antenna port(s).

If a base station transmits a signal indicating a spatial QCL parameters between CSI-RS and DM-RS for PDCCH, a wireless device may use CSI-RSs QCLed with DM-RS for a PDCCH to monitor beam pair link quality. If a beam failure event occurs, the wireless device may transmit a beam failure recovery request, such as by a determined configuration.

If a wireless device transmits a beam failure recovery request, for example, via an uplink physical channel or signal, a base station may detect that there is a beam failure event, for the wireless device, by monitoring the uplink physical channel or signal. The base station may initiate a beam recovery mechanism to recover the beam pair link for transmitting PDCCH between the base station and the wireless device. The base station may transmit one or more control signals, to the wireless device, for example, after or in response to receiving the beam failure recovery request. A beam recovery mechanism may be, for example, an L1 scheme, or a higher layer scheme.

A base station may transmit one or more messages comprising, for example, configuration parameters of an uplink physical channel and/or a signal for transmitting a beam failure recovery request. The uplink physical channel and/or signal may be based on at least one of the following: a non-contention based PRACH (e.g., a beam failure recovery PRACH or BFR-PRACH), which may use a resource orthogonal to resources of other PRACH transmissions; a PUCCH (e.g., beam failure recovery PUCCH or BFR-PUCCH); and/or a contention-based PRACH resource. Combinations of these candidate signal and/or channels may be configured by a base station.

In wireless communications, various beam procedures may be performed, such as downlink beam management, downlink beam failure recovery, and uplink beam management. Each beam procedure may have an associated DCI format, examples of which are described below regarding Table 8. A base station may transmit different DCIs with different DCI formats to complete different beam procedures. A base station may transmit a first DCI with a first DCI format to complete beam failure recovery procedure. The first DCI may comprise beam information of a candidate beam. A base station may transmit a second DCI with a second DCI format to complete uplink beam management. The second DCI may comprise beam information of an SRS. A base station may transmit a third DCI with a third DCI format to complete downlink beam management. The third DCI may comprise beam information of a serving beam of the base station. A wireless device may monitor a physical downlink control channel (PDCCH) and the wireless device may perform one or more blind decoding attempts before ultimately determining a type of beam procedure to perform. The wireless device may determine a type of beam procedure in a more efficient and timely manner, for example, by receiving, from a base station, an indication of the type of beam procedure to perform in one or more messages comprising downlink control information (DCI). Some procedures may be unified to comprise the same DCI format. By using the same DCI format for different types of procedures, a wireless device may reduce power usage and/or increase power efficiency, for example, by reducing blind decoding attempts, of the DCI, that may be associated with PDCCH monitoring. A beam type parameter indication field may be used to indicate a particular procedure, for example, that may comprise a DCI format in common with one or more other procedures. A downlink beam failure recovery procedure and an uplink beam management may be associated with the same DCI format (e.g., a unified DCI), and each procedure may be indicated by a different beam type parameter value (e.g., binary 0 or 1). Additionally or alternatively, each of downlink beam management, downlink beam failure recovery, and uplink beam management may be associated with the same DCI format (e.g., a unified DCI), and each procedure may be indicated by a respective beam type parameter value (e.g., binary 01, 10, or 10). By using the same DCI format for different types of procedures, of which may be identified by a beam type parameter, more types of procedures may be used, including, for example, more procedures that may be developed in the future, with the same DCI format.

A base station may determine a type of beam procedure for a wireless device to perform.

The base station may transmit, and the wireless device may receive, at least one radio resource control (RRC) message. The at least one RRC message may comprise one or more first parameters for a downlink beam failure recovery procedure; and one or more second parameters for an uplink beam management procedure. Additionally or alternatively, the at least one RRC message may comprise one or more third parameters for a downlink beam management procedure, or a fourth or more parameters for one or more additional procedures. The one or more first parameters of the downlink beam failure recovery procedure, and/or the one or more third parameters of the downlink beam management procedure, may comprise one or more of: reference signal (RS) resource parameters of a first plurality of reference signals (RSs); RS resource parameters of a second plurality of RSs; or one or more random access channel resources. The one or more second parameters of the uplink beam management procedure may comprise one or more of: a bandwidth of a sounding reference signal (SRS); a numerology of the SRS; a frequency of the SRS; or a time resource of the SRS. The base station may transmit, and the wireless device may receive, via a downlink control channel, downlink control information (DCI). The DCI may comprise one or more beam information fields, and an indication field indicating that the one or more beam information fields comprises: one or more beam parameters for the downlink beam failure recovery procedure; or one or more beam parameters for the uplink beam management procedure. Additionally or alternatively, the indication field may indicate that the one or more beam information fields comprises one or more beam parameters for the downlink beam management procedure. The wireless device may adjust, based on the indication field, one or more transceiver parameters. The one or more transceiver parameters may comprise at least one of: a receiving beamforming precoder (e.g., amplitude, or phase); and/or a transmission beamforming precoder (e.g., amplitude, or phase). The wireless device may adjust the one or more transceiver parameters by adjusting beams for receiving (e.g., receiving beams or Rx beams) based on the one or more beam information fields of the DCI, for example, if the indication field of the DCI indicates that the one or more beam information fields comprises one or more beam parameters of the downlink beam failure recovery procedure. The wireless device may adjust the one or more transceiver parameters by adjusting beams for transmitting (e.g., transmitting beams or Tx beams) based on the one or more beam information fields of the DCI, for example, if the indication field of the DCI indicates that the one or more beam information fields comprises one or more beam parameters of the uplink beam management procedure.

The wireless device may initiate, for example, after or in response to detecting at least one beam failure based on the one or more first parameters, the downlink beam failure recovery procedure. The wireless device may initiate, based on the one or more second parameters, the uplink beam management procedure. The wireless device may initiate, based on the one or more third parameters, the downlink beam management procedure. The wireless device may initiate, based on receiving a second DCI indicating a transmission of at least one sounding reference signal, the uplink beam management procedure. The uplink beam management procedure may comprise transmitting, by the wireless device, at least one sounding reference signal (SRS) based on the one or more second parameters. The wireless device may determine, based on the indication field indicating that the one or more beam information fields comprises one or more beam parameters for the uplink beam management procedure, that the DCI comprises one or more SRS resource indexes. The wireless device may determine, based on the indication field indicating that the one or more beam information fields comprises one or more beam parameters for the downlink beam failure recovery procedure, that the DCI comprises one or more channel state information reference signal (CSI-RS) resource indexes.

The base station may transmit, and the wireless device may receive, at least one RRC message comprising one or more parameters for: a downlink beam failure recovery procedure; and/or an uplink beam management procedure. Additionally or alternatively, the at least one RRC message may comprise one or more parameters for a downlink beam management procedure. The base station may transmit, and the wireless device may receive, via a downlink control channel, a DCI comprising: one or more beam information fields; and a beam procedure type field. The beam procedure type field may associate the one or more beam information fields with: the downlink beam failure recovery procedure; the downlink beam management procedure; and/or the uplink beam management procedure. The base station may determine, based on the beam procedure type field associating the one or more beam information fields with the uplink beam management procedure, one or more SRS resource indexes for the DCI. If the base station receives, from the wireless device, multiple SRSs for uplink beam management, the base station may select one SRS from the multiple SRS as a best uplink beam. The base station may send, to the wireless device, a DCI comprising the best SRS and/or an SRS resource index. The base station may determine, based on the beam procedure type field associating the one or more beam information fields with the downlink beam failure recovery procedure, one or more channel state information reference signal (CSI-RS) resource indexes for the DCI. The wireless device, and/or the base station, may perform, based on the beam procedure type field, either a downlink beam failure recovery procedure, a downlink beam management procedure, or an uplink beam management procedure.

The wireless device may transmit one or more SRSs. The base station may send an indication for the wireless device to transmit one or more SRSs for channel quality estimation, which may be to enable frequency-selective scheduling on the uplink. Additionally or alternatively, transmission of SRS may be used for other purposes, such as to enhance power control, and/or to support various startup functions for wireless devices not recently scheduled. Such startup functions may include, for example, initial modulation and coding scheme (MCS) selection, initial power control for data transmissions, timing advance, and/or frequency semi-selective scheduling.

Subframes in which SRSs may be transmitted by any wireless device within a cell may be indicated by cell-specific broadcast signaling, and/or by wireless device-specific signaling. For common configured SRS transmission, the subframes for SRS transmission may be indicated by a 4-bit cell-specific parameter, such as srsSubframeConfiguration, indicating up to 15 possible sets of subframes in which SRS may be transmitted within each radio frame, shown as in Table 2 below.

TABLE 2

Frame structure type 1 sounding reference signal subframe configuration

| srs-SubframeConfig | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | reserved |

A wireless device may receive an indication to transmit at least one of two types of SRS: periodic SRS transmission (e.g., type 0) and/or aperiodic SRS transmission (e.g., type 1). Periodic SRS transmission from a wireless device may occur at regular time intervals, for example, from as often as each 2 ms to as infrequently as each 160 ms. The SRS transmission may be in the last symbol or several SC-FDMA or OFDM symbols in the configured subframes, such as shown in FIG. 24.

Figure 24:
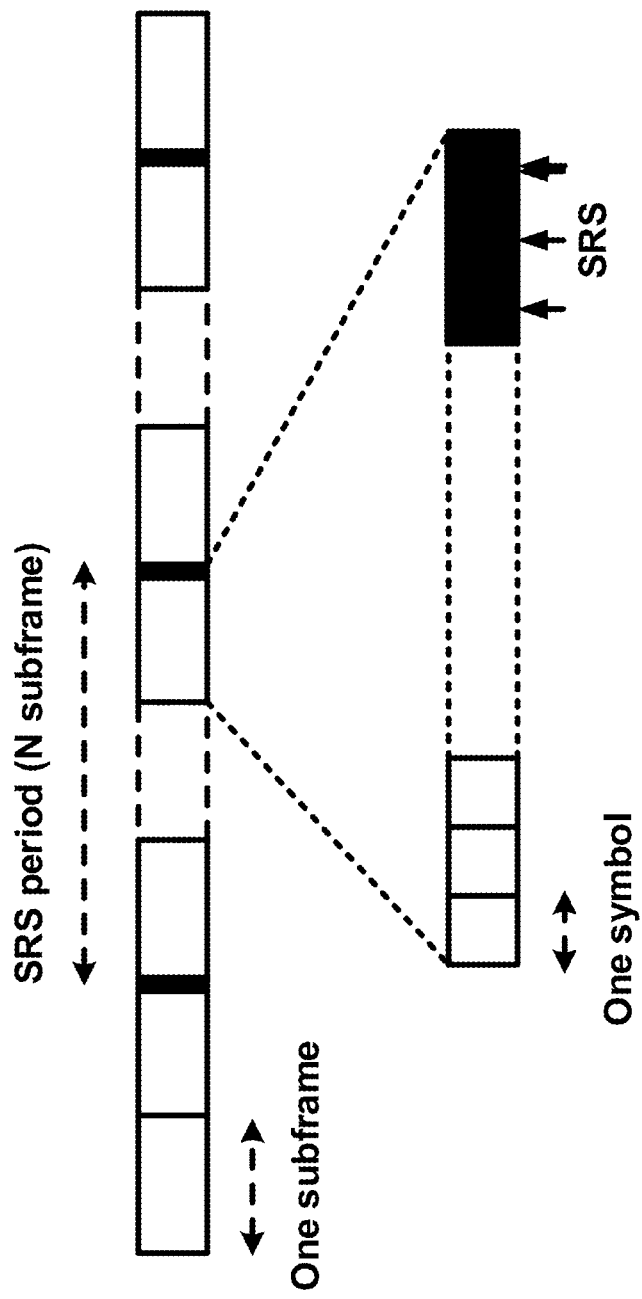
FIG. 24 shows an example arrangement of subframes that may comprise SRS transmissions.

FIG. 24 shows an example arrangement of subframes that may comprise SRS transmissions. Each rectangle at the top row of FIG. 24 may correspond to one subframe. An SRS period may comprise a plurality of subframes, such as N subframes. Each subframe may comprise a plurality of symbols, such as shown at the bottom row of FIG. 24. One or more symbols may comprise an SRS transmission. An SRS transmission may be included in each SRS period.

A base station (e.g., a gNB) may transmit, to a wireless device, a DCI. The base station may transmit the DCI via a PDCCH, for example, as part of a scheduling grant, which may trigger an aperiodic SRS transmission, for example, a one-shot transmission. The time instants for periodic and aperiodic SRS may be configured per device using high layer signaling. For example, for wireless device-specific periodic SRS configuration, the subframes used for SRS transmission may be indicated by a wireless device-specific RRC signaling, for example, using a parameter such as a 10-bit srs-ConfigIndex, as shown in Table 3 below.

TABLE 3

UE Specific SRS Periodicity $T_{SRS}$ and Subframe Offset Configuration $T_{offset}$ for trigger type 0, FDD

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS} - 2$ |
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 637-1023 | reserved | reserved |

For aperiodic SRS transmission, the subframes for SRS transmission may be indicated by a parameter, such as a 5-bit srs-configIndex, as shown in Table 4 below.

TABLE 4

UE Specific SRS Periodicity $T_{SRS, 1}$ and Subframe Offset Configuration $T_{offset, 1}$ for trigger type 1, FDD

| SRS Configuration Index $I_{SRS}$ | SRS Periodicity $T_{SRS, 1}$ (ms) | SRS Subframe Offset $T_{offset, 1}$ |
|---|---|---|
| 0-1 | 2 | $I_{SRS}$ |
| 2-6 | 5 | $I_{SRS} - 2$ |
| 7-16 | 10 | $I_{SRS} - 7$ |
| 17-31 | reserved | reserved |

A wireless device may be configured, via high layer signaling, with frequency related parameters for SRS transmission (e.g., bandwidth, frequency hopping, transmission comb and offset, and frequency-domain position). FIG. 25 shows an example of high layer signaling for SRS parameter configuration.

A base station (e.g., a gNB) may transmit, to a wireless device, RRC signaling to configure multiple sets of SRS parameters, for example, for aperiodic SRS transmission with type 1 triggering. The RRC signaling may comprise a DCI with a 2-bit SRS request for the wireless device. The 2-bit SRS request may indicate an SRS parameter set, such as shown below in Tables 5, 6 and 7, for different DCI formats.

TABLE 5

SRS request value for trigger type 1 in DCI format 4/4A/4B

| Value of SRS request field | Description |
| --- | --- |
| 00 | No type 1 SRS trigger |
| 01 | The $1^{st}$ SRS parameter set configured by higher layers |
| 10 | The $2^{nd}$ SRS parameter set configured by higher layers |
| 11 | The $3^{rd}$ SRS parameter set configured by higher layers |

TABLE 6

SRS request value for trigger type 1 in DCI format 0B

| Value of SRS request field | Description |
| --- | --- |
| 00 | No type 1 SRS trigger |
| 01 | Type 1 SRS trigger and first scheduled PUSCH subframe |
| 10 | Type 1 SRS trigger and second scheduled PUSCH subframe |
| 11 | Type 1 SRS trigger and last scheduled PUSCH subframe |

TABLE 7

SRS request value for trigger type 1 in DCI format 3B and for UE configured with more than 5 TDD serving cells without PUSCH/PUCCH transmission

| Value of SRS request field | Description |
| --- | --- |
| 00 | No type 1 SRS trigger for a $1^{st}$ set of serving cells configured by higher layers |
| 01 | Type 1 SRS trigger for a $2^{nd}$ set of serving cells configured by higher layers |
| 10 | Type 1 SRS trigger for a $3^{rd}$ set of serving cells configured by higher layers |
| 11 | Type 1 SRS trigger for a $4^{th}$ set of serving cells configured by higher layers |

A wireless device may transmit SRS precoded with same or different Tx beams within a time duration, for example, for an uplink beam management procedure. Such a transmission may be in addition to or in the alternative to periodic or aperiodic SRS transmission for CSI acquisition. The wireless device may determine a Tx beam for SRS transmission, based on one or more of: applying gNB-transparent Tx beam to an SRS (e.g., the wireless device may determine a Tx beam for each SRS port/resource), or a base station indication (e.g., via SRS resource index).

A wireless device may transmit SRSs, with a number of SRS ports (e.g., 1, 2, or 4), comb levels (e.g., 2 or 4), and/or configurable frequency hopping, according to configuration parameters indicated by RRC signaling. A wireless device may transmit SRSs using one or more configured SRS parameters. The one or more configured SRS parameters may comprise one or more of: a configurable SRS bandwidth, SRS numerologies, density in frequency domain (e.g., comb levels) and/or in time domain (including, for example, multi-symbol SRS transmissions), partial band size, and/or full band size.

A base station (e.g., a gNB) may transmit to a wireless device one or more RRC messages comprising one or more SRS configurations. At least one of the one or more SRS configurations may comprise one or more SRS resources. At least one of the one or more SRS resources may comprise an SRS resource index (SRI), a set of resource elements (RE) within a time duration and/or frequency span, and N antenna ports (e.g., where N≥1). At least one of the one or more SRS resources may be used for aperiodic transmission. A wireless device may transmit one or more SRSs by using sequences that may provide low peak-to-average power ratio (e.g., Zadoff-Chu sequences).

A wireless device may be equipped with multiple Tx antennas, which may enable multiple uplink Tx beam transmissions. The wireless device may perform uplink beam management by configuration, for example, if there is no reciprocity between downlink beamforming and uplink beamforming.

Figure 26:
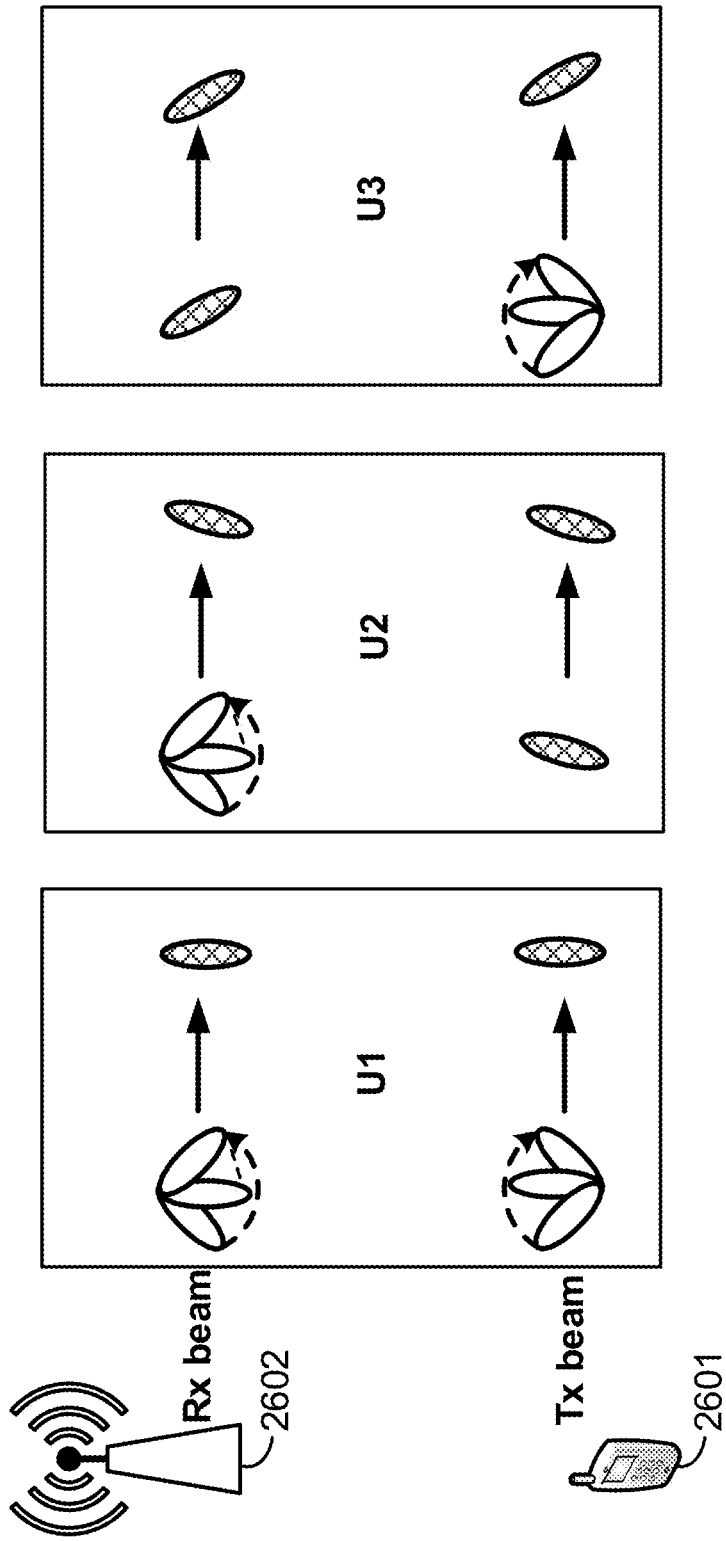
FIG. 26 shows an example for uplink beam management.

FIG. 26 shows an example for three types of uplink beam management that may be supported by a wireless device 2601. The uplink beam management procedures for Tx/Rx beams shown in FIG. 26 may be similar to the downlink beam management procedures for TX/Rx beams described above regarding FIG. 21. A base station 2602 (e.g., a gNB) and the wireless device 2601 may perform a first type (e.g., U1) of uplink beam management procedure, for example, to select a suitable beam pair link (shown as shaded ovals in U1) between a Tx beam of the wireless device 2601 (shown in the bottom row of U1 as unshaded ovals rotated in a clockwise direction indicated by the dashed arrow) and a Rx beam of the base station 2602 (shown in the top row of U1 as unshaded ovals rotated in a counter-clockwise direction indicated by the dashed arrow). This first type of uplink beam management procedure may comprise beam sweeping by the wireless device and/or beam sweeping by the base station 2602. The base station 2602 may perform a second type (e.g., U2) of uplink beam management procedure, for example, to change a Rx beam such as by performing a Rx beam sweeping (shown in the top row of U2 as unshaded ovals rotated in a counter-clockwise direction indicated by the dashed arrow). During this second type of uplink beam procedure, the base station 2602 may assume that the Tx beam direction of the wireless device 2601 is fixed (shown as the shaded oval in the bottom row of U2). The wireless device 2601 may perform a third type (e.g., U3) of uplink beam management procedure, for example, to change a Tx beam such as by performing a Tx beam sweeping (shown in the bottom row of U3 as unshaded ovals rotated in a clockwise direction indicated by the dashed arrow). During this third type of uplink beam management procedure, the base station 2602 may indicate the best Tx beam (shown as the shaded ovals in the top row of U3) to the wireless device 2601.

The wireless device 2601 may perform random access procedure on multiple Tx beams, for example, in the first procedure U1. The base station 2602 may transmit a RAR on a Tx beam, for example, in the first procedure U1, and the RAR may include the information of the best determined Tx beam the wireless device may use.

The base station 2602 may transmit, for example, in the second procedure U2, an indication to the wireless device 2601 to keep a Tx beam unchanged for a configured time, during which the base station 2602 may perform Rx beam sweeping to find out the best determined Rx beam. The wireless device 2601 may not necessarily know which Rx beam the base station 2602 may finally select.

The base station 2602 may transmit, for example, to the wireless device 2601 in the third procedure U3, a DCI that may trigger uplink transmit beam sweeping by the wireless device 2601 in a configured time, during which, the base station 2602 may keep the Rx beam unchanged. The base station 2602 may measure the channel of the beam pair link. The base station 2602 may indicate to the wireless device 2601 a best determined Tx beam. The wireless device 2601 may use the best determined Tx beam for future uplink transmission, for example, if the Tx beam satisfies a selection criteria.

The base station 2602 may use beam selection based on measurement of one or more uplink reference signals (e.g., SRSs). The base station 2602 may transmit one or more messages comprising one or more SRS configurations. The one or more SRS configurations may comprise one or more of: SRS resource index (SRI), SRS time parameters (e.g., subframe, offset, symbols, and/or duration), frequency parameters (e.g., SRS bandwidth, frequency position, hopping bandwidth, comb factors), cyclic shift parameter, and/or beam sweeping parameters (e.g., beam sweeping duration, beam rotating or beam kept fixed). One or more SRS configurations that may be used for CSI acquisition may be different from one or more SRS configurations that may be used for an uplink beam management procedure. For example, one or more SRS configurations used for CSI acquisition may comprise at least one of: bandwidth, frequency hopping, transmission comb and/or offset, time-domain resource, frequency-domain position, antenna ports, and/or power control parameters. The base station 2602 may transmit control information (e.g., one or more DCI or SRS resources) that may trigger an uplink beam sweeping. The control information may comprise at least one or more SRS resources. The wireless device 2601 may transmit one or more SRSs using the SRS parameters configured by an RRC message and/or indicated by a DCI. The base station 2602 may select the Tx beam using a selection criteria (e.g., the best RSRP of received SRS). The base station 2602 may indicate, to the wireless device 2601 via one or more DCI, the SRI associated with the selected Tx beam.

An uplink beam failure event may occur, for example, in the third procedure U3, if the wireless device 2601 fails to receive a DCI indicating the best Tx beam. An uplink beam failure may be recovered using an L1 or higher layer mechanism.

The base station 2602 may transmit, via a PDCCH, a DCI for scheduling decision and power-control commands. The DCI may comprise one or more of: downlink scheduling assignments, uplink scheduling grants, or power-control commands. The downlink scheduling assignments may comprise one or more of: PDSCH resource indication, transport format, HARQ information, control information related to multiple antenna schemes, or a command for power control of the PUCCH used for transmission of ACK/NACK based on or in response to downlink scheduling assignments. The uplink scheduling grants may comprise one or more of: PUSCH resource indication, transport format, HARQ related information, or a power control command of the PUSCH.

Different types of control information may correspond to different DCI message sizes. Supporting spatial multiplexing with noncontiguous allocation of RBs in the frequency domain may require a larger scheduling message in comparison with an uplink grant that may allow only frequency-contiguous allocation. The DCI may be categorized into different DCI formats, where a format may correspond to a certain message size and/or usage. Table 8 below provides a summary of example DCI formats, including the size for an example of a 20 MHz FDD operation with two Tx antennas at the base station 2602 and no carrier aggregation.

The wireless device 2601 may monitor one or more PDCCH to detect one or more DCI with one or more DCI formats. The one or more PDCCH may be transmitted in common search space or wireless device-specific search space. The wireless device 2601 may monitor PDCCH with only a limited set of DCI format, for example, to save power consumption. The wireless device 2601 may not be required to detect a DCI with DCI format 6, which may be used for an eMTC wireless device. The wireless device 2601 may consume more power based on the number of DCI formats to be detected. The more DCI formats to be detected, the more power may be consumed by the wireless device 2601.

TABLE 8 example DCI format and usage

| | DCI format | Example size (Bits) | Usage |
|---|---|---|---|
| Uplink | 0 | 45 | Uplink scheduling grant |
| | 4 | 53 | Uplink scheduling grant with spatial multiplexing |
| | 6-0A, 6-0B | 46, 36 | Uplink scheduling grant for eMTC devices |
| Downlink | 1C | 31 | Special purpose compact assignment |
| | 1A | 45 | Contiguous allocation only |
| | 1B | 46 | Codebook-based beamforming using CRS |
| | 1D | 46 | MU-MIMO using CRS |
| | 1 | 55 | Flexible allocations |
| | 2A | 64 | Open-loop spatial multiplexing using CRS |
| | 2B | 64 | Dual-layer transmission using DM-RS (TM8) |
| | 2C | 66 | Multi-layer transmission using DM-RS (TM9) |
| | 2D | 68 | Multi-layer transmission using DM-RS (TM9) |
| | 2 | 67 | Closed-loop spatial multiplexing using CRS |
| | 6-1A, 6-1B | 46, 36 | Downlink scheduling grants for eMTC devices |
| Special | 3, 3A | 45 | Power control commands |
| | 5 | | Sidelink operation |
| | 6-2 | | Paging/direct indication for eMTC devices |

Information in the DCI formats that may be used for downlink scheduling may be organized into different groups. One or more fields of the DCI formats may comprise one or more of: resource information, such as a carrier indicator (e.g., 0 or 3 bits) and/or a RB allocation; a HARQ process number; an MCS, new data indicator (NDI), and/or RV (e.g., for the first TB and/or for the second TB); MIMO related information such as PMI, precoding information, a transport block swap flag, a power offset between PDSCH and a reference signal, a reference-signal scrambling sequence, a number of layers, and/or a number of antenna ports for a transmission; PDSCH resource-element mapping and/or QCI; downlink assignment index (DAI); a transmit power control (TPC) for PUCCH; an SRS request (e.g., 1 bit), that may comprise an indication of or trigger for a one-shot SRS transmission; an ACK and/or NACK offset; a DCI format indication, for example, which may be used to differentiate between DCI format 1A and DCI format 0 or other formats that may have the same message size; and/or padding (e.g., if necessary).

Information in the DCI formats that may be used for uplink scheduling may be organized into different groups. One or more fields of the DCI formats may comprise one or more of: resource information, such as a carrier indicator, resource allocation type, and/or a RB allocation; an MCS and/or NDI (e.g., for the first TB and/or for the second TB); a phase rotation of the uplink demodulation reference signal (DMRS); precoding information; a CSI request, a request for an aperiodic CSI report; an SRS request (e.g., 2 bits), that may comprise an indication of or a trigger for an aperiodic SRS transmission that may use one of up to three preconfigured settings; an uplink index/DAI; a TPC for PUSCH; a DCI format indication, for example, which may be used to differentiate between DCI format 1A and DCI format 0; and/or padding (e.g., if necessary).

A base station may transmit one or more PDCCH in different control resource sets, for example, which may support wide bandwidth operation. The base station may transmit one or more RRC message comprising configuration parameters of one or more control resource sets. At least one of the one or more control resource sets may comprise one or more of: a first OFDM symbol (e.g., CORESET_StartSymbol); a number of consecutive OFDM symbols (e.g., CORESET_NumSymbol); a set of resource blocks (e.g., CORESET_RBSet); a CCE-to-REG mapping (e.g., CORESET_mapping); and/or a REG bundle size, such as for interleaved CCE-to-REG mapping (e.g., CORESET_REG_bundle).

The base station may transmit one or more messages comprising configuration parameters of one or more active bandwidth parts (BWPs). The one or more active BWPs may have different numerologies. The base station may transmit one or more control information for cross-BWP scheduling to a wireless device.

Figure 27:
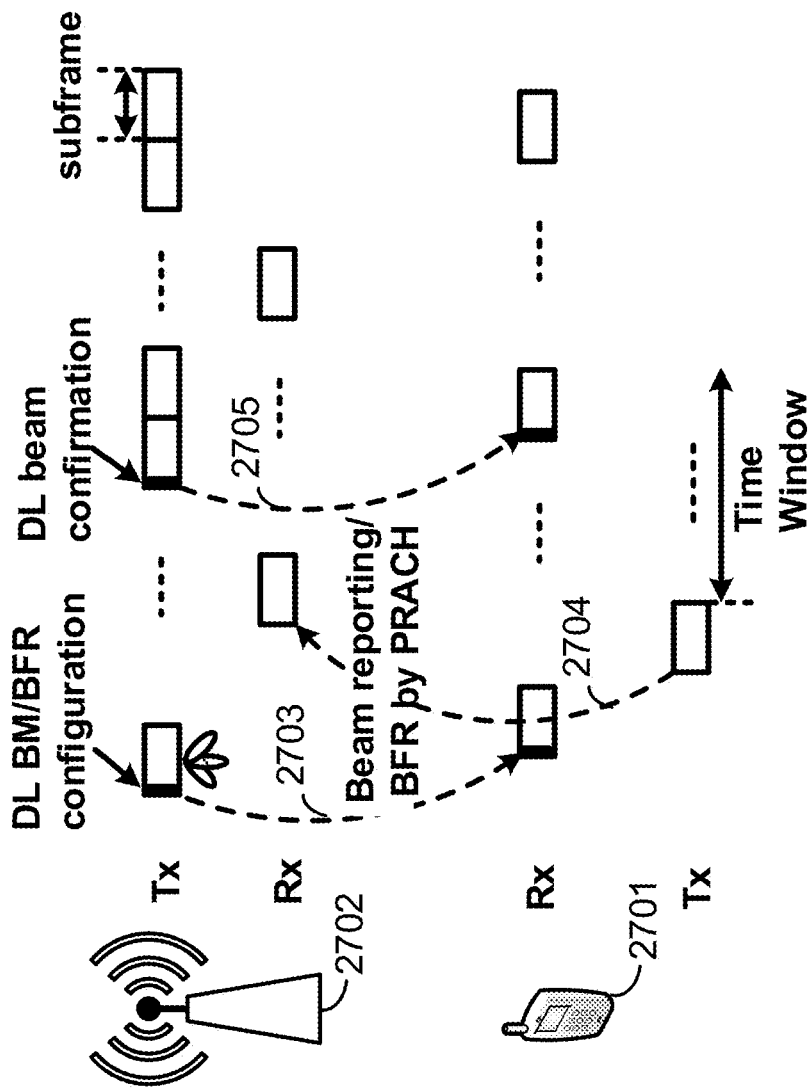
FIG. 27 shows an example of example of a downlink beam management procedure.

FIG. 27 shows example of a downlink beam management procedure and/or a downlink beam failure recovery procedure (e.g., which may correspond with procedures P1 and/or P2 described above regarding FIG. 21). A base station 2702 may transmit, at step 2703, a DCI and/or RRC to a wireless device 2701 that may indicate a downlink management procedure, such as a downlink beam management procedure. The wireless device 2701 may measure multiple reference signals, for example, after receiving or in response to the DCI or RRC. The wireless device 2701 may report a measurement report (e.g., one or multiple beam indexes, with associated beam quality (e.g., RSRP, RSRQ, and/or CSI)), at step 2704. The base station 2702 may transmit, at step 2705, a DCI to the wireless device 2701 that may indicate one or more beam indications used for downlink PDCCH and/or PDSCH transmission, for example, after receiving or in response to the received beam report. The wireless device 2701 may start a timer. The wireless device 2701 may monitor the PDCCH (e.g., if the timer is running) to detect the DCI indicating the one or more beam indications (e.g., which may occur during the "Time Window" shown in FIG. 27).

The base station 2702 may transmit to a wireless device 2701, at step 2703, a one or more RRC messages comprising configuration parameters of a downlink beam failure recovery procedure. The wireless device 2701 may measure one or more reference signals (e.g., reference signals QCLed with the serving PDCCH, or configured reference signals not QCLed with the serving PDCCH). The wireless device 2701 may transmit, at step 2704, a PRACH indicating a candidate beam for a beam failure recovery. The wireless device 2701 may transmit the PRACH in response to detecting a beam failure, for example, based on the measure of the one or more reference signals. The base station 2702 may transmit, at step 2705, a DCI that may indicate the beam used for PDCCH and/or PDSCH transmission, for example, after receiving the PRACH or in response to the PRACH, for the beam failure recovery. The wireless device 2701 may start a timer, for example, if the wireless device 2701 transmits the PRACH for the beam failure recovery. The wireless device 2701 may monitor the PDCCH (e.g., if the timer is running) to detect the DCI for beam indication (e.g., which may occur during the "Time Window" shown in FIG. 27).

Figure 28:
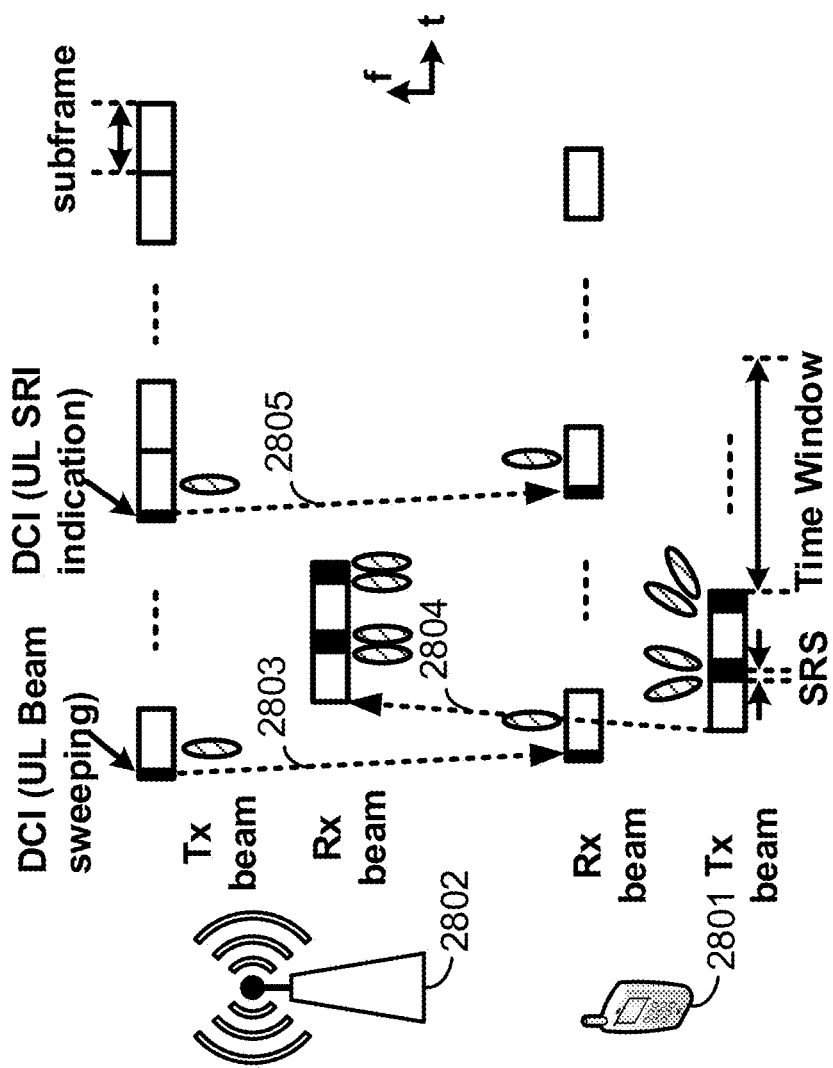
FIG. 28 shows an example of an uplink beam management procedure.

FIG. 28 shows example of an uplink beam management procedure (e.g., which may correspond with procedures U1 and/or U3 described above regarding FIG. 26). A base station 2802 may transmit, at step 2803, one or more DCI that may cause a wireless device 2801 to perform an uplink beam management procedure. The one or more DCI may comprise an indication of a beam (e.g., which may be represented by the oval shown in FIG. 28 at step 2803). The wireless device 2801 may transmit, at step 2804, one or multiple sounding reference signals (e.g., after receiving or in response to the one or more DCI) using different resource and/or different beam direction (e.g., by using different precoding matrices, wherein different beam directions may be represented by the ovals of different directions shown in FIG. 28 by the Tx beam for the wireless device 2801). The base station 2802 may measure the received one or multiple SRS. The base station 2802 may select one or multiple beams associated with the one or multiple SRS, for example, based on one or more selection criteria. The base station 2802 may transmit a DCI with a transmission beam (e.g., which may be represented by the oval shown in FIG. 28 at step 2805). The base station 2802 may transmit, at step 2805, a second DCI to indicate the one or more SRS resource index associated with the selected one or multiple beams. The wireless device 2801 may start a timer, for example, if the wireless device transmits the one or multiple SRS, or after the wireless device transmits the one or multiple SRS. The wireless device 2801 may monitor the PDCCH (e.g., if the timer is running) to detect the second DCI. The wireless device 2801 may adjust the transmitting beam parameters, for example, if wireless device receives the second DCI and the timer is running (e.g., which may occur during the "Time Window" shown in FIG. 28).

Discontinuous reception (DRX) operation may be used by a wireless device, for example, to improve the wireless device's battery lifetime such as by reducing power usage. Using DRX, a wireless device may discontinuously monitor a downlink control channel (e.g., PDCCH and/or EPDCCH). A base station may configure DRX with a set of DRX parameters (e.g., using RRC configuration). The DRX parameters may be selected based on the application type such that power and/or resource savings may be maximized. If DRX is configured and/or activated, there may be an extended delay in receiving data because the wireless device may be in a DRX sleep and/or off state at the time of data arrival at the wireless device. The base station may wait to transmit to the wireless device until the wireless device transitions to a DRX on state. The base station may select the DRX parameters such that packet delay may be minimized and/or power saving may be maximized.

In a DRX mode, the wireless device may power down most of its circuitry, for example, if there are no packets to be received. In the DRX mode, the wireless device may monitor the downlink (e.g., periodically or occasionally). The wireless device may be in a DRX active state if the wireless device is monitoring the DL. If the wireless device is not monitoring the DL (e.g., monitoring the PDCCH), the wireless device may be in a DRX sleep state.

A base station may benefit from DRX, such as by reducing power usage and/or reducing resource usage. If DRX is not configured, the wireless device may transmit periodic CSI and/or SRS (e.g., which may occur frequently, based on a configuration). If DRX is configured, the wireless device may not transmit periodic CSI and/or SRS in DRX off periods. The base station may assign such unused resources to other wireless devices, for example, which may maximize resource utilization.

FIG. 29 shows an example of signaling for a DRX configuration (e.g., a DRX configuration information element). The time granularity for DRX timers may be in terms of PDCCH subframes (e.g., which may be indicated as "psf" in the DRX configurations shown in FIG. 29) in DRX procedures. A DRX configuration may be enhanced to determine time granularity of DRX timers, for example, based on a numerology and/or TTI.

A MAC entity may be configured (e.g., by RRC messaging) with DRX functionality. A DRX functionality may control a wireless device's downlink control channel (e.g., PDCCH) monitoring, for example, by monitoring activity for one or more RNTIs associated with the MAC entity (e.g., C-RNTI, TPC-PUCCH-RNTI, TPC-PUSCH-RNTI, Semi-Persistent Scheduling C-RNTI (e.g., if configured), enhanced Interference Mitigation and Traffic Adaptation (eIMTA)-RNTI (e.g., if configured), SL-RNTI (e.g., if configured), SL-V-RNTI (e.g., if configured), CC-RNTI (e.g., if configured), and/or SRS-TPC-RNTI (e.g., if configured)). The MAC entity may monitor the PDCCH discontinuously using the DRX operation, for example, if DRX is configured and/or if the MAC entity is in an RRC_CONNECTED state. The MAC entity may monitor the PDCCH continuously, for example, if DRX is not configured and/or if the MAC entity is in an RRC_CONNECTED state. RRC signaling may be used to control a DRX operation, for example, by configuring a plurality of timers, such as one or more of: onDurationTimer, drx-InactivityTimer, drx-RetransmissionTimer (e.g., one per DL HARQ process, except for a broadcast process), drx-ULRetransmissionTimer (e.g., one per asynchronous UL HARQ process), a longDRX-Cycle, a value of a drxStartOffset, drxShortCycleTimer, and/or a shortDRX-Cycle. A HARQ RTT timer per DL HARQ process (e.g., except for a broadcast process) and/or a UL HARQ RTT Timer per asynchronous UL HARQ process may be used and/or defined.

An active time may be used based on or in response to a DRX cycle being configured. The active time may comprise a time that one or more of onDurationTimer, drx-InactivityTimer, drx-RetransmissionTimer, drx-ULRetransmissionTimer, and/or mac-ContentionResolutionTimer are running. A drx-Inactivity-Timer may indicate a time duration for which a wireless device may be active, for example, after the wireless device may have successfully decoded a PDCCH indicating a new transmission (e.g., UL, DL and/or sidelink (SL)). A timer (e.g., drx-Inactivity-Timer) may be restarted, for example, after a wireless device receives a PDCCH for a new transmission (e.g., UL, DL, and/or SL). The wireless device may transition to a DRX mode, for example, after or in response to the expiry of a timer (e.g., drx-Inactivity-Timer).

A shortDRX-Cycle may be a first type of DRX cycle (e.g., if configured) that may be followed if a wireless device enters a DRX mode. An information element, such as DRX-Config, may indicate the length of a short cycle. A drxShortCycleTimer may indicate multiples of a shortDRX-Cycle. A timer (e.g., drxShortCycle Timer) may indicate a number of initial DRX cycles to follow the short DRX cycle before a wireless device enters a long DRX cycle. A longDRX-CycleStartOffset may indicate a long DRX cycle length and/or a DRX offset. A DRX offset may be used to determine a start of a DRX cycle.

An onDurationTimer may indicate a time duration at the beginning of a DRX Cycle (e.g., DRX ON). A timer (e.g., onDurationTimer) may indicate the time duration before a wireless device enters a power saving mode (e.g., DRX OFF).

A HARQ RTT Timer may indicate a minimum duration, for example, from a time a new transmission is received to a time at or before which the wireless device may expect a retransmission of a same packet. A timer (e.g., HARQ RTT Timer) may be fixed and/or may not be configured by RRC.

A drx-RetransmissionTimer may indicate a maximum duration for which a wireless device may be monitoring a PDCCH for a retransmission, for example, from a base station. The wireless device may expect to receive, from a base station (e.g., an eNodeB, a gNB, etc.), an indication of a retransmission if a timer (e.g., drx-RetransmissionTimer) is running.

An active time may comprise one or more of the following, for example, if a DRX cycle is configured or in response to a DRX cycle being configured: time that a scheduling request is sent on a PUCCH and is pending, time that an uplink grant for a pending HARQ retransmission may occur if there is data in the corresponding HARQ buffer for a synchronous HARQ process, and/or time that a PDCCH indicating a new transmission addressed to the C-RNTI of the MAC entity has not been received (e.g., after successful reception of a random access response for a preamble that is not selected by the MAC entity).

DRX may be configured for a wireless device. A HARQ RTT timer and/or an UL HARQ timer may expire in a subframe such that data of a corresponding HARQ process may not be successfully decoded. The MAC entity may start the drx-RetransmissionTimer and/or the drx-ULRetransmissionTimer for the corresponding HARQ process. The wireless device may receive a DRX command MAC control element and/or a long DRX command MAC control element. The MAC entity may stop an onDurationTimer and/or a drx-InactivityTimer, for example, after or in response to receiving a MAC control element. If a timer (e.g., drx-InactivityTimer) expires and/or the wireless device receives a DRX Command MAC control element in a subframe, the MAC entity may start, or restart, a timer (e.g., drxShortCycleTimer), and/or the MAC entity may use a short DRX cycle (e.g., if a short DRX cycle is configured or in response to a short DRX cycle being configured). The MAC entity may use a long DRX cycle, for example, if a short DRX cycle is not configured, and/or if a long DRX cycle is configured. The MAC entity may use a Long DRX cycle, for example, if a timer (e.g., drxShortCycleTimer) expires in a subframe. The MAC entity may stop drxShortCycleTimer, and/or may use the Long DRX cycle, for example, if the wireless device receives a long DRX command MAC control element. The wireless device may start a timer (e.g., onDurationTimer), for example, if the Short DRX Cycle is used and [(SFN*10)+subframe number] modulo (shortDRX-Cycle)=(drxStartOffset) modulo (shortDRX-Cycle). The wireless device may start a timer (e.g., onDurationTimer), for example, if the Long DRX Cycle is used and [(SFN*10)+subframe number] modulo (longDRX-Cycle)=drxStartOffset.

A subframe (e.g., a PDCCH-subframe) may not be required for uplink transmission, such as in a half-duplex FDD wireless device operation. A subframe may or may not be one or more of: a half-duplex guard subframe, part of a configured measurement gap, and/or part of a configured sidelink discovery gap for reception. A subframe may be a downlink subframe indicated by a valid enhanced Interference Mitigation and Traffic Adaptation (eIMTA) L1 signaling for at least one serving cell not configured with a scheduling cell identifier (e.g., schedulingCellId). Such a subframe may be used, for example, for an active time of a subframe other than a PDCCH-subframe, and/or for a wireless device capable of simultaneous reception and transmission in the aggregated cells. A subframe may be a downlink subframe indicated by a valid eIMTA L1 signaling for the SpCell, for example, for an active time of a subframe other than a PDCCH-subframe, and/or for a wireless device that is not capable of simultaneous reception and transmission in the aggregated cells.

A wireless device may monitor the PDCCH. The wireless device may start a HARQ RTT timer for a corresponding HARQ process, for example, if the PDCCH indicates a DL transmission or if a DL assignment has been configured for a subframe. The wireless device may stop a timer (e.g., drx-RetransmissionTimer) for a corresponding HARQ process. The wireless device may start a timer (e.g., UL HARQ RTT timer) for a corresponding HARQ process in a subframe containing the last repetition of a corresponding PUSCH transmission, for example, if the PDCCH indicates an UL transmission for an asynchronous HARQ process or if an UL grant has been configured for an asynchronous HARQ process for a subframe. The wireless device may stop a timer (e.g., drx-ULRetransmissionTimer) for a corresponding HARQ process. The wireless device may start, or restart, a timer (e.g., drx-InactivityTimer), for example, if the PDCCH indicates a new transmission (e.g., DL, UL, and/or SL).

Figure 30:
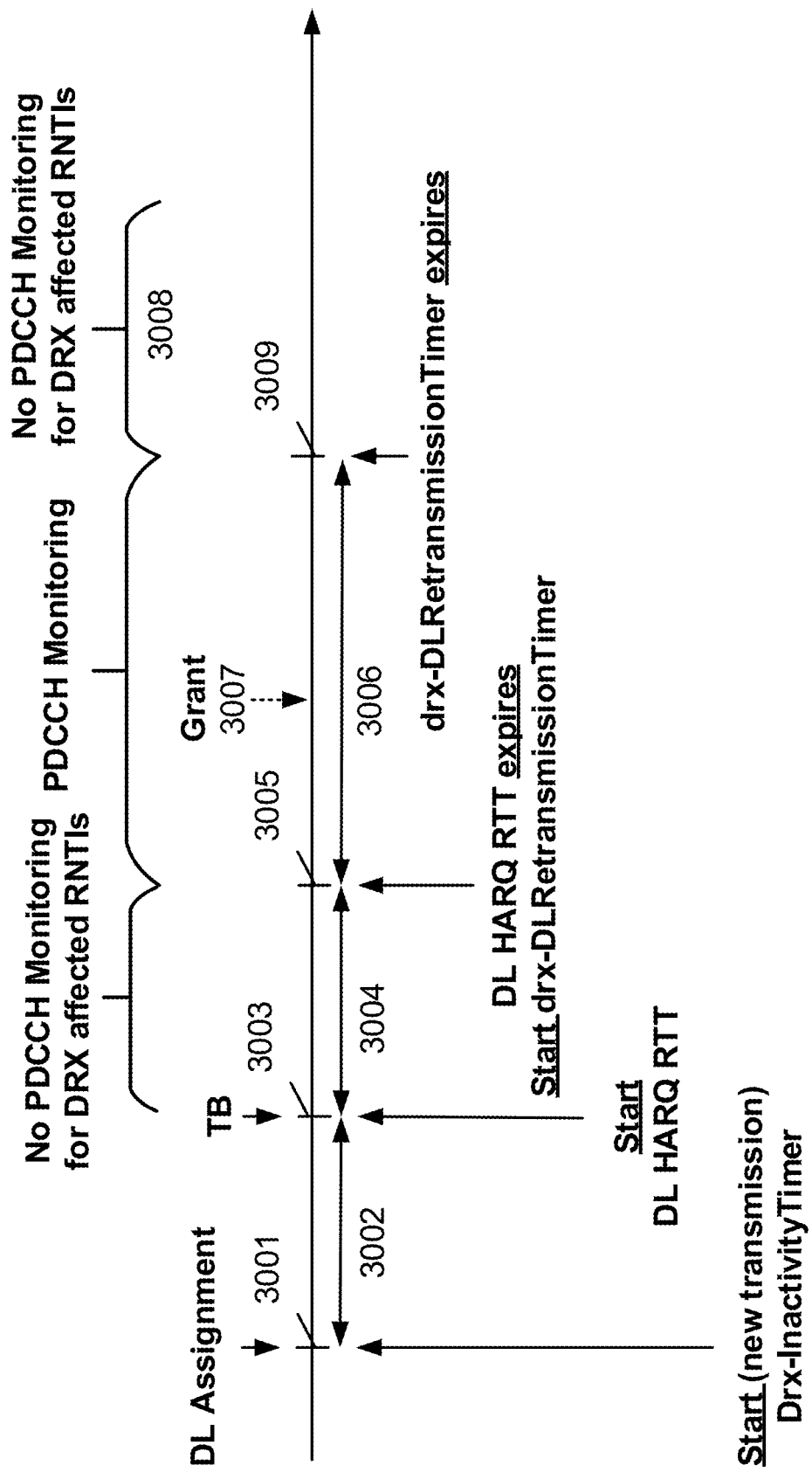
FIG. 30 shows an example of a DRX procedure.

FIG. 30 shows an example of a DRX operation. At step 3001, a base station may transmit, to a wireless device, one or more RRC messages comprising one or more parameter configurations of a DRX operation. The base station may transmit, via a PDCCH to the wireless device, a DCI for downlink resource allocation. The wireless device may start a drx-InactivityTimer, for example, after receiving the RRC and/or DCI. At time period 3002, the wireless device may monitor the PDCCH. After receiving a transmission block (TB), at step 3003, and if the drx-InactivityTimer is running, the wireless device may start a HARQ RTT timer (e.g., DL HARQ RTT timer). The wireless device may stop monitoring the PDCCH, for example, if the wireless device starts the HARQ RTT timer. At time period 3004, the wireless device may not monitor the PDCCH for DRX affected RNTIs. The wireless device may transmit, to the base station, a NACK message if the wireless device does not successfully receive the TB. At step 3005, if the HARQ RTT timer expires, the wireless device may start (or restart) monitoring the PDCCH and/or the wireless device may start a drx-RetransmissionTimer. At time period 3006, the wireless device may monitor the PDCCH and the drx-RetransmissionTimer may be running. The wireless device may receive a second DCI 3007 indicating a DL grant for a retransmission of the TB. The wireless device may stop monitoring the PDCCH, at step 3009, for example, if the wireless device does not receive second DCI 3007 before the drx-RetransmissionTimer expires. At time period 3008, the wireless device may not monitor the PDCCH for DRX affected RNTIs.

The base station may transmit one or more RRC message comprising DRX configuration parameters to the wireless device. The wireless device may perform a DRX operation according the DRX parameters (e.g., monitoring a PDCCH during the active time, and/or stopping monitoring the PDCCH outside of the active time). The base station may transmit one or more RRC message comprising parameters for a beam management (BM) (e.g., downlink BM and/or uplink BM) procedure and/or for a beam failure recovery (BFR) (e.g., downlink BFR and/or uplink BFR) procedure. The base station may transmit one or more first DCI or RRC messages that may cause the wireless device to perform downlink BM, and/or downlink BFR.

Figure 31:
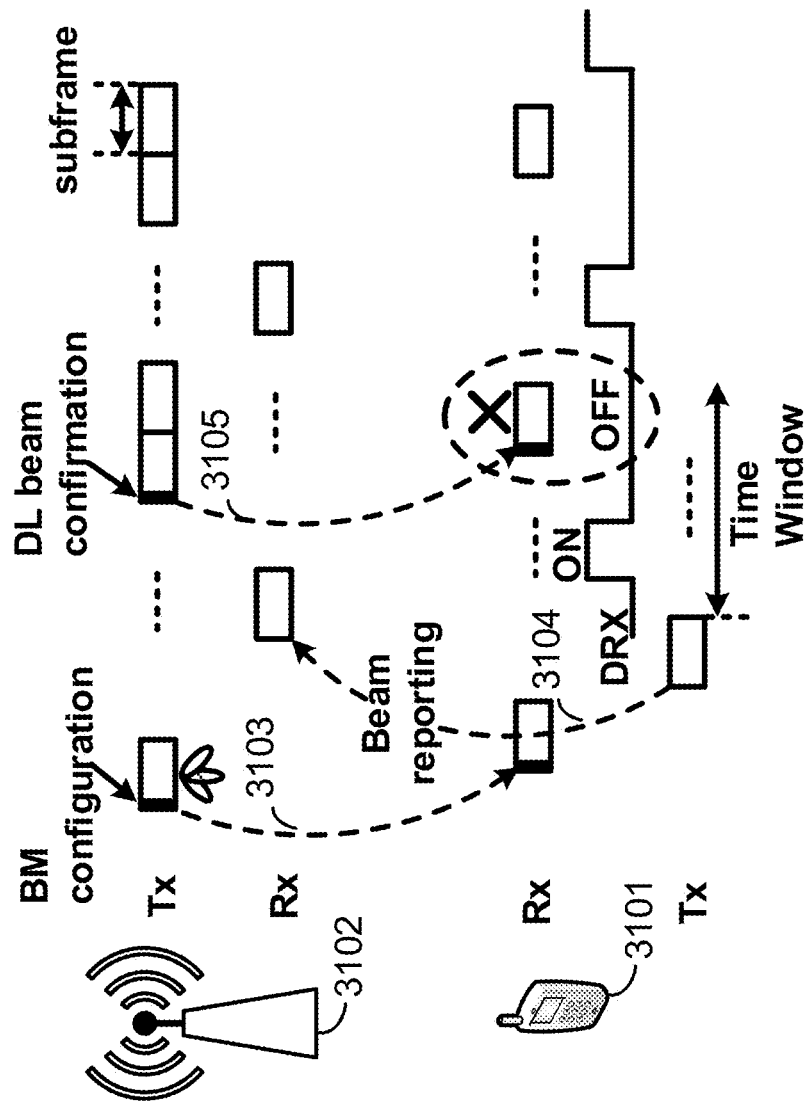
FIG. 31 shows an example of a DRX configuration and a downlink procedure.

FIG. 31 shows an example of a wireless device performing a downlink BM procedure, and/or a downlink BFR procedure, with a configured DRX operation. A wireless device 3101 may transmit, to a base station 3102, one or more beam reporting messages 3104, after or in response to a receiving, from the base station 3102, a BM configuration 3103 comprising one or more DCI and/or RRC messages for a downlink BM procedure. Additionally or alternatively, the wireless device 3101 may transmit one or more PRACH, after or in response to a DCI and/or RRC message for a downlink BFR procedure. The wireless device 3101 may start a timer (e.g., DL BM timer, and/or DL BFR timer) after sending the one or more beam reporting messages 3104 and/or after sending the one or more PRACH. The MAC entity of the wireless device 3101 may stop monitoring PDCCH, for example, if with wireless device 3101 is configured with a DRX operation and if the wireless device 3101 is in a DRX sleep state (e.g., DRX is "OFF"). The MAC entity of the wireless device 3101 may stop monitoring PDCCH even if the DL BM timer and/or the BFR timer is running (e.g., in "Time Window"). A misalignment between a DRX procedure and a DL BM and/or a DL BFR procedure may result in unsuccessful DL BM and/or DL BFR. For example, the base station 3102 may send, to the wireless device 3101, a DL beam confirmation 3105 at a time that the wireless device 3101 may not be monitoring PDCCH (e.g., shown as an "X" at an "OFF" portion of the DRX and in the "Time Window"). It may be advantageous to enhance DRX operation to account for downlink BM and/or downlink BFR for determining a duration of a timer and the wireless device 3101 monitoring of a PDCCH.

The base station 3102 may transmit, to the wireless device 3101, one or more RRC messages comprising DRX configuration parameters. The wireless device 3101 may perform a DRX operation according the DRX parameters (e.g., monitoring a PDCCH during the active time, and/or stopping monitoring the PDCCH outside of the active time). The base station 3102 may transmit, to the wireless device 3101, one or more RRC message comprising parameters of an uplink beam management procedure. The base station 3102 may transmit, to the wireless device 3101, one or more first DCI that may cause the wireless device 3101 to perform uplink BM.

Figure 32:
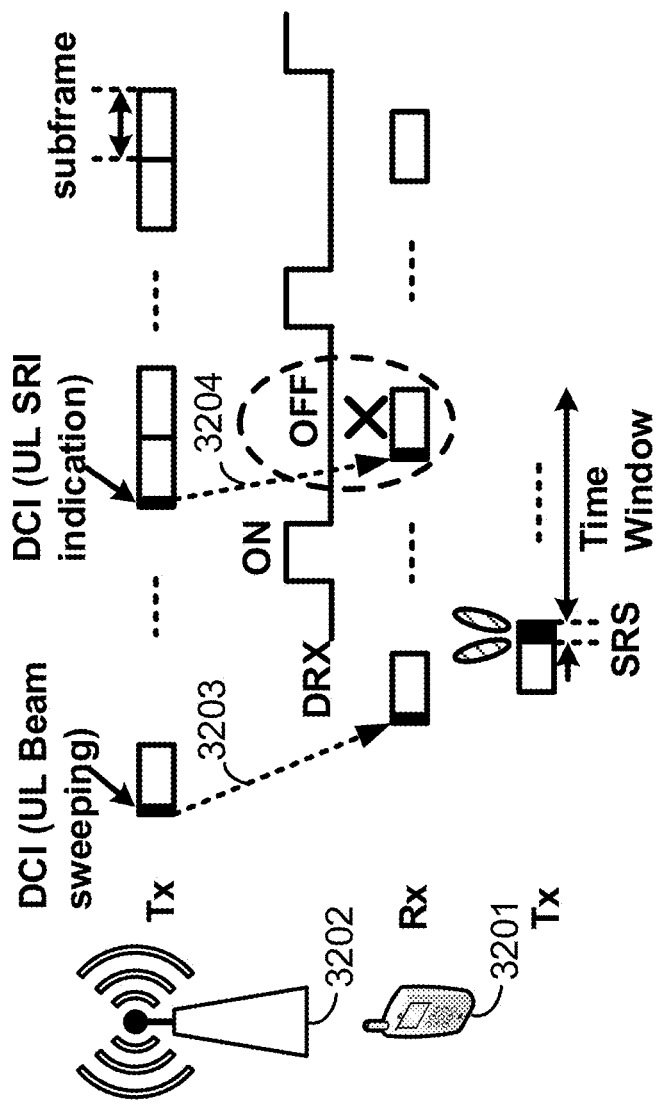
FIG. 32 shows an example of a DRX configuration and an uplink beam management procedure.

FIG. 32 shows an example of a wireless device performing an uplink BM with a configured DRX operation. A wireless device 3201 may transmit, to a base station 3202, one or more SRS, after or in response to receiving, from the base station 3202, a DCI 3203 for an uplink BM (e.g., UL beam sweeping). Additionally or alternatively, the wireless device 3201 may transmit one or more PRACH, SR, and/or PUCCH, for example, if an uplink BFR is triggered. The wireless device 3201 may start a timer (e.g., uplink BM timer) after sending the one or more SRS. The wireless device 3201 may start a timer (e.g., uplink BFR timer) after sending the one or more PRACH, SR, and/or PUCCH. The MAC entity of the wireless device 3201 may stop monitoring PDCCH, for example, if the wireless device 3201 is configured with a DRX operation and if the wireless device 3201 is in a DRX sleep state (e.g., DRX is "OFF"), even if the uplink BM timer and/or the uplink BFR timer is running (e.g., in "Time Window"). A misalignment between a DRX procedure and an uplink BM or an uplink BFR procedure may result in unsuccessful uplink BM and/or uplink BFR. For example, the base station 3202 may send, to the wireless device 3201, a DCI 3204 (e.g., UL SRI indication) at a time that the wireless device 3201 may not be monitoring PDCCH (e.g., shown as "X" at an "OFF" portion of the DRX and in the "Time Window"). It may be advantageous to enhance DRX timer operation to account for uplink BM and/or uplink BFR for determining a duration of a timer and the wireless device 3201 monitoring of a PDCCH.

Figure 33:
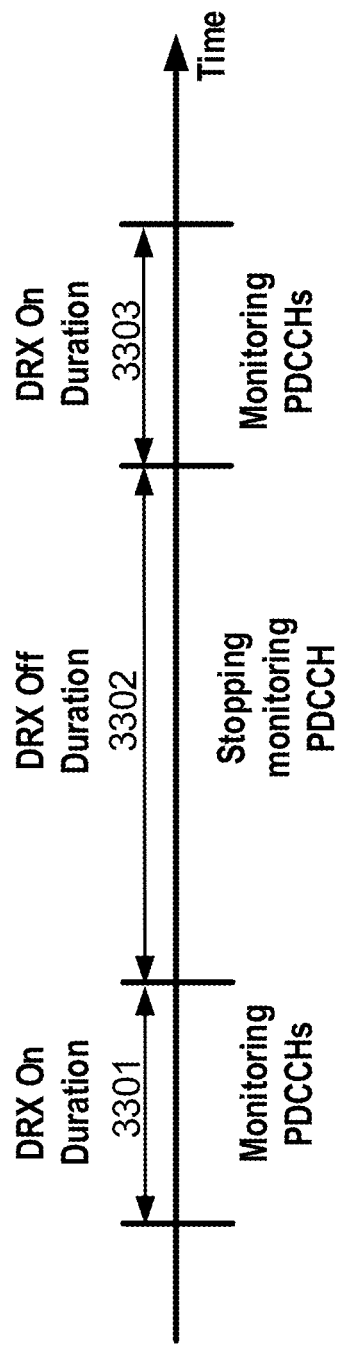
FIG. 33 shows an example of DRX timer procedures.

FIG. 33 shows an example of DRX timer procedures. A wireless device may perform PDCCH monitoring at a time period 3301 associated with a DRX on duration. The wireless device may stop PDCCH monitoring at a time period 3302 associated with a DRX off duration. The wireless device may start (or restart) PDCCH monitoring at a time period 3303 associated with a DRX on duration.

Figure 34:
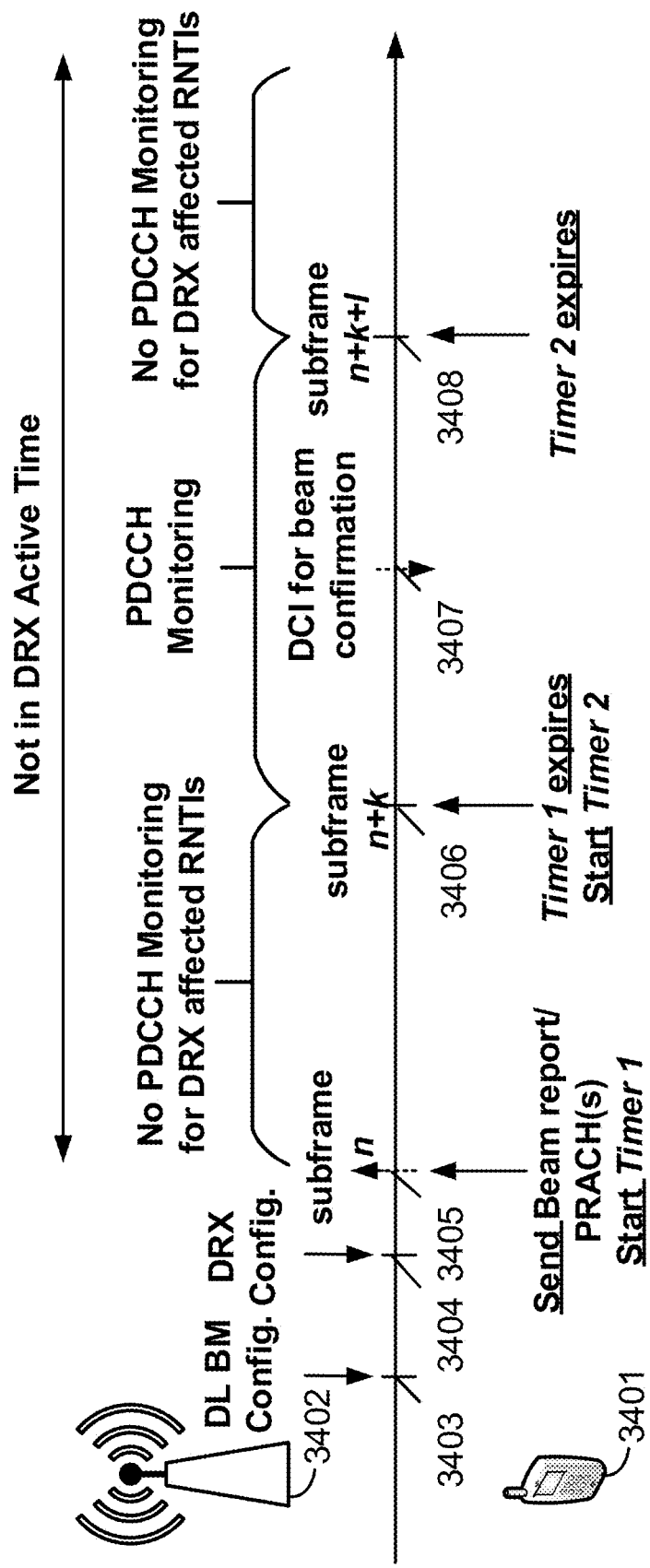
FIG. 34 shows an example of physical downlink control channel (PDCCH) monitoring with a DRX configuration and a downlink beam management procedure.

FIG. 34 shows an example of a downlink BM procedure and a DRX operation. A base station 3402 may send, and a wireless device 3401 may receive, one or more first radio resource control messages comprising one or more downlink beam management parameters. The base station 3402 may send, and the wireless device 3401 may receive, one or more second RRC messages comprising one or more DRX parameters. The one or more first RRC messages may be sent and/or received before the one or more second RRC messages may be sent and/or received, respectively. The wireless device 3401 may send, to the base station 3402 and based on the one or more downlink beam management parameters, one or more of: a beam report, or a physical random access channel signal. The wireless device 3401 may monitor, based on determining that a medium access control entity of the wireless device 3401 is not in a DRX active time, a downlink control channel for downlink control information. The wireless device 3401 may start a first timer based on determining that the MAC entity of the wireless device 3401 is not in a DRX active time. The wireless device 3401 may perform the monitoring of the downlink control channel for the DCI after an expiration of the first timer. The wireless device 3401 may start a second timer after the expiration of the first timer. The wireless device 3401 may stop monitoring the downlink control channel for the DCI based on an expiration of the second timer. The MAC entity of the wireless device 3401 may not be in a DRX active time at a time period between starting the first timer and an expiration of the second timer. The wireless device 3401 may detect, during the monitoring the downlink control channel, the DCI. The wireless device 3401 may determine, based on detecting the DCI, a beam for a transmission to the base station 3402. The wireless device 3401 may receive, based on one or more downlink assignments indicated in the DCI, one or more downlink packets.

At step 3403, the base station 3402 may transmit, to the wireless device 3401, one or more RRC messages comprising one or more parameters for a downlink BM procedure. The one or more parameters may comprise one or more CSI-RS parameters, such as one or more of: CSI-RS resource configuration identity; number of CSI-RS ports; CSI-RS configuration (e.g., symbol and resource element locations in a subframe); CSI-RS subframe configuration (e.g., subframe location, offset, and/or periodicity in radio frame); CSI-RS power parameter; CSI-RS sequence parameter; code division multiplexing (CDM) type parameter; frequency density; transmission comb; and/or QCL parameters. The base station 3402 may configure an SS block as the one or more reference signals for downlink BM. The one or more parameters may comprise one or more beam reporting parameters for a downlink BM procedure, such as one or more of: beam reporting periodicity; beam reporting granularity; beam reporting information (e.g., RSRP, RSRQ, and/or CSI); beam reporting threshold; and/or radio resource configuration for beam reporting. The one or more parameters may comprise one or more DRX operation parameters, such as one or more of: onDurationTimer; drx-InactivityTimer; drx-RetransmissionTimer; drx-ULRetransmissionTimer; the longDRX-Cycle; the value of the drxStartOffset; the drxShortCycleTimer; and/or shortDRX-Cycle. The one or more parameters may comprise one or more timer parameters, such as one or more of: a downlink beam reporting timer (e.g., Timer 1 in FIG. 34), and/or a downlink beam management timer (e.g., Timer 2 in FIG. 34). The base station 3402 may transmit the one or more parameters at step 3403 (e.g., for downlink BM) and/or at step 3404 (e.g., for DRX configuration). The one or more RRC messages comprising one or more parameters for a downlink BM procedure may be transmitted (e.g., at 3403) before or after the base station 3402 transmits, to the wireless device 3401, one or more RRC messages configuring DRX operation (e.g., at step 3404). The base station 3403 may transmit one or more MAC control elements that may be used by the wireless device 3401 to configure a short cycle DRX operation and/or a long cycle DRX operation.

If the wireless device 3401 is configured with a DRX operation (e.g., based on the one or more messages at 3404 and/or the one or more messages at 3403), the wireless device 3401 may start a first timer (e.g., Timer 1 in FIG. 34) at step 3405 (e.g., at subframe n). The wireless device 3401 may start the first timer, for example, after sending one or more beam reports and/or PRACH (e.g., at 3405). The wireless device 3401 may send one or more beam reports and/or PRACH in response to the one or more RRC messages configuring a downlink BM procedure. At a time period 3405 to 3406, the wireless device 3401 may not perform PDCCH monitoring for DRX affected RNTIs. The wireless device 3401 (e.g., the MAC entity of the wireless device 3401) may stop monitoring the PDCCH for DRX affected RNTIs if, for example: the wireless device 3401 is not in the active time (e.g., if DRX is configured), and the first timer is running.

The active time may be time that:

onDurationTimer, drx-InactivityTimer, drx-RetransmissionTimer, drx-ULRetransmissionTimer, and/or mac-ContentionResolutionTimer is running;

a scheduling request is sent on PUCCH and is pending;

an uplink grant for a pending HARQ retransmission may occur and there is data in a corresponding HARQ buffer for a synchronous HARQ process;

a PDCCH indicating a new transmission addressed to the C-RNTI of the MAC entity has not been received after successful reception of a random access response for a preamble that is not selected by the MAC entity;

a PDCCH, indicating one or more CSI-RS (e.g., associated with one or more beams) addressed to a first RNTI (e.g., C-RNTI) of the MAC entity, has not been received after a first timer (e.g., Timer 1) expires, and before a second timer (e.g., Timer 2) expires, wherein the second timer starts after the first timer expires; and/or a PDCCH indicating one or more SRS (e.g., associated with one or more beams), addressed to a first RNTI (e.g., C-RNTI) of the MAC entity, has not been received after a first timer (e.g., Timer 3 described below regarding FIG. 35) expires, and before second timer (e.g., Timer 4 described below regarding FIG. 35) expires, wherein, the second timer starts after the first timer expires.

At step 3406 (e.g., at subframe n+k), the wireless device 3401 may start a second timer (e.g., Timer 2 in FIG. 34), for example, after or in response to the first timer (e.g., Timer 1) expiring. The wireless device 3401 may monitor the PDCCH (e.g., at a time period 3406 to 3408) to detect one or more second DCI 3407. The wireless device 3401 may monitor the PDCCH if the second timer (e.g., Timer 2) is running. The one or more second DCI 3407 may be addressed to a first RNTI (e.g., C-RNTI) that may indicate a downlink beam confirmation. The wireless device 3401 may monitor the PDCCH even if the MAC entity is not in active time (e.g., if configured for DRX operation). Additionally or alternatively, the wireless device 3401 may monitor the PDCCH if the MAC entity is in active time.

The wireless device 3401 may start the second timer (e.g., Timer 2) in response to the first timer (e.g., Timer 1) expiring. If the second timer (e.g., Timer 2) is running, the wireless device 3401 may monitor the PDCCH to detect one or more second DCI for a downlink beam confirmation, even if the MAC entity is not in active time (e.g., if configured for DRX operation). Additionally or alternatively, if the second timer is running, the wireless device may monitor the PDCCH to detect one or more second DCI for a downlink beam confirmation if the MAC entity is in active time. The wireless device 3401 may discard one or more third DCI (not shown), and/or the wireless device 3401 may transition to a DRX inactive state, for example, if the one or more third DCI is not addressed to the first RNTI and/or if the one or more third DCI is not for the downlink beam confirmation.

A value of the first timer (e.g., Timer 1) may be equal to or correspond with the value of an UL HARQ RTT timer and/or the value of a DL HARQ RTT timer (e.g., without RRC configuration). The value of the first timer (e.g., Timer 1) may be variable or may be predefined to be a fixed value (e.g., without RRC configuration). The base station 3402 may configure the value of a UL HARQ RTT timer, the value of a DL HARQ RTT timer, and/or the value of a first timer (e.g., Timer 1). The value for any timer may be zero, or greater than zero.

The wireless device 3401 may transmit, to the base station 3402, one or more beam reports in a subframe n, for example, in response to a configured downlink beam management as shown at step 3405 in FIG. 34. The wireless device 3401 may stop monitoring PDCCH if the wireless device 3401 is not in DRC active time. The wireless device 3401 may start (or restart) monitoring at subframe n+k to detect one or more first DCI for beam confirmation (e.g., at 3407). The wireless device 3401 may stop monitoring PDCCH at subframe n+k+1, for example, if the wireless device 3401 does not receive the one or more first DCI for beam confirmation. The wireless device 3401 may stop monitoring PDCCH in response to an expiration of the second timer (e.g., Timer 2). The wireless device may not perform PDCCH monitoring for DRX affected RNTIs at a time period 3408 and after, as shown in FIG. 34. A value of k and/or 1 may be predefined as a fixed value or may be configured, for example, via RRC signaling.

Figure 35:
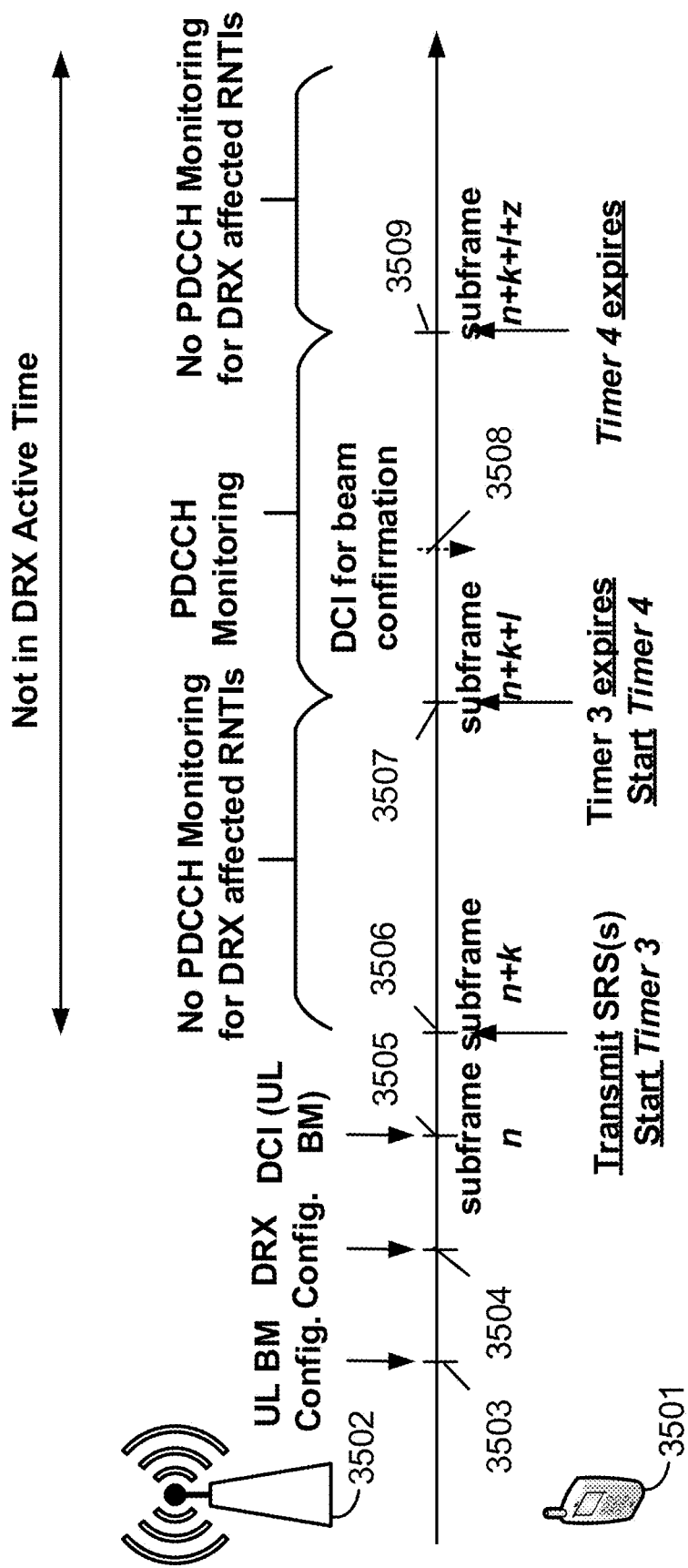
FIG. 35 shows an example of PDCCH monitoring with a DRX configuration and an uplink beam management procedure.

FIG. 35 shows an example of an uplink BM procedure with a DRX operation. A base station 3502 may transmit, to a wireless device 3501, one or more RRC messages comprising one or more parameters for an uplink BM procedure. The one or more parameters may comprise one or more SRS parameters, such as one or more of: an SRS resource index (SRI); a set of resource elements within a time duration and/or frequency span, and/or antenna ports; an SRS bandwidth (e.g., a configurable SRS bandwidth), SRS numerology, density in frequency domain (e.g., comb levels) and/or in time domain; partial band size; and/or full band size. The one or more parameters may comprise one or more DRX operation parameters, such as one or more of: onDurationTimer; drx-InactivityTimer; drx-RetransmissionTimer; drx-ULRetransmissionTimer; the longDRX-Cycle; the value of the drxStartOffset; the drxShortCycleTimer; and/or shortDRX-Cycle. The one or more parameters may comprise one or more timer parameters, such as one or more of: an uplink SRS sending timer (e.g., Timer 3 in FIG. 35), and/or an uplink beam management timer (e.g., Timer 4 in FIG. 35). The base station 3502 may transmit the one or more parameters at step 3503 (e.g., for uplink BM), at step 3504 (e.g., for DRX configuration), and/or at step 3505 (e.g., for uplink BM). The one or more RRC messages comprising one or more parameters for an uplink BM procedure may be transmitted (e.g., at 3503) before or after the base station 3502 transmits, to the wireless device 3501, one or more RRC messages configuring DRX operation (e.g., at step 3504). The base station 3502 may transmit one or more MAC control elements that may be used by the wireless device 3501 to configure a short cycle DRX operation and/or a long cycle DRX operation. The base station 3502 may transmit, at step 3505 (e.g., which may be at subframe n), one or more first DCI comprising one or more parameters configured to cause the wireless device 3501 to perform an uplink BM procedure. The one or more first DCI may comprise one or more of: SRS parameters indicating resource configuration; SRS power control parameters; and/or an SRS power control command.

If the wireless device 3501 is configured with a DRX operation (e.g., based on the one or more messages at 3504 and/or the one or more messages at 3503), the wireless device 3501 may start a first timer (e.g., Timer 3 in FIG. 35) at step 3506 (e.g., at subframe n+k). The wireless device 3501 may start the first timer, for example, after sending one or more SRS (e.g., at 3506). The wireless device 3501 may send the one or more SRS in response to receiving the one or more first DCI (e.g., at 3505) configured to cause the wireless device 3501 to perform an uplink BM procedure. The wireless device 3501 may start the first timer (e.g., Timer 3) in response to receiving the one or more first DCI (e.g., at 3505) configured to cause the wireless device 3501 to perform an uplink BM procedure. The wireless device 3501 may send one or more SRS after starting the first timer (e.g., Timer 3).

At time period 3506 to 3507, the wireless device 3501 may not perform PDCCH monitoring for affected RNTIs. The wireless device 3501 (e.g., the MAC entity of the wireless device 3501) may stop monitoring the PDCCH for DRX affected RNTIs if, for example: the wireless device 3501 is not in the active time (e.g., if DRX is configured), and the first timer is running.

At step 3507 (e.g., at subframe n+k+1), the wireless device 3501 may start a second timer (e.g., Timer 4 in FIG. 35), for example after or in response to the first timer (e.g., Timer 3) expiring. The wireless device 3501 may monitor the PDCCH (e.g., at a time period 3507 to 3509) to detect one or more second DCI 3508. The wireless device 3501 may monitor the PDCCH if the second timer (e.g., Timer 4) is running. The one or more second DCI 3508 may be addressed to the C-RNTI for an uplink beam confirmation. The wireless device 3501 may monitor the PDCCH even if the MAC entity is not in active time (e.g., if configured for DRX operation). Additionally or alternatively, the wireless device 3501 may monitor the PDCCH to detect one or more second DCI for an uplink beam confirmation if the MAC entity is in active time, for example, if the second timer (e.g., Timer 4) is running.

The wireless device 3501 may start the second timer (e.g., Timer 4) after or in response to the first timer (e.g., Timer 3) expiring. If the second timer (e.g., Timer 4) is running, the wireless device 3501 may monitor the PDCCH to detect one or more second DCI for an uplink beam confirmation, even if the MAC entity is not in active time (e.g., if configured for DRX operation). The wireless device 3501 may discard one or more third DCI (not shown), and/or the wireless device 3501 may transition to a DRX inactive state, for example, if the one or more third DCI is not addressed to the C-RNTI and/or if the one or more third DCI is not for the uplink beam confirmation.

A value of the first timer (e.g., Timer 3) may be equal to or correspond with the value of an UL HARQ RTT timer and/or the value of a DL HARQ RTT timer (e.g., without RRC configuration). The value of the first timer (e.g., Timer 3) may be variable or may be predefined to be a fixed value (e.g., without RRC configuration). The base station 3502 may configure the value of a UL HARQ RTT timer, the value of a DL HARQ RTT timer, and/or the value of a first timer (e.g., Timer 3). The value for any timer may be zero, or greater than zero.

The wireless device 3501 may receive, from the base station 3502, one or more first DCI triggering uplink beam management at subframe n, as shown at step 3505 in FIG. 35. The wireless device 3501 may transmit (e.g., at 3506) one or more SRSs in subframe n+k, for example, in response to receiving the one or more first DCI. The wireless device 3501 may stop monitoring PDCCH after transmitting the one or more SRS, if the wireless device 3501 is not in DRC active time. The wireless device 3501 may start (or restart) monitoring at subframe n+k+1 to detect one or more second DCI for beam confirmation. The wireless device 3501 may stop monitoring PDCCH at subframe n+k+1+z, for example, if the wireless device 3501 does not receive the one or more second DCI for beam confirmation. The wireless device 3501 may stop monitoring PDCCH in response to an expiration of the second timer (e.g., Timer 4). The wireless device may not perform PDCCH monitoring for DRX affected RNTIs at a time period 3509 and after, as shown in FIG. 35. A value of 1 and/or z may be predefined as a fixed value or may be configured, for example, via RRC signaling.

Figure 36:
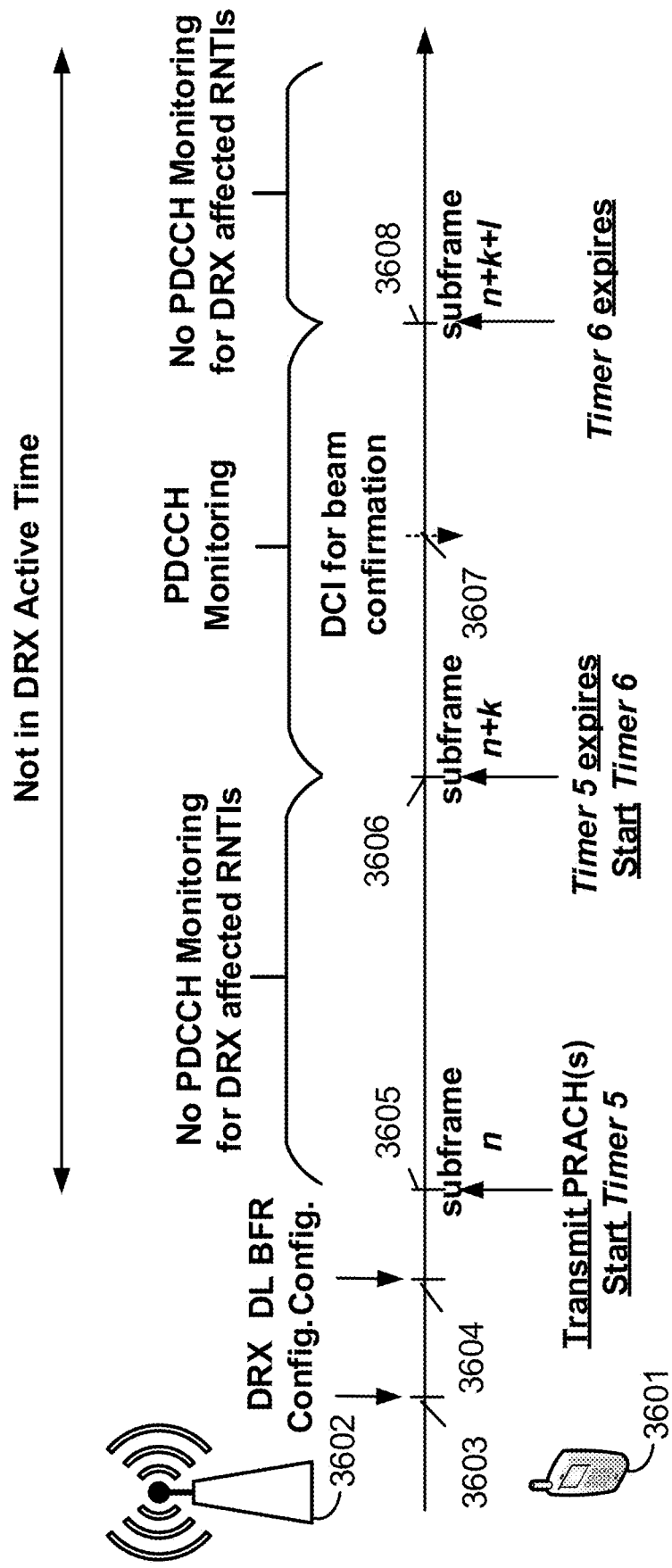
FIG. 36 shows an example of PDCCH monitoring with a DRX configuration and a downlink beam failure recovery procedure.

FIG. 36 shows an example of a downlink BFR procedure and a DRX operation. A base station 3602 may send, and a wireless device 3601 may receive, one or more radio resource control messages indicating: one or more preambles of a beam failure recovery procedure, and/or one or more parameters of a DRX operation. The wireless device 3601 may receive, during a first time period, one or more first RRC messages indicating the one or more preambles of the beam failure recovery procedure. The wireless device 3601 may receive, during a second time period, one or more second RRC messages indicating the one or more parameters of the DRX operation. The first time period may be before, after, or the same time period as the second time period. The wireless device 3601 may send, to the base station 3601 and based on detecting a beam failure, the one or more preambles. The wireless device 3601 may monitor, based on determining that a medium access control entity of the wireless device 3601 is not in a DRX active time, a DCI. The wireless device 3601 may detect, during the monitoring of the downlink control channel, the DCI. The wireless device 3601 may determine, based on detecting the DCI, a beam for a transmission to the base station 3602. The wireless device 3601 may transmit, to the base station 3602 and based on determining that the MAC entity of the wireless device 3601 is not in a DRX active time, a physical random access channel transmission. The wireless device 3601 may start a first timer based on determining that the MAC entity of the wireless device 3601 is not in a DRX active time. The wireless device 3601 may monitor the downlink control channel for the DCI after an expiration of the first timer. The wireless device 3601 may start a second timer after an expiration of the first timer. The wireless device 3601 may stop monitoring the downlink control channel for the DCI based on an expiration of the second timer. The MAC entity of the wireless device 3601 may not be in a DRX active time at a time between the starting of the first timer and an expiration of the second timer. The wireless device 3601 may receive, based on one or more downlink assignments indicated in the DCI, one or more downlink packets.

At step 3603, the base station 3602 may transmit, to the wireless device 3601, one or more RRC messages comprising one or more parameters for a downlink BFR procedure. The one or more parameters may comprise one or more CSI-RS parameters and/or one or more PRACH parameters, such as one or more of: CSI-RS resource configuration identity; number of CSI-RS ports; CSI-RS configuration (e.g., symbol and resource element locations in a subframe); CSI-RS subframe configuration (e.g., subframe location, offset, and/or periodicity in radio frame); CSI-RS power parameter; CSI-RS sequence parameter; CDM type parameter; frequency density; transmission comb; QCL parameters; PRACH resource configurations for a BFR request transmission; and/or threshold and/or timer for beam failure declaring and/or for candidate beam identifying. A downlink reference signal used for a downlink BFR procedure may be one or more SS blocks. The one or more parameters may comprise one or more DRX operation parameters, such as one or more of: onDurationTimer; drx-InactivityTimer; drx-RetransmissionTimer; drx-ULRetransmissionTimer; the longDRX-Cycle; the value of the drxStartOffset; the drxShortCycleTimer; and/or shortDRX-Cycle. The one or more parameters may be associated with one or more timers, such as one or more of: an uplink PRACH sending timer (e.g., Timer 5 in FIG. 36), and/or a downlink BFR timer (e.g., Timer 6 in FIG. 36). The one or more RRC messages comprising one or more parameters for a downlink BFR procedure may be transmitted (e.g., at step 3604) before or after the base station 3602 transmits, to the wireless device 3601, one or more RRC messages configuring DRX operation (e.g., at step 3603). The base station 3603 may transmit one or more MAC control elements that may be used by the wireless device 3601 to configure a short cycle DRX operation and/or a long cycle DRX operation.

If the wireless device 3601 is configured with a DRX operation (e.g., based on the one or more messages at 3603 and/or the one or more messages at 3604), the wireless device 3601 may start a first timer (e.g., Timer 5 in FIG. 36) at step 3605 (e.g., at subframe n). The wireless device 3601 may start (or restart) the first timer, for example, after sending one or more PRACH, that may be triggered by a BFR request transmission. The wireless device 3601 may transmit a BFR request if a quality of beam pair link(s) of an associated control channel falls below a threshold (e.g., in comparison with a threshold, and/or based on an expiry of a timer that may be associated with the threshold). A threshold and/or a timer may be configured via one or more RRC signaling. At a time period 3605 to 3606, the wireless device 3601 may not perform PDCCH monitoring for DRX affected RNTIs. The wireless device 3601 (e.g., the MAC entity of the wireless device 3601) may stop monitoring the PDCCH for DRX affected RNTIs if, for example: the wireless device 3601 is not in the active time (e.g., if DRX is configured), and the first timer is running.

At step 3606 (e.g., at subframe n+k), the wireless device 3601 may start a second timer (e.g., Timer 6 in FIG. 36), for example, after or in response to the first timer (e.g., Timer 5) expiring. The wireless device 3601 may monitor the PDCCH (e.g., at a time period 3606 to 3608) to detect one or more second DCI 3607. The wireless device 3601 may monitor the PDCCH if the second timer (e.g., Timer 6) is running. The one or more second DCI may be addressed to the C-RNTI for a downlink beam confirmation. The wireless device 3601 may monitor the PDCCH even if the MAC entity is not in active time (e.g., if configured for DRX operation). Additionally or alternatively, the wireless device may monitor the PDCCH to detect one or more second DCI addressed to the first RNTI for a downlink beam confirmation if the MAC entity is in active time (e.g., if configured with DRX operation).

The wireless device 3601 may start a second timer (e.g., Timer 6), after or in response to the first timer (e.g., Timer 5) expiring. If the second time (e.g., Timer 6) is running, the wireless device 3601 may monitor the PDCCH to detect one or more second DCI for a downlink beam confirmation, even if the MAC entity is not in active time (e.g., if configured with DRX operation). Additionally or alternatively, the wireless device 3601 may monitor the PDCCH to detect one or more second DCI for a downlink beam confirmation if the MAC entity is in active time (e.g., if configured with DRX operation). The wireless device 3601 may discard one or more third DCI (not shown), and/or the wireless device 3601 may transition to a DRX inactive state, for example, if the one or more third DCI is not addressed to the C-RNTI, and/or if the one or more third DCI is not for the downlink beam confirmation.

A value of the first timer (e.g., Timer 5) may be equal to or correspond with the value of an UL HARQ RTT timer and/or the value of a DL HARQ RTT timer (e.g., without RRC configuration). The value of the first timer (e.g., Timer 5) may be variable or may be predefined to be a fixed value (e.g., without RRC configuration). The base station 3602 may configure the value of a UL HARQ RTT timer, the value of a DL HARQ RTT timer, and/or the value of a first timer (e.g., Timer 5). The value for any timer may be zero, or greater than zero.

The wireless device 3601 may transmit, to the base station 3602, one or more PRACH in a subframe n, for example, in response to a downlink beam failure recovery request, as shown at step 3605 in FIG. 36. The wireless device 3601 may stop monitoring PDCCH if the wireless device 3601 is not in DRC active time. The wireless device 3601 may start (or restart) monitoring at subframe n+k to detect one or more first DCI for beam confirmation (e.g., at 3607). The wireless device 3601 may stop monitoring PDCCH at subframe n+k+1, for example, if the wireless device 3601 does not receive the one or more first DCI for beam confirmation. The wireless device 3601 may stop monitoring PDCCH in response to an expiration of the second timer (e.g., Timer 6). The wireless device may not perform PDCCH monitoring for DRX affected RNTIs at a time period 3608 and after, as shown in FIG. 36. A value of k and/or 1 may be predefined as a fixed value, or may be configured, for example, via RRC signaling.

Figure 37:
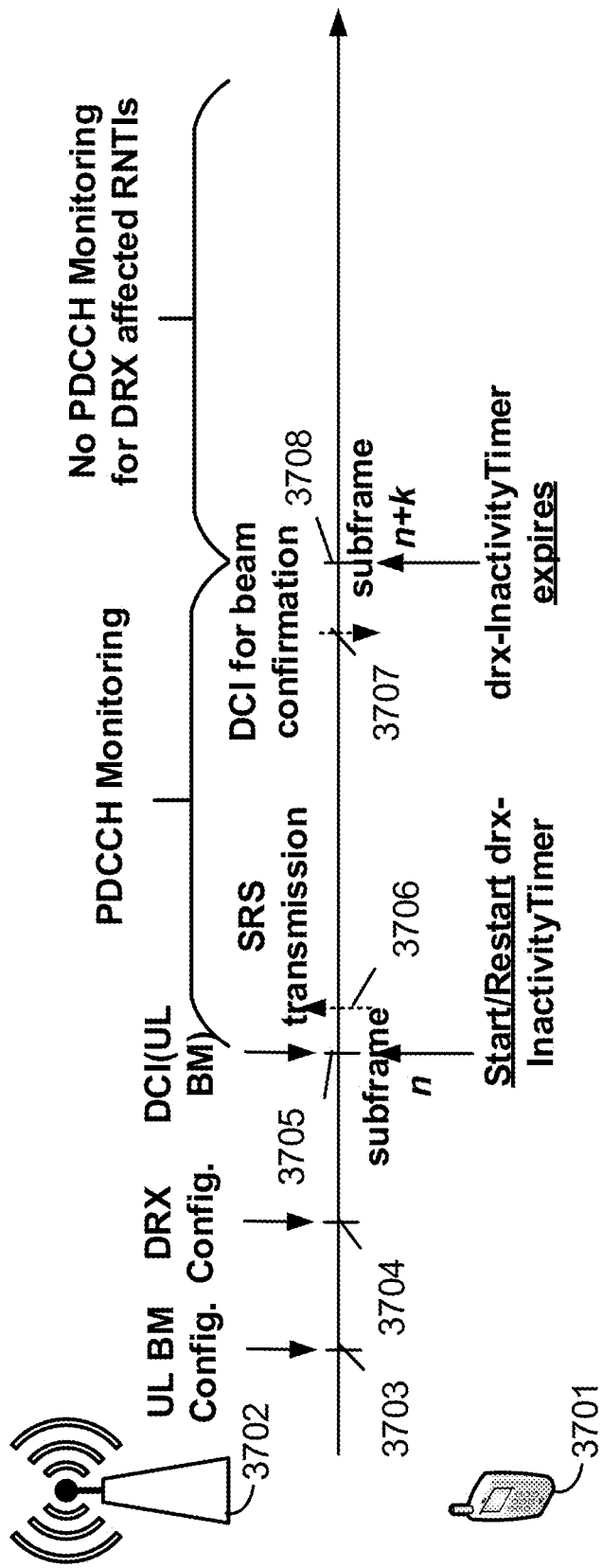
FIG. 37 shows an example of using a timer with a DRX configuration and an uplink beam management procedure.

FIG. 37 shows an example of an uplink BM procedure with a DRX operation. A base station 3702 may send, and a wireless device 3701 may receive, one or more first radio resource control messages comprising one or more uplink beam management parameters. The base station 3702 may send, and the wireless device 3701 may receive, one or more second RRC messages comprising one or more DRX parameters. The base station 3702 may send, and the wireless device 3701 may receive, first downlink control information associated with an uplink beam management and indicating at least one of the one or more uplink beam management parameters. The first RRC messages may be sent and/or received, before, after, or during the same time as the second RRC messages may be sent and/or received, respectively. The wireless device 3701 may start, for example, based on receiving the first DCI, a timer. The wireless device 3701 may send, to the base station 3702 and based on the at least one of the one or more uplink beam management parameters, one or more sounding reference signals. The wireless device 3701 may monitor, after starting the timer and prior to an expiration of the timer, a downlink control channel for a second DCI. The wireless device 3701 may detect, for example, during the monitoring of the downlink control channel, the second DCI. The wireless device 3701 may monitor the downlink control channel for the second DCI after starting the timer and before an expiration of the timer. The wireless device 3701 may stop monitoring the downlink control channel for the second DCI, for example, based on an expiration of the timer. The timer may comprise a DRX inactivity timer indicated by the one or more DRX parameters. The wireless device 3701 may determine, based on detecting the second DCI, a beam for a transmission to the base station 3702. The wireless device 3701 may receive, based on one or more downlink assignments indicated in the second DCI, one or more downlink packets.

At step 3703, the base station 3702 may transmit, to the wireless device 3701, one or more
RRC messages comprising one or more parameters for an uplink BM procedure. The one or more parameters may comprise one or more SRS parameters, such as one or more of: an SRS resource index; a set of resource elements within a time duration and/or frequency span, and/or antenna ports; an SRS bandwidth (e.g., a configurable SRS bandwidth); SRS numerology; density in frequency domain (e.g., comb levels) and/or in time domain; partial band size and/or full band size. The one or more parameters may comprise one or more DRX operation parameters, such as one or more of: onDurationTimer; drx-InactivityTimer; drx-Retransmission-Timer; drx-ULRetransmissionTimer; the longDRX-Cycle; the value of the drxStartOffset; the drxShortCycleTimer; and/or shortDRX-Cycle. The one or more parameters may comprise a first drx timer, a second drx timer, and/or at least one SRS transmission configuration. The at least one SRS transmission configuration comprising at least one parameter indicating at least one radio resource. The base station may transmit the one or more parameters at step 3703 (e.g., for uplink BM), at step 3704 (e.g., for DRX configuration), and/or at step 3705 (e.g., for uplink BM). The base station 3702 may transmit one or more MAC control elements that may be used by the wireless device 3701 to configure a short cycle DRX operation and/or a long cycle DRX operation. The base station 3702 may transmit, at step 3705 (e.g., which may be at subframe n), one or more first DCI comprising one or more parameters configured to cause the wireless device 3701 to perform an uplink BM procedure. The one or more first DCI may comprise one or more of: SRS parameters indicating resource configuration; SRS power control parameters; and/or an SRS power control command. The one or more first DCI may be addressed to a first RNTI (e.g., C-NRTI) of the MAC entity of the wireless device 3701. The wireless device 3701 may receive the one or more first DCI during the active time described above. The wireless device 3701 may receive a first DCI comprising an indicator indicating one of at least one SRS transmission configuration. The wireless device 3701 may transmit at least one SRS (e.g., at 3706) via at least one first radio resource associated with the one of at least one SRS transmission configuration.

At step 3705, the wireless device 3701 may start or restart the drx-InactivityTimer, for example, after or in response to receiving the one or more first DCI that may cause the wireless device 3701 to perform an uplink BM procedure (e.g., if the wireless device 3701 is configured with DRX operation by the one or more RRC messages and/or one or more MAC CE). At step 3706, the wireless device 3701 may transmit, to the base station 3702, one or more SRS. The wireless device 3701 may transmit the one or more SRS after starting, or restarting, the drx-InactivityTimer. Additionally or alternatively, the wireless device may transmit the one or more SRS (e.g., at step 3706) after or in response to receiving the one or more first DCI triggering an uplink BM procedure. The wireless device 3701 may start, or restart, the drx-InactivityTimer after or in response to receiving one or more DCI for a new transmission (e.g., if the wireless device 3701 is configured with DRX operation by the one or more RRC message and/or the one or more MAC CE). The new transmission may comprise one or more of: uplink PUSCH transmission and/or uplink SRS transmission. Additionally or alternatively, the wireless device may start, or restart, the drx-InactivityTimer after sending the one or more SRS (e.g., if the wireless device 3701 is configured with DRX operation by the one or more RRC message and/or one or more MAC CE). The wireless device 3701 may start a first drx timer after transmitting the one or more SRS (e.g., at 3706). The wireless device 3701 may start a second drx timer, and monitor a PDCCH for a second DCI for beam indication, after or in response to an expiry of the first drx timer.

At time period 3705 to 3708, the wireless device 3701 may perform PDCCH monitoring. The wireless device 3701 (e.g., the MAC entity of the wireless device 3701) may monitor the PDCCH, to detect (e.g., at 3707) the second DCI addressed to the first RNTI for an uplink beam confirmation, if the drx-InactivityTimer is running. The wireless device 3701 may transition to a DRX mode, for example, after or in response to the drx-InactivityTimer expiring (e.g., at step 3708, which may be at subframe n+k). The wireless device 3701 may stop monitoring the PDCCH for DRX affected RNTIs at a time period 3708 and after, as shown in FIG. 37.

The example using a drx-InactivityTimer described above regarding FIG. 37 may be modified for a downlink BFR procedure with a DRX operation. For example, at step 3703, the base station 3701 may transmit one or more RRC messages comprising one or more parameters for a downlink BFR procedure. The one or more parameters may comprise one or more CSI-RS parameters and/or one or more PRACH parameters, such as one or more of: CSI-RS resource configuration identity; number of CSI-RS ports; CSI-RS configuration (e.g., symbol and resource element locations in a subframe); CSI-RS subframe configuration (e.g., subframe location, offset, and/or periodicity in radio frame); CSI-RS power parameter; CSI-RS sequence parameter; CDM type parameter; frequency density; transmission comb; QCL parameters; PRACH resource configurations for a BFR request transmission; and/or threshold and/or timer for beam failure declaring and/or for candidate beam identifying. A downlink reference signal used for a downlink BFR procedure may be one or more SS blocks. The one or more RRC messages configuring a downlink BFR procedure may be transmitted (e.g., at step 3703) before or after the one or more RRC messages configuring DRX operation (e.g., at step 3705). At step 3705, the wireless device 3701 may start, or restart, the drx-InactivityTimer, after sending one or more PRACH that may be triggered by a BFR request transmission. The wireless device 3701 may transmit a BFR request if quality of beam pair link(s) of an associated control channel falls below a threshold (e.g., in comparison with a threshold, and/or based on an expiry of a timer that may be associated with the threshold). A threshold and/or a timer may be configured, for example, via one or more RRC signaling. At time period 3705 to 3708, the wireless device 3701 may perform PDCCH monitoring as described above. The wireless device 3701 may monitor a PDCCH for the second DCI for beam indication even if the wireless device 3701 is not in DRX active time.

A first DCI (e.g., at step 3705) may trigger an uplink beam management procedure. The uplink beam management procedure may comprise, for example: transmitting, by the wireless device to the base station, one or more SRSs; and receiving, by the wireless device via PDCCH, a second DCI. The wireless device 3701 may receive the second DCI if the second timer is running. The wireless device 3701 may adjust one or more transceiver parameters for one or more PUSCH transmissions according to the second DCI (e.g., at 3707). The wireless device 3701 may stop monitoring the PDCCH if the first timer is running.

Figure 38:
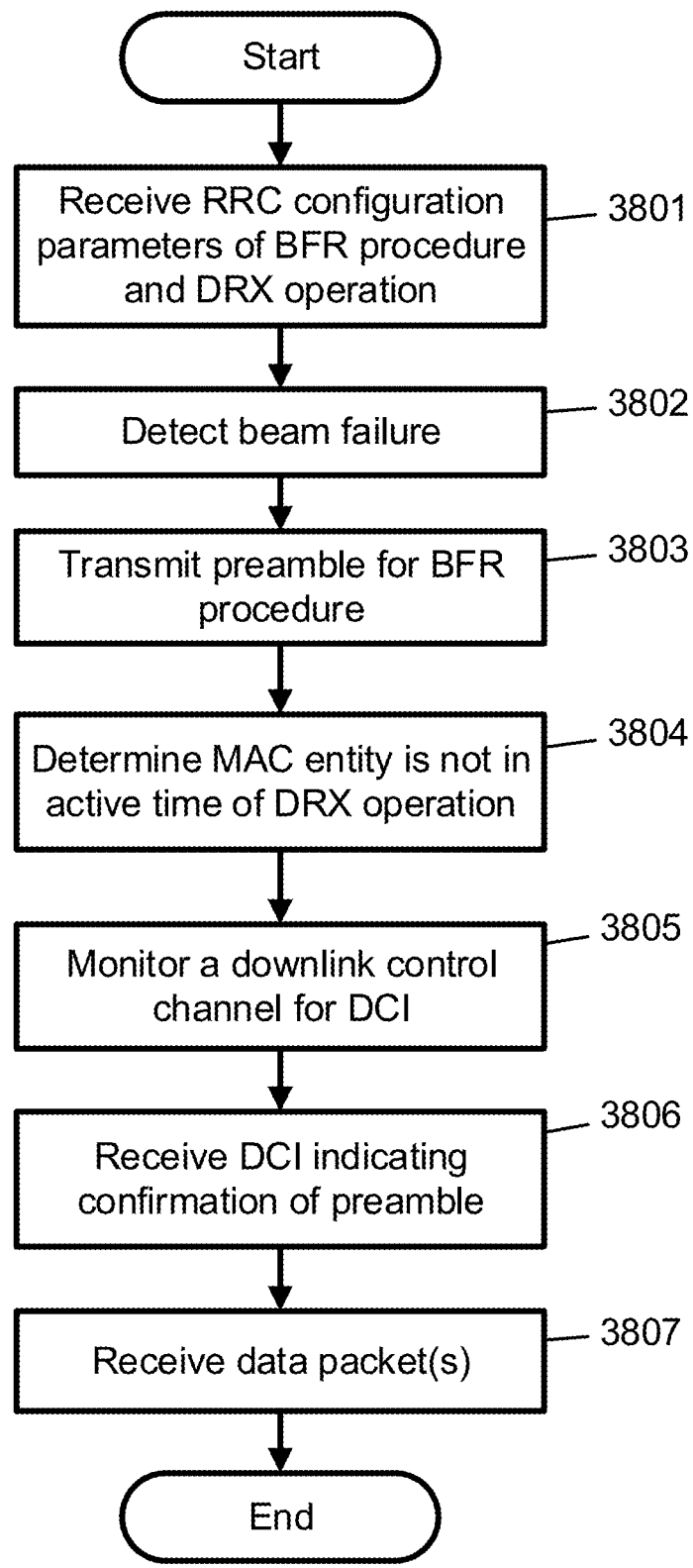
FIG. 38 shows an example of a beam failure recovery procedure with a DRX operation that may be performed by a wireless device.

FIG. 38 shows an example of a beam failure recovery procedure with a DRX operation that may be performed by a wireless device. At step 3801, the wireless device may receive, from a base station, one or more RRC messages comprising configuration parameters for a BFR procedure and a DRX operation. The wireless device may receive the one or more RRC messages in a cell. One or more first RRC messages may comprise one or more parameters for a BFR procedure. One or more second RRC messages may comprise one or more parameters for a DRX operation. The wireless device may receive the one or more first RRC messages prior to, or after, the wireless device receives the one or more second RRC messages.

At step 3802, the wireless device may detect a beam failure. The wireless device may detect the beam failure based on one or more reference signals of the cell. The wireless device may detect the beam failure, for example, by determining that a quality of beam pair link(s) of an associated control channel is unsatisfactory. A determination of an unsatisfactory quality of beam pair link(s) of an associated channel may be based on the quality falling below a threshold and/or an expiration of a timer. A quality of a beam pair link may be based on one or more of an RSRP value, reference signal received quality (RSRQ) value, and/or CSI value measured on RS resources.

At step 3803, the wireless device may transmit, to the base station, a preamble for a beam failure recovery procedure. The wireless device may transmit the preamble in response to detecting a beam failure. The preamble may be a random access preamble (e.g., PRACH) that may be associated with a random access procedure.

At step 3804, the wireless device may determine that a MAC entity associated with the wireless device is not in an active time of a DRX operation. The wireless device may determine that the MAC entity is not in an active time of the DRX operation based on one or more configuration parameters of the DRX operation.

At step 3805, the wireless device may monitor a downlink control channel (e.g., PDCCH) for a DCI. The wireless may monitor the downlink control channel based on or in response to determining that the MAC entity is not in an active time of a DRX operation.

At step 3806, the wireless device may receive a DCI. The DCI may indicate a confirmation of the preamble. At step 3807, the wireless device may receive one or more data packets (e.g., downlink packets). The wireless device may receive the one or more data packets in response to the DCI. After the wireless device receives the one or more data packets, the process may end.

Figure 39:
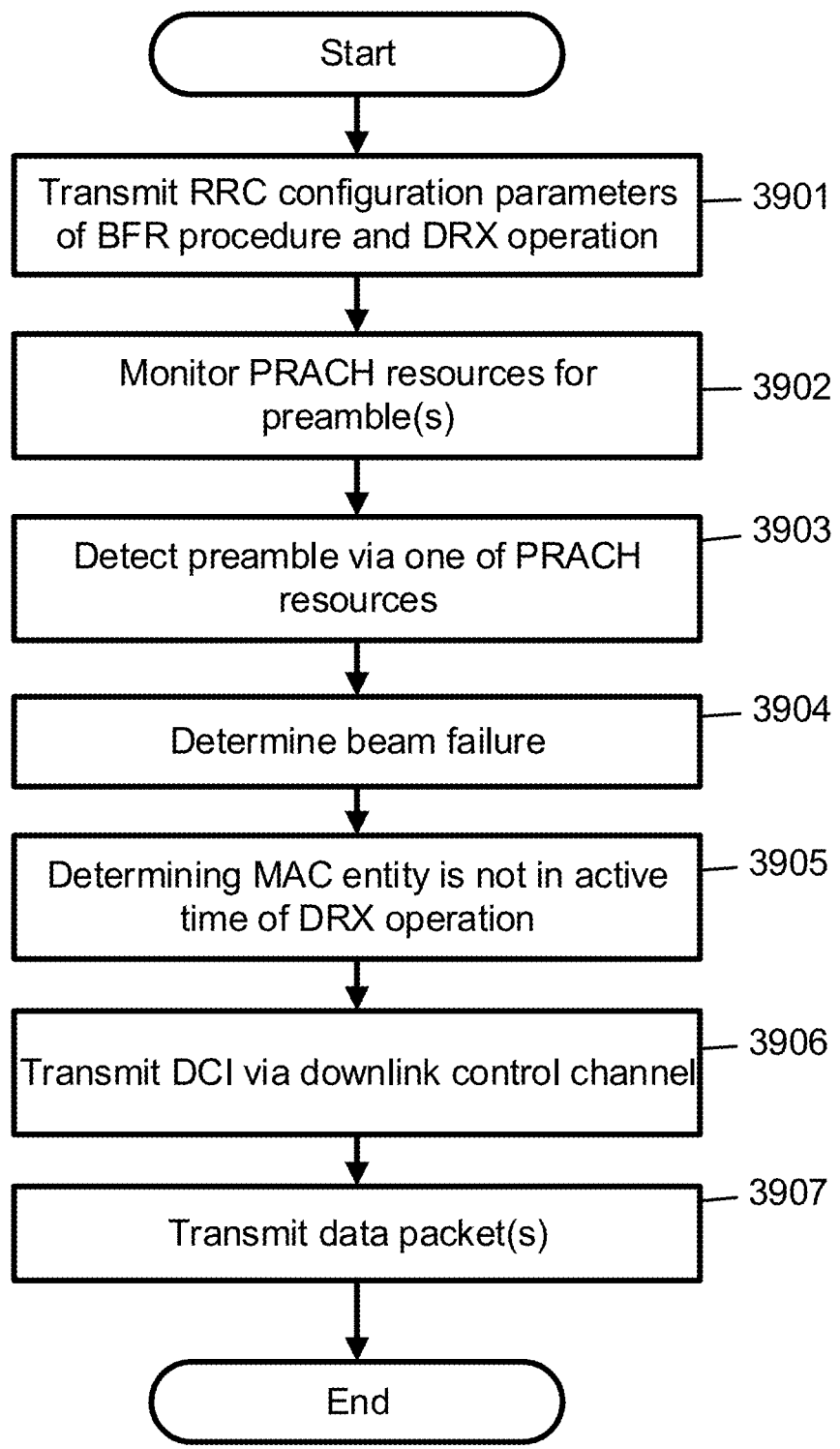
FIG. 39 shows an example of a beam failure recovery procedure with a DRX operation that may be performed by a base station.

FIG. 39 shows an example of a beam failure recovery procedure with a DRX operation that may be performed by a base station. At step 3901, the base station may transmit, to a wireless device, one or more RRC messages comprising configuration parameters for a BFR procedure and a DRX operation. The base station may transmit the one or more RRC messages in a cell. One or more first RRC messages may comprise one or more parameters for a BFR procedure. One or more second RRC messages may comprise one or more parameters for a DRX operation. The base station may transmit the one or more first RRC messages prior to, or after, the base station transmits the one or more second RRC messages.

At step 3902, the base station may monitor PRACH resources for one or more preambles.

At step 3903, the base station may detect a preamble via one of the PRACH resources. At step 3904, the base station may determine a beam failure. The base station may determine a beam failure, for example, by determining that a quality of beam pair link(s) of an associated control channel is unsatisfactory, and/or by receiving a beam failure recovery request.

At step 3905, the base station may determine that the MAC entity associated with the wireless device is not in an active time of the DRX operation. The base station may determine that the MAC entity is not in an active time of the DRX operation based on one or more configuration parameters of the DRX operation.

At step 3906, the base station may transmit a DCI, for example, via a downlink control channel. The DCI may indicate a confirmation of a preamble received by the base station from the wireless device. The base station may transmit the DCI based on or in response to determining that the MAC entity associated with the wireless device is not in an active time of the DRX operation.

At step 3907, the base station may transmit one or more data packets (e.g., downlink packets). After the base station transmits the one or more data packets, the process may end.

Figure 40:
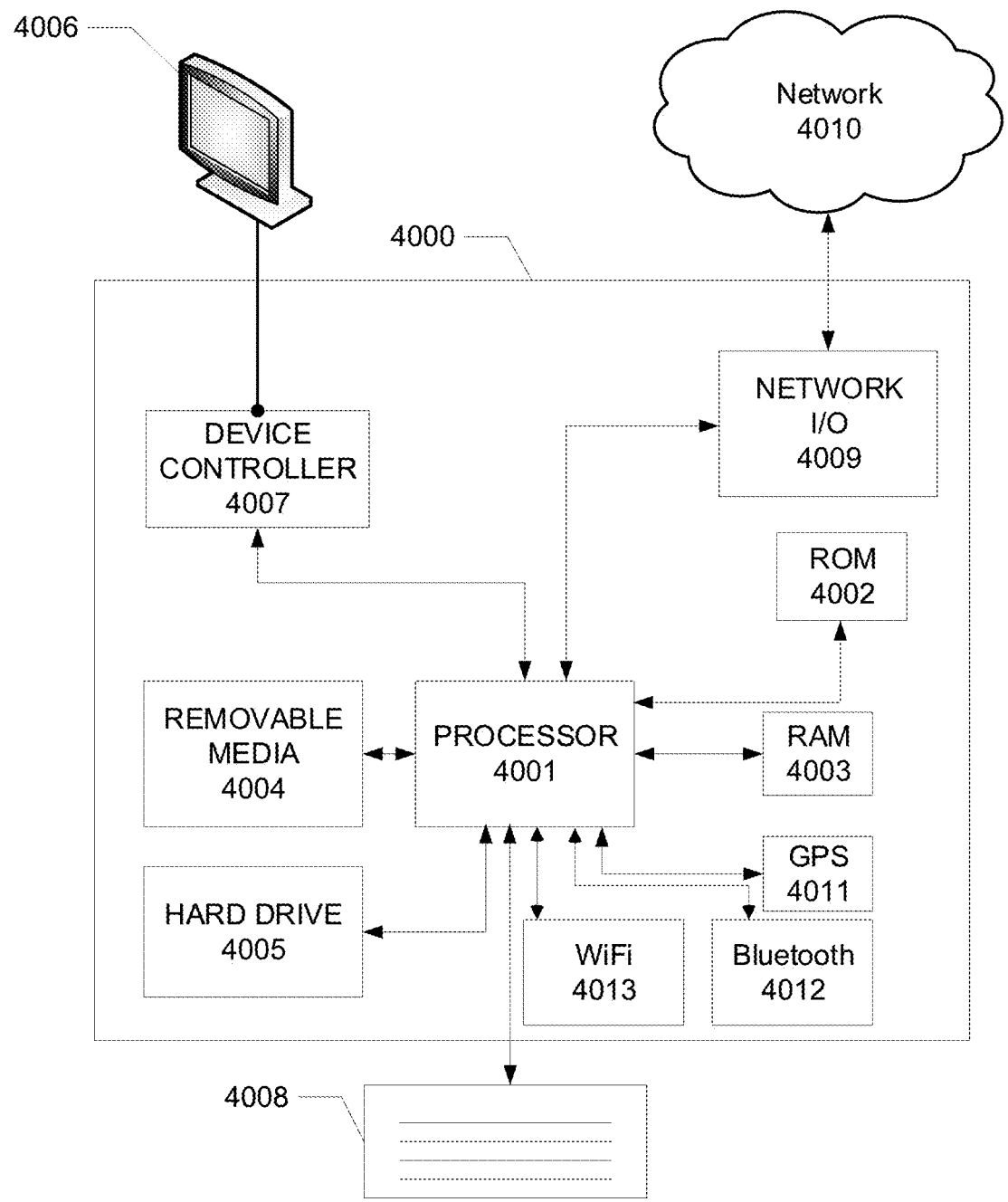
FIG. 40 shows example elements of a computing device that may be used to implement any of the various devices described herein.

FIG. 40 shows general hardware elements that may be used to implement any of the various computing devices discussed herein, including, e.g., the base station 401, the wireless device 406, or any other base station, wireless device, or computing device described herein. The computing device 4000 may include one or more processors 4001, which may execute instructions stored in the random access memory (RAM) 4003, the removable media 4004 (such as a Universal Serial Bus (USB) drive, compact disk (CD) or digital versatile disk (DVD), or floppy disk drive), or any other desired storage medium. Instructions may also be stored in an attached (or internal) hard drive 4005. The computing device 4000 may also include a security processor (not shown), which may execute instructions of one or more computer programs to monitor the processes executing on the processor 4001 and any process that requests access to any hardware and/or software components of the computing device 4000 (e.g., ROM 4002, RAM 4003, the removable media 4004, the hard drive 4005, the device controller 4007, a network interface 4009, a GPS 4011, a Bluetooth interface 4012, a WiFi interface 4013, etc.). The computing device 4000 may include one or more output devices, such as the display 4006 (e.g., a screen, a display device, a monitor, a television, etc.), and may include one or more output device controllers 4007, such as a video processor. There may also be one or more user input devices 4008, such as a remote control, keyboard, mouse, touch screen, microphone, etc. The computing device 4000 may also include one or more network interfaces, such as a network interface 4009, which may be a wired interface, a wireless interface, or a combination of the two. The network interface 4009 may provide an interface for the computing device 4000 to communicate with a network 4010 (e.g., a RAN, or any other network). The network interface 4009 may include a modem (e.g., a cable modem), and the external network 4010 may include communication links, an external network, an in-home network, a provider's wireless, coaxial, fiber, or hybrid fiber/coaxial distribution system (e.g., a DOCSIS network), or any other desired network. Additionally, the computing device 4000 may include a location-detecting device, such as a global positioning system (GPS) microprocessor 4011, which may be configured to receive and process global positioning signals and determine, with possible assistance from an external server and antenna, a geographic position of the computing device 4000.

The example in FIG. 40 is a hardware configuration, although the components shown may be implemented as software as well. Modifications may be made to add, remove, combine, divide, etc. components of the computing device 4000 as desired. Additionally, the components may be implemented using basic computing devices and components, and the same components (e.g., processor 4001, ROM storage 4002, display 4006, etc.) may be used to implement any of the other computing devices and components described herein. For example, the various components described herein may be implemented using computing devices having components such as a processor executing computer-executable instructions stored on a computer-readable medium, as shown in FIG. 40. Some or all of the entities described herein may be software based, and may co-exist in a common physical platform (e.g., a requesting entity may be a separate software process and program from a dependent entity, both of which may be executed as software on a common computing device).

One or more features of the disclosure may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features of the disclosure, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a UE, a base station, and the like) to enable operation of multi-carrier communications described herein. The device, or one or more devices such as in a system, may include one or more processors, memory, interfaces, and/or the like. Other examples may comprise communication networks comprising devices such as base stations, wireless devices or user equipment (UE), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, e.g., any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A method comprising:
   transmitting, by a wireless device in a radio resource control (RRC)-connected state and based on a beam failure, a preamble associated with beam failure recovery;
   based on transmitting the preamble, receiving, via a downlink control channel and during a discontinuous reception (DRX) inactive time and in the RRC-connected state, downlink control information (DCI) associated with the preamble; and
   receiving, based on one or more downlink assignments indicated by the DCI, one or more downlink packets.

2. The method of claim 1, further comprising:
   receiving, during a first time period, one or more first radio resource control (RRC) messages indicating one or more preambles associated with beam failure recovery; and
   receiving, during a second time period, one or more second RRC messages indicating one or more parameters associated with a DRX operation.

3. The method of claim 2, wherein the first time period is after the second time period.

4. The method of claim 1, further comprising:
   determining, based on the receiving the DCI, a beam for a transmission to a base station.

5. The method of claim 1, wherein the transmitting the preamble comprises:
   transmitting, to a base station, the preamble via a physical random access channel.

6. The method of claim 1, further comprising:
   starting a first timer; and
   monitoring, after an expiration of the first timer, the downlink control channel.

7. The method of claim 6, further comprising:
   after the expiration of the first timer, starting a second timer; and
   based on an expiration of the second timer, stopping the monitoring the downlink control channel.

8. The method of claim 1, further comprising:
   determining a time window for monitoring for the DCI associated with the preamble, wherein the time window at least partially overlaps in time with the DRX inactive time; and
   monitoring, during the DRX inactive time and in the RRC-connected state, the downlink control channel.

9. The method of claim 1, wherein the DRX inactive time is according to at least one 3rd Generation Partnership Project (3GPP) standard.

10. A method comprising:
    transmitting, by a wireless device in a radio resource control (RRC)-connected state and during a discontinuous reception (DRX) inactive time, an uplink signal associated with beam management;

based on the transmitting the uplink signal during the DRX inactive time, determining that the wireless device is in a discontinuous reception (DRX) active time and in the RRC-connected state;

during the DRX active time:
    receiving, via a first downlink control channel, downlink control information (DCI) not associated with beam management; and
    receiving, via a second downlink control channel, DCI associated with the uplink signal; and receiving, based on one or more downlink assignments indicated by the DCI associated with the uplink signal, one or more downlink packets.

11. The method of claim 10, further comprising:
receiving one or more first radio resource control (RRC) messages comprising one or more downlink beam management parameters; and
after receiving the one or more first RRC messages, receiving one or more second RRC messages comprising one or more DRX parameters.

12. The method of claim 10, further comprising:
determining, based on the receiving the DCI associated with the uplink signal, a beam for a transmission to a base station, wherein the uplink signal comprises a scheduling request.

13. The method of claim 10, further comprising:
starting a first timer; and
monitoring, after an expiration of the first timer, the second downlink control channel for the DCI associated with the uplink signal.

14. The method of claim 13, further comprising:
after the expiration of the first timer, starting a second timer; and
based on an expiration of the second timer, stopping the monitoring the second downlink control channel for the DCI associated with the uplink signal.

15. The method of claim 10, further comprising:
transmitting, to a base station and based on one or more downlink beam management parameters, one or more of:
    a beam report;
    a beam failure recovery request; or
    a physical random access channel signal.

16. The method of claim 10, wherein the DRX active time is according to at least one 3rd Generation Partnership Project (3GPP) standard.

17. A method comprising:
receiving, by a wireless device in a radio resource control (RRC)-connected state, first downlink control information (DCI) associated with uplink beam management and indicating one or more uplink beam management parameters;
transmitting, based on the first DCI, an uplink signal;
based on the transmitting the uplink signal, starting a timer; and
after the starting the timer and prior to an expiration of the timer, receiving, during a discontinuous reception (DRX) inactive time and in the RRC-connected state, second DCI associated with the uplink beam management, wherein the second DCI is received via a downlink control channel.

18. The method of claim 17, further comprising:
receiving one or more first radio resource control (RRC) messages comprising one or more uplink beam management parameters; and
after receiving the one or more first RRC messages, receiving one or more second RRC messages comprising one or more DRX parameters.

19. The method of claim 17, further comprising:
determining, based on the receiving the second DCI, a beam for a transmission to a base station.

20. The method of claim 17, further comprising:
determining a time window for monitoring the downlink control channel for the second DCI, wherein the time window at least partially overlaps in time with the DRX inactive time.

21. The method of claim 17, further comprising:
monitoring, during the DRX inactive time, the downlink control channel for the second DCI; and
based on an expiration of the timer, stopping the monitoring the downlink control channel for the second DCI.

22. The method of claim 17, wherein the transmitting the uplink signal comprises:
transmitting, to a base station and based on the one or more uplink beam management parameters, one or more sounding reference signals.

23. The method of claim 17, wherein the DRX inactive time is according to at least one 3rd Generation Partnership Project (3GPP) standard.

* * * * *

UNITED STATES PATENT AND TRADEMARK OFFICE
CERTIFICATE OF CORRECTION

PATENT NO. : 11,611,468 B2
APPLICATION NO. : 16/146913
DATED : March 21, 2023
INVENTOR(S) : Zhou et al.

Page 1 of 4

It is certified that error appears in the above-identified patent and that said Letters Patent is hereby corrected as shown below:

On the Title Page

Page 4, Column 1, Item (56) Other Publications, Line 8:
Delete "Incorpated," and insert --Incorporated,-- therefor Page 4, Column 1, Item (56) Other Publications, Line 21:
Delete "2019 --Extented" and insert --2019 --Extended-- therefor Page 6, Column 1, Item (56) Other Publications, Line 36:
Delete "RZ-1811593" and insert --R2-1811593-- therefor Page 6, Column 1, Item (56) Other Publications, Line 45:
Delete "vZ." and insert --v2.-- therefor Page 6, Column 2, Item (56) Other Publications, Line 38:
Delete "Z018," and insert --2018,-- therefor Page 6, Column 2, Item (56) Other Publications, Line 44:
Delete "Z018," and insert --2018,-- therefor Page 6, Column 2, Item (56) Other Publications, Line 47:
Delete "Z018," and insert --2018,-- therefor Page 6, Column 2, Item (56) Other Publications, Line 49:
Delete "RZ-1802143" and insert --R2-1802143-- therefor Page 6, Column 2, Item (56) Other Publications, Line 50:
Delete "Z018," and insert --2018,-- therefor Signed and Sealed this
Twenty-eighth Day of May, 2024

Katherine Kelly Vidal
*Director of the United States Patent and Trademark Office*

Page 6, Column 2, Item (56) Other Publications, Line 53:
Delete "Z018," and insert --2018,-- therefor Page 6, Column 2, Item (56) Other Publications, Line 64:
Delete "Z018," and insert --2018,-- therefor Page 6, Column 2, Item (56) Other Publications, Line 67:
Delete "Z018," and insert --2018,-- therefor Page 6, Column 2, Item (56) Other Publications, Line 70:
Delete "Z018," and insert --2018,-- therefor Page 7, Column 1, Item (56) Other Publications, Line 2:
Delete "Z018," and insert --2018,-- therefor Page 7, Column 1, Item (56) Other Publications, Line 5:
Delete "Z018," and insert --2018,-- therefor Page 7, Column 1, Item (56) Other Publications, Line 8:
Delete "Z018," and insert --2018,-- therefor Page 7, Column 1, Item (56) Other Publications, Line 11:
Delete "Z018," and insert --2018,-- therefor Page 8, Column 1, Item (56) Other Publications, Line 42:
Delete "Remaing" and insert --Remaining-- therefor Page 8, Column 1, Item (56) Other Publications, Line 51:
Delete "mutli-CC" and insert --multi-CC-- therefor Page 8, Column 2, Item (56) Other Publications, Line 31:
Delete "Beriin," and insert --Berlin,-- therefor Page 9, Column 2, Item (56) Other Publications, Line 43:
Delete "Dormat" and insert --Dormant-- therefor Page 10, Column 1, Item (56) Other Publications, Line 19:
Delete "R2-181Z639" and insert --R2-1812639-- therefor In the Specification Column 13, Detailed Description, Line 57:
Delete "621" and insert --620-- therefor Column 14, Detailed Description, Line 38:
After "bearer", insert --.-- therefor Column 16, Detailed Description, Line 56:
Delete "NTA" and insert --$N_{TA}$-- therefor Column 16, Detailed Description, Line 59:
Delete "NTA=0." and insert --$N_{TA}$=0.-- therefor Column 21, Detailed Description, Line 38:
Delete "1312, 1312," and insert --1312, 1313,-- therefor Column 26, Detailed Description, Line 33:
Delete "1621" and insert --1620-- therefor Column 28, Detailed Description, Line 1:
Delete "CSI-RS s" and insert --CSI-RSs-- therefor Column 31, Detailed Description, Line 53:
After "Multiple", delete "¶"

Column 32, Detailed Description, Line 1:
Delete "M>1" and insert --M≥1-- therefor Column 33, Detailed Description, Line 48:
After "perform.", delete "¶"

Column 47, Detailed Description, Line 19:
After "perform", delete "¶"

Column 48, Detailed Description, Line 31:
Delete "3403" and insert --3402-- therefor Column 49, Detailed Description, Line 61:
Delete "n+k+1," and insert --n+k+l,-- therefor Column 50, Detailed Description, Line 1:
Delete "1" and insert --l-- therefor Column 50, Detailed Description, Line 65:
Delete "n+k+1)," and insert --n+k+l),-- therefor Column 51, Detailed Description, Line 45:
Delete "n+k+1" and insert --n+k+l-- therefor Column 51, Detailed Description, Line 47:
Delete "n+k+1+z," and insert --n+k+l+z,-- therefor

CERTIFICATE OF CORRECTION (continued)
U.S. Pat. No. 11,611,468 B2

Column 51, Detailed Description, Line 54:
Delete "1" and insert --l-- therefor

Column 52, Detailed Description, Line 3:
Delete "3601" and insert --3602-- therefor Column 52, Detailed Description, Line 30:
After "more", delete "¶"

Column 52, Detailed Description, Line 60:
Delete "3603" and insert --3602-- therefor Column 53, Detailed Description, Line 67:
Delete "n+k+1," and insert --n+k+l,-- therefor Column 54, Detailed Description, Line 6:
Delete "1" and insert --l-- therefor Column 54, Detailed Description, Line 45:
After "more", delete "¶"

Column 55, Detailed Description, Line 63:
Delete "3701" and insert --3702-- therefor Column 57, Detailed Description, Line 36:
After "preambles.", delete "¶"

Column 59, Detailed Description, Line 25:
Delete "Lab VIEWMathScript." and insert --LabVIEWMathScript.-- therefor